US012720472B2

(12) United States Patent
Suzuki et al.

(10) Patent No.: US 12,720,472 B2
(45) Date of Patent: Aug. 25, 2026

(54) INFORMATION PROCESSING SYSTEM, INFORMATION PROCESSING TERMINAL, AND INFORMATION PROCESSING METHOD

(71) Applicant: SONY GROUP CORPORATION, Tokyo (JP)

(72) Inventors: Takashi Suzuki, Tokyo (JP); Yo Tabayashi, Tokyo (JP); Masatsugu Ishiko, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 279 days.

(21) Appl. No.: 18/566,234

(22) PCT Filed: Feb. 15, 2022

(86) PCT No.: PCT/JP2022/005797

§ 371 (c)(1),
(2) Date: Dec. 1, 2023

(87) PCT Pub. No.: WO2022/264509

PCT Pub. Date: Dec. 22, 2022

(65) Prior Publication Data

US 2024/0276431 A1 Aug. 15, 2024

(30) Foreign Application Priority Data

Jun. 14, 2021 (JP) ................................ 2021-098948

(51) Int. Cl.

| | |
|---|---|
| ***H04W 64/00*** | (2009.01) |
| ***H04W 4/24*** | (2024.01) |
| ***H04W 24/10*** | (2009.01) |

(52) U.S. Cl.
CPC ............ *H04W 64/00* (2013.01); *H04W 4/24* (2013.01); *H04W 24/10* (2013.01)

(58) Field of Classification Search
CPC ....... H04W 4/021; H04W 4/029; H04W 4/02; H04W 4/023; H04W 64/00; H04W 12/63; H04W 12/06; H04W 4/24; H04W 24/10
See application file for complete search history.

(56) References Cited

U.S. PATENT DOCUMENTS

| | | | | |
|---|---|---|---|---|
| 11,157,907 | B1 * | 10/2021 | Kumar | G06Q 20/206 |
| 2013/0030934 | A1 * | 1/2013 | Bakshi | G06Q 20/3224 705/18 |

(Continued)

FOREIGN PATENT DOCUMENTS

| | | |
|---|---|---|
| JP | 2004-159026 A | 6/2004 |
| JP | 2020-021219 A | 2/2020 |

(Continued)

OTHER PUBLICATIONS

International Search Report and Written Opinion of PCT Application No. PCT/JP2022/005797, issued on Apr. 5, 2022, 09 pages of ISRWO.

*Primary Examiner* — Dung Hong
(74) *Attorney, Agent, or Firm* — CHIP LAW GROUP

(57) ABSTRACT

Provided is an information processing system that includes a payment processing unit that performs data communication for executing payment processing with an information processing terminal, and a positioning processing unit that performs positioning by switching a positioning method for measuring a position of the information processing terminal for each of a plurality of ranging zones from a wide area to a narrow area set according to a distance from the payment processing unit.

11 Claims, 55 Drawing Sheets

(56) References Cited

U.S. PATENT DOCUMENTS

| | | | | |
|---|---|---|---|---|
| 2013/0085941 | A1* | 4/2013 | Rosenblatt | G06Q 20/18 235/375 |
| 2013/0226800 | A1* | 8/2013 | Patel | H04L 63/107 705/44 |
| 2014/0279111 | A1* | 9/2014 | Mahaffey | G06Q 20/3278 705/21 |
| 2016/0328714 | A1* | 11/2016 | Lee | G06Q 20/308 |
| 2016/0364716 | A1* | 12/2016 | Bakshi | G06Q 20/3224 |
| 2017/0193505 | A1* | 7/2017 | Erhart | G06Q 20/405 |
| 2018/0068309 | A1* | 3/2018 | Mahaffey | G06Q 20/20 |

FOREIGN PATENT DOCUMENTS

| | | | | | |
|---|---|---|---|---|---|
| JP | 2021-511503 | A | | 5/2021 | |
| WO | 2016/009738 | A1 | | 1/2016 | |
| WO | WO-2019121419 | A1 | * | 6/2019 | G01S 5/0236 |
| WO | WO-2022264509 | A1 | * | 12/2022 | G01S 5/10 |

* cited by examiner

FIG. 3

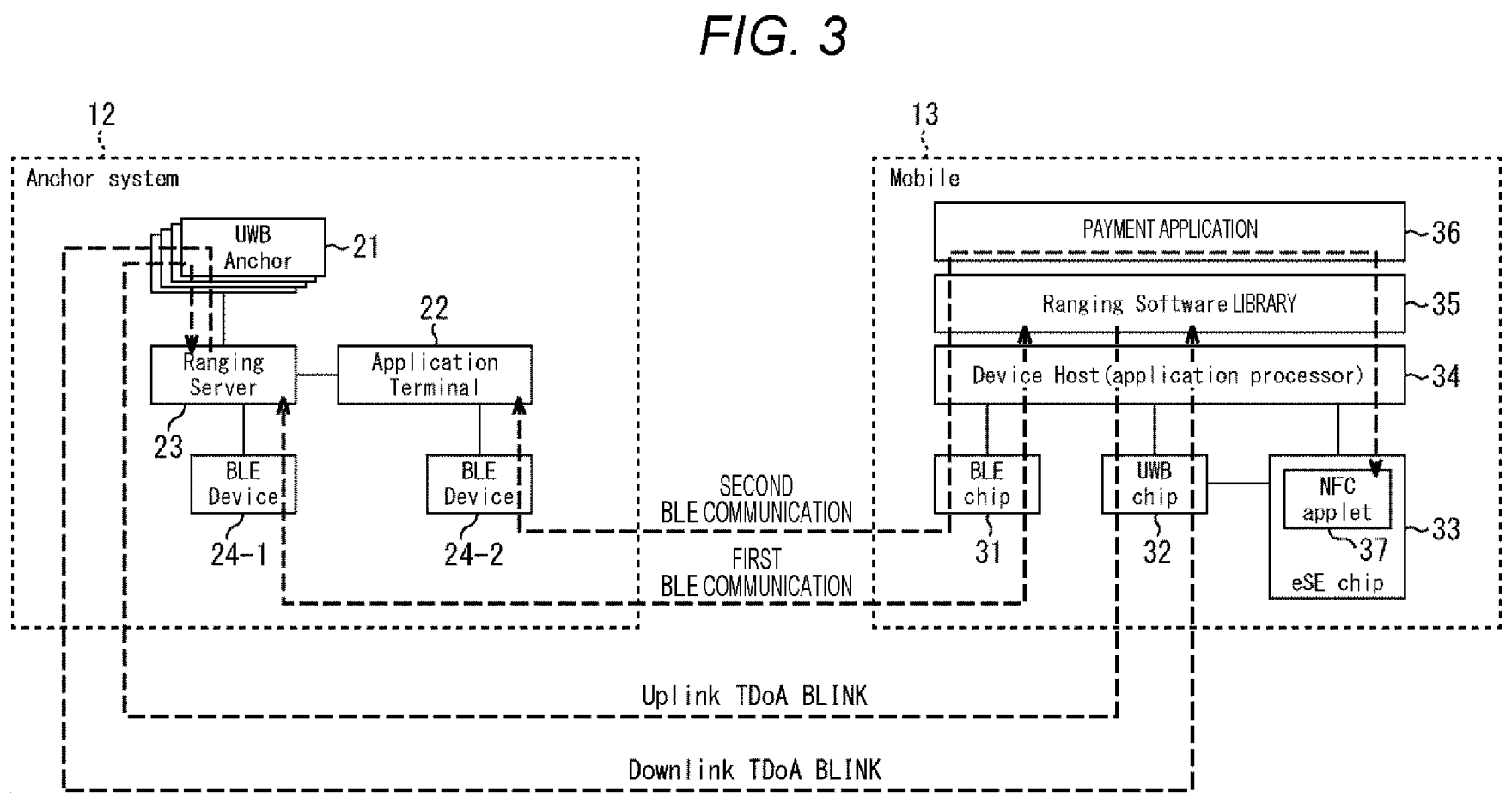

13 Mobile
36 PAYMENT APPLICATION
35 Ranging Software LIBRARY
34 Device Host (application processor)
33 eSE chip
37 NFC applet
32 UWB chip
31 BLE chip SECOND BLE COMMUNICATION
FIRST BLE COMMUNICATION
Uplink TDoA BLINK
Downlink TDoA BLINK 12 Anchor system
21 UWB Anchor
22 Application Terminal
23 Ranging Server
24-2 BLE Device
24-1 BLE Device 11
12
Anchor system
UWB Anchor
21-1
UWB Anchor
21-2
UWB Anchor
21-3
UWB Anchor
21-4
24-1
BLE
23
Ranging Server
24-2
BLE
22
Application Terminal
BLE connection
13
13a
Zone 0
Zone 1
Zone 2
Zone 3

11
12
Anchor system
UWB Anchor
21-1
UWB Anchor
21-2
UWB Anchor
21-3
UWB Anchor
21-4
13
BLINK1
BLINK2
BLINK3
BLINK4
Application Terminal
22
BLE
24-2
BLE
24-1
Ranging Server
23
Zone 0
Zone 1
Zone 2
Zone 3

Downlink BLINK PACKET

Uplink BLINK PACKET

:Uplink TDoA Start Request BLINK

Ranging Interval 200ms anchor1 8 ms 8 ms anchor2 8 ms 8 ms anchor3 8 ms 8 ms anchor4 8 ms 8 ms Time allocation 11
12
Anchor system
UWB Anchor
21-2
UWB Anchor
21-3
BLINK2 with Uplink TDoA Start Response
BLINK3 with Uplink TDoA Start Response
13
24-1
BLE
23
Ranging Server
24-2
BLE
Application Terminal
22
Zone 3
BLINK4 with Uplink-TDoA Start Response
BLINK1 with Uplink TDoA Start Response
Zone 2
13a
21-1
UWB Anchor
BLINK4
21-4
UWB Anchor
Zone 1
Zone 0

Downlink BLINK PACKET for Uplink TDoA Start Response

Ranging Interval 200ms
anchor1
anchor2
anchor3
anchor4
Mobile
5 ms
16 ms
8 ms
:Downlink TDoA BLINK
:Uplink TDoA BLINK
:Uplink TDoA Start Request BLINK 11
12
Anchor system
UWB Anchor
21-2
UWB Anchor
21-3
BLINK(broadcast)
2nd BLE connection
24-1
BLE
23
Ranging Server
24-2
BLE
Application Terminal
13
22
Zone 3
Zone 2
21-1
UWB Anchor
21-4
UWB Anchor
Zone 1
Zone 0

11
12
Anchor system
13
UWB Anchor
21-1
21-2
21-3
21-4
BLINK1
BLINK2
BLINK3
BLINK4
Application Terminal
22
BLE
24-1
24-2
Ranging Server
23
THIRD OOB COMMUNICATION MEANS
Zone 0
Zone 1
Zone 2
Zone 3

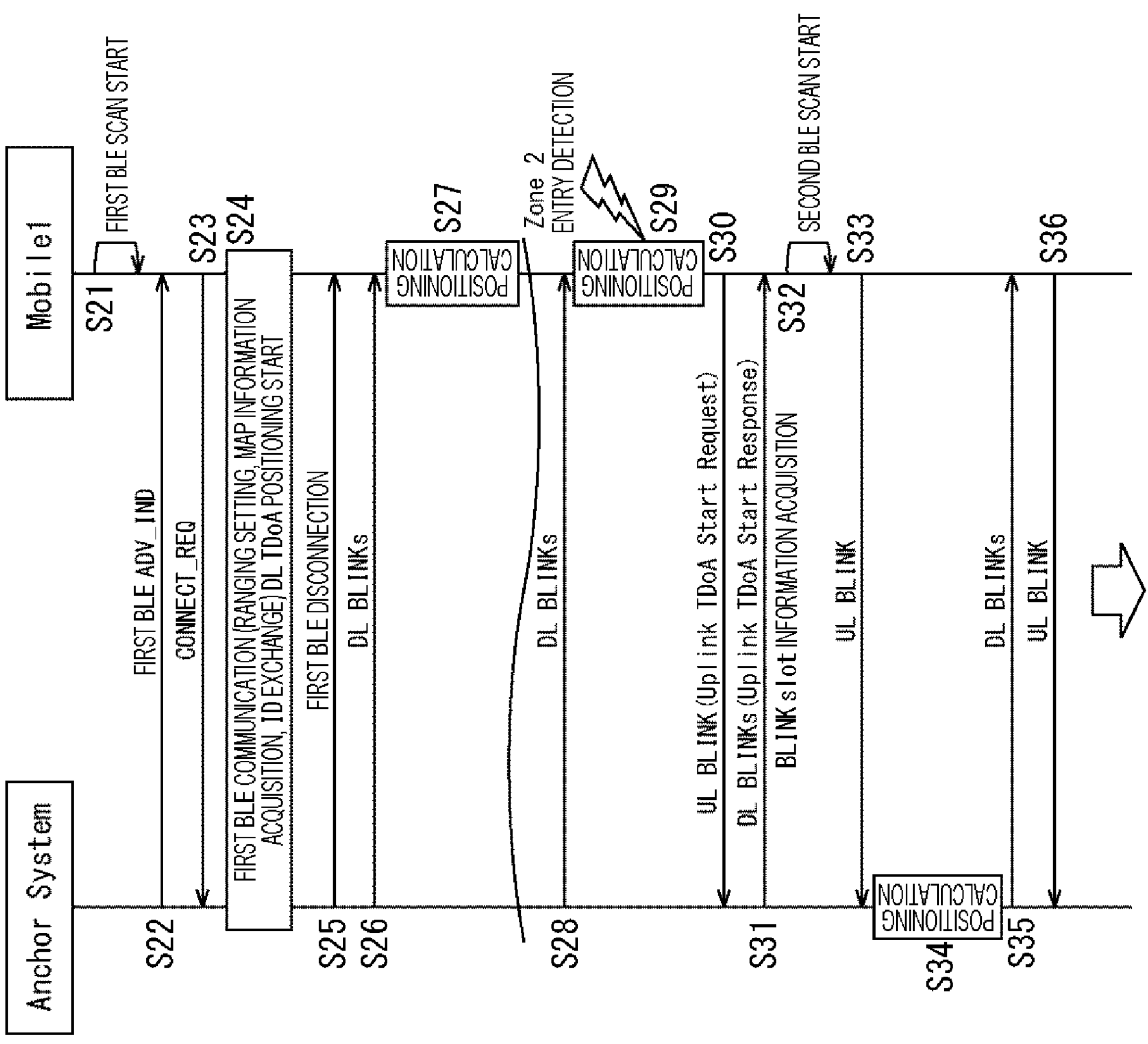
FIG. 23
Mobile1
Anchor System
S21
FIRST BLE SCAN START
S22
FIRST BLE ADV_IND
S23
CONNECT_REQ
S24
FIRST BLE COMMUNICATION (RANGING SETTING, MAP INFORMATION ACQUISITION, ID EXCHANGE) DL TDoA POSITIONING START
S25
FIRST BLE DISCONNECTION
S26
DL BLINKs
S27
POSITIONING CALCULATION
Zone 2 ENTRY DETECTION
S28
DL BLINKs
S29
POSITIONING CALCULATION
S30
UL BLINK (Uplink TDoA Start Request)
S31
DL BLINKs (Uplink TDoA Start Response)
S32
SECOND BLE SCAN START
BLINKslot INFORMATION ACQUISITION
S33
UL BLINK
S34
POSITIONING CALCULATION
S35
DL BLINKs
S36
UL BLINK Anchor System
Mobile1
S37
UL_BLINK
S38
POSITIONING CALCULATION
Zone 3 ENTRY DETECTION
S39
SECOND BLE ADV_IND
S40
CONNECT_REQ
S41
SECOND BLE COMMUNICATION (APPLICATION DATA COMMUNICATION)
S42
DL_BLINKs
S43
UL_BLINK
S44
POSITIONING CALCULATION
Zone 3 LEAVING DETECTION
S45
SECOND BLE DISCONNECTION
S46
SECOND BLE SCAN START
S47
DL_BLINKs
S48
UL_BLINK
S49
POSITIONING CALCULATION 11
12
Anchor system
UWB Anchor
21-2
UWB Anchor
21-3
24-1
BLE
23
Ranging Server
24-2
22
BLE
Application Terminal
13-3
Zone 3
Zone 2
13-1
13-2
21-1
21-4
UWB Anchor
UWB Anchor
Zone 1
Zone 0

FIG. 27

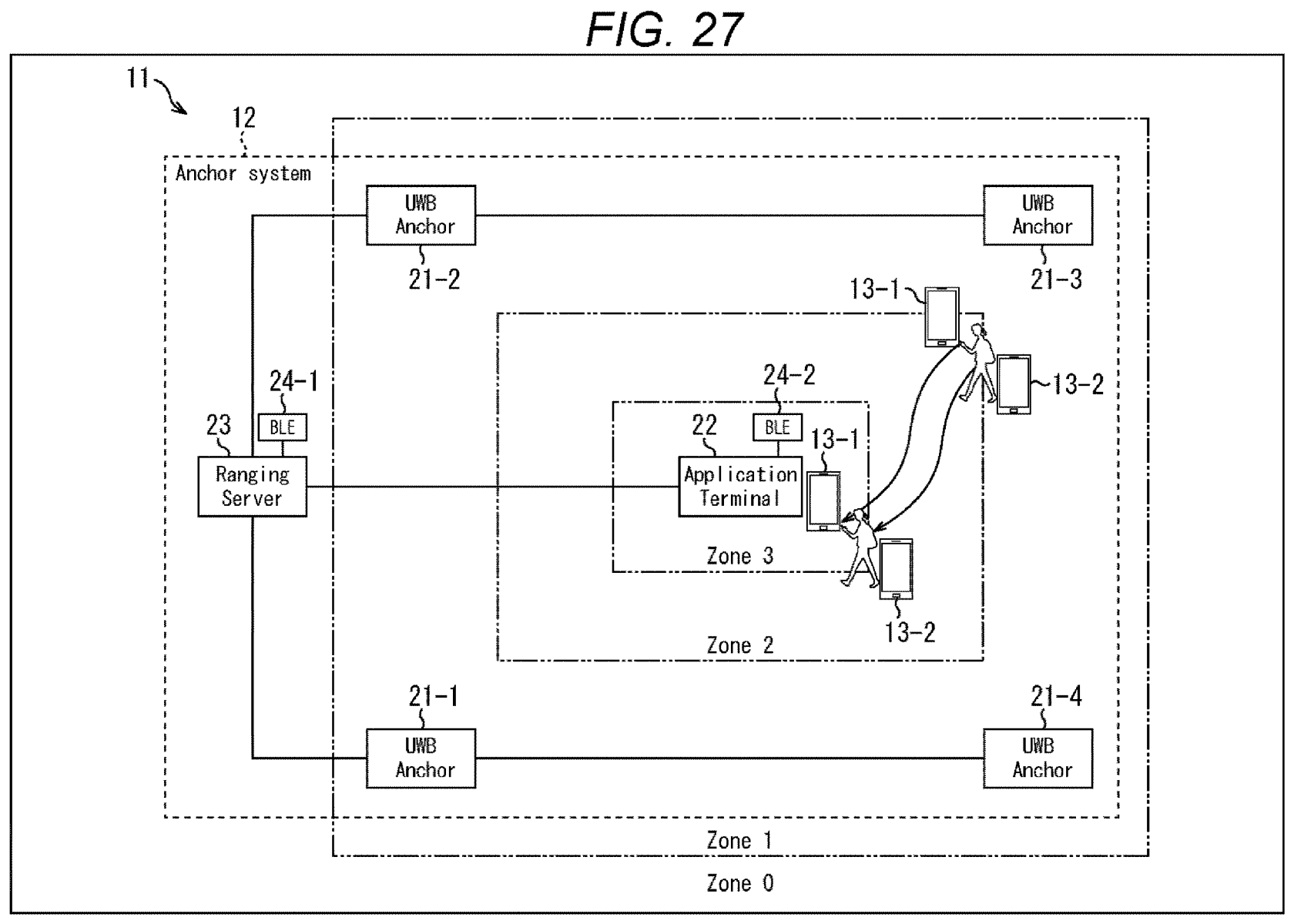

11
12
Anchor system
UWB Anchor 21-1
UWB Anchor 21-2
UWB Anchor 21-3
UWB Anchor 21-4
Application Terminal 22
Ranging Server 23
BLE 24-1
BLE 24-2
13-1
13-2
Zone 0
Zone 1
Zone 2
Zone 3

13
UWB Anchor
21-3
UWB Anchor
21-4
25
UWB
22
Application Terminal
Zone 3
Zone 2
Zone 1
Zone 0
UWB Anchor
21-2
UWB Anchor
21-1
24
BLE
23
Ranging Server
12A
Anchor system
11A Zoning & Combined Ranging(transportation gate use case)
12A
Anchor System
Ranging Server
23
Zone 3
Zone 2
Zone 1
Zone 0
Free
25
UWB Data
21
UWB Anchor
21
UWB Anchor
24
BLE Device
In-band Data transaction
Uplink TDoA
Uplink BLINK for mode change
Downlink TDoA
OOB config
OOB scan
13
Possible number of mobile for serving at the same time (up to system design)
~64
~1024

FIG. 32

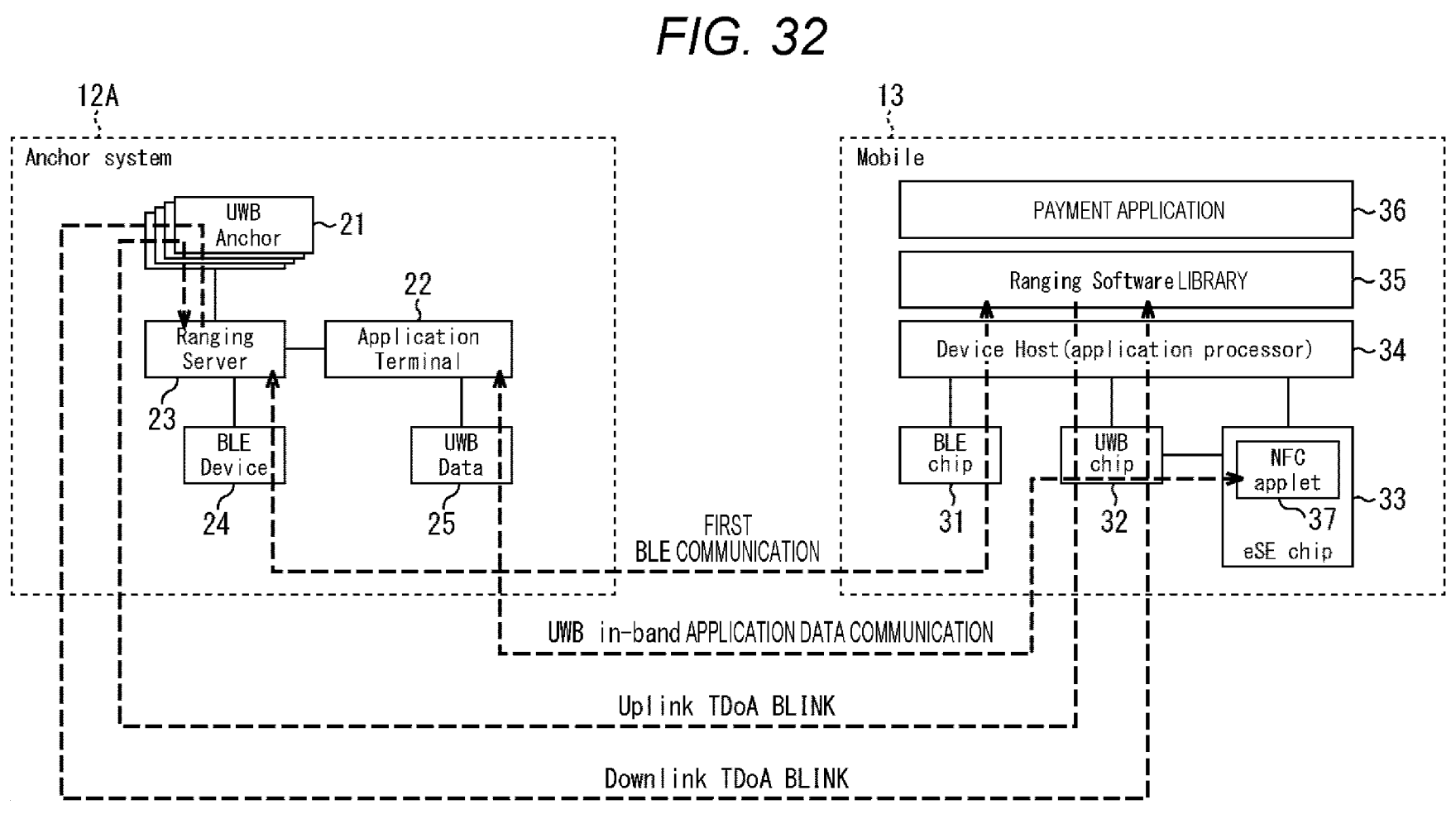

13
Mobile
PAYMENT APPLICATION
36
Ranging Software LIBRARY
35
Device Host (application processor)
34
NFC applet
37
eSE chip
33
UWB chip
32
BLE chip
31

12A
Anchor system
UWB Anchor
21
Application Terminal
22
Ranging Server
23
BLE Device
24
UWB Data
25

FIRST BLE COMMUNICATION
UWB in-band APPLICATION DATA COMMUNICATION
Uplink TDoA BLINK
Downlink TDoA BLINK

FIG. 33

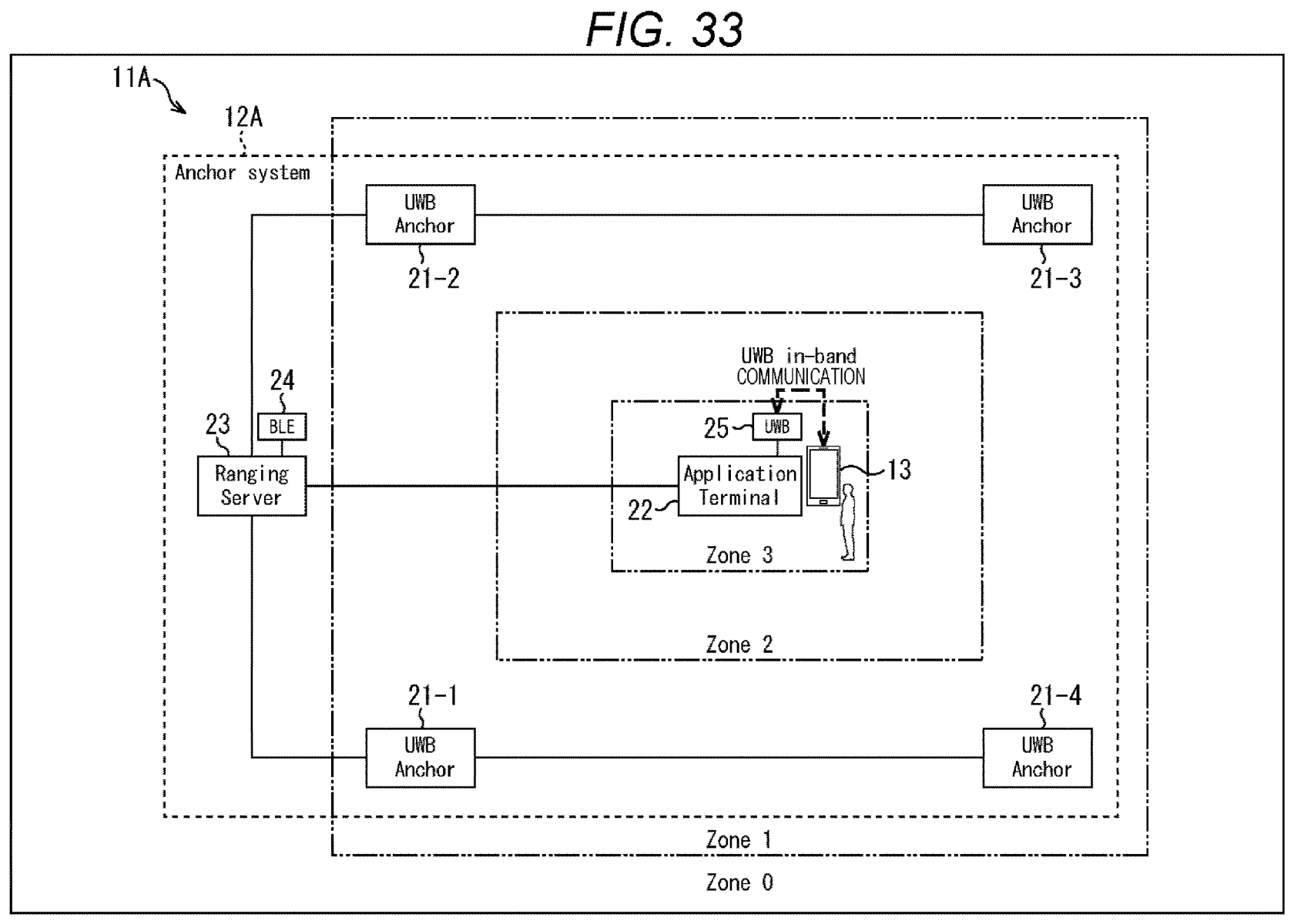

11A
12A
Anchor system
UWB Anchor
21-1
UWB Anchor
21-2
UWB Anchor
21-3
UWB Anchor
21-4
Ranging Server
23
BLE
24
Application Terminal
22
UWB
25
13
UWB in-band COMMUNICATION
Zone 3
Zone 2
Zone 1
Zone 0

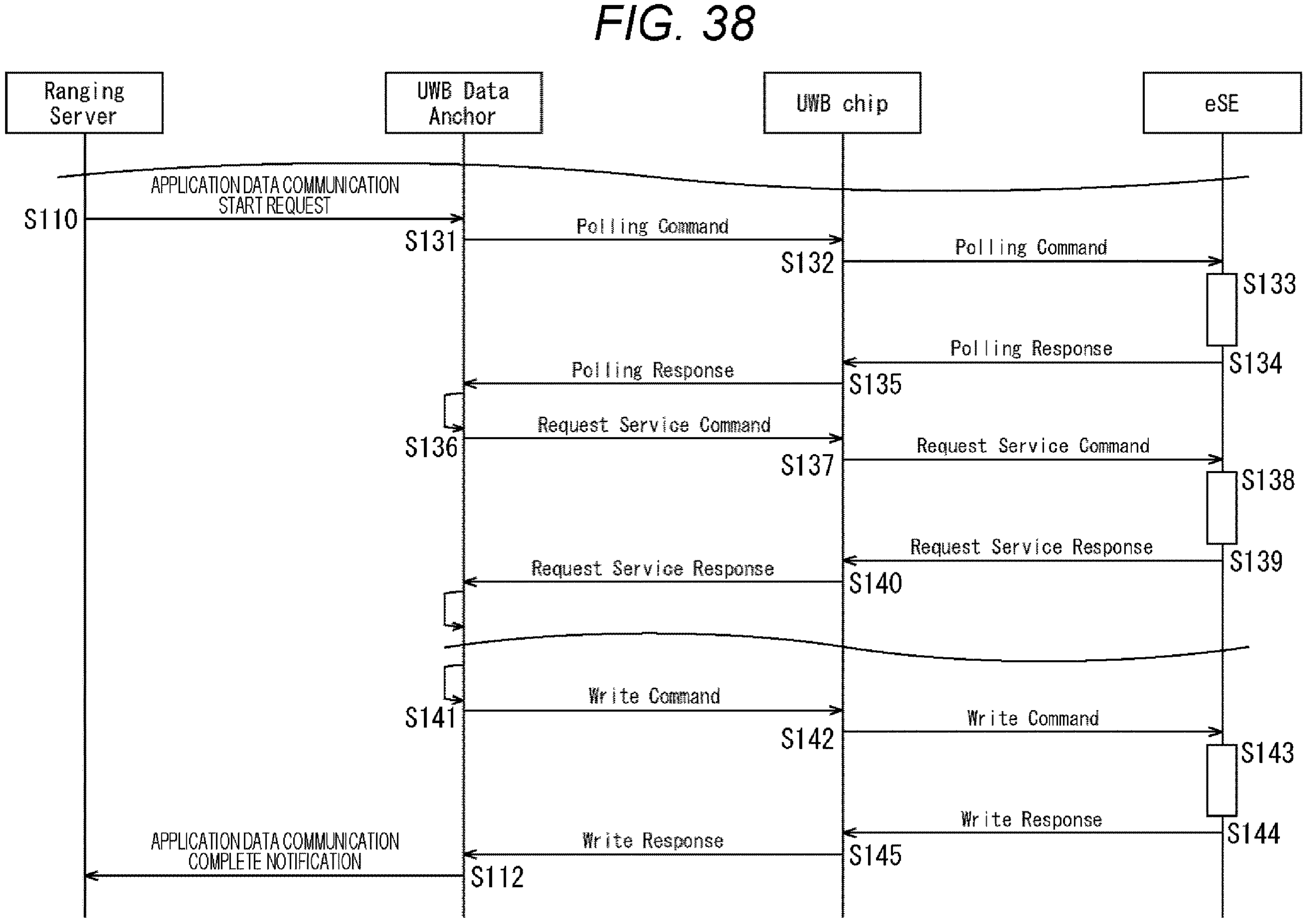
FIG. 38
Ranging Server
UWB Data Anchor
UWB chip
eSE
APPLICATION DATA COMMUNICATION START REQUEST
S110
Polling Command
S131
Polling Command
S132
S133
Polling Response
S134
Polling Response
S135
Request Service Command
S136
Request Service Command
S137
S138
Request Service Response
S139
Request Service Response
S140
Write Command
S141
Write Command
S142
S143
Write Response
S144
APPLICATION DATA COMMUNICATION COMPLETE NOTIFICATION
Write Response
S145
S112

11B
12B
Anchor system
UWB Anchor
21B-3
UWB Anchor
21B-4
13
BLINK(DS-TWR Start Request)
(broadcast)
22
BLE
24-2
Application Terminal
Zone 3
Zone 2
Zone 1
Zone 0
UWB Anchor
21B-2
UWB Anchor
21B-1
24-1
BLE
23
Ranging Server Uplink BLINK PACKET for DS-TWR Start Request MESSAGE Downlink BLINK PACKET for DS-TWR Start Response 11B
12B
Anchor system
UWB Anchor
21B-2
UWB Anchor
21B-3
24-1
BLE
23
Ranging Server
DS-TWR (Multicast)
DS-TWR (Multicast)
13
24-2
BLE
Application Terminal
22
Zone 3
DS-TWR (Multicast)
DS-TWR (Multicast)
Zone 2
21B-1
UWB Anchor
21B-4
UWB Anchor
Zone 1
Zone 0

11B
12B
Anchor system
UWB Anchor
21B-1
21B-2
21B-3
21B-4
DS-TWR
13
2nd BLE connection
BLE
24-1
24-2
Application Terminal
22
Ranging Server
23
Zone 0
Zone 1
Zone 2
Zone 3

11B
12B
Anchor system
UWB Anchor
21B-2
UWB Anchor
21B-3
24-1
BLE
23
Ranging Server
24-2
BLE
Application Terminal
22
Zone 3
DS-TWR end
DS-TWR end
13
Zone 2
DS-TWR end
DS-TWR end
21B-1
UWB Anchor
21B-4
UWB Anchor
Zone 1
Zone 0

Ranging Interval 200ms
anchor1
anchor2
anchor3
anchor4
Mobile
5 ms
8 ms
20ms/ 8 devices
20ms Round
:Downlink TDoA BLINK
:DS-TWR Start Request BLINK
:DS-TWR btw mobile & anchors 11C
12b
12a
24b-1
BLE
23b
Ranging Server
Ranging Arbitration Server
26
24a-1
BLE
23a
Ranging Server
UWB
21a-2
21a-3
DL BLINK
21b-3
UL BLINK (broadcast)
21b-2
24b-2
22b
Application Terminal
Zone 3b
Zone 2b
13
24a-2
22a
Application Terminal
Zone 3a
Zone 2a
21b-1
21b-4
Zone 1b
Zone 0b
21a-1
21a-4
Zone 1a
Zone 0a Payment terminal use case with DL&UL TDoA combined ranging+2nd BLE app data communication

Figure 54:
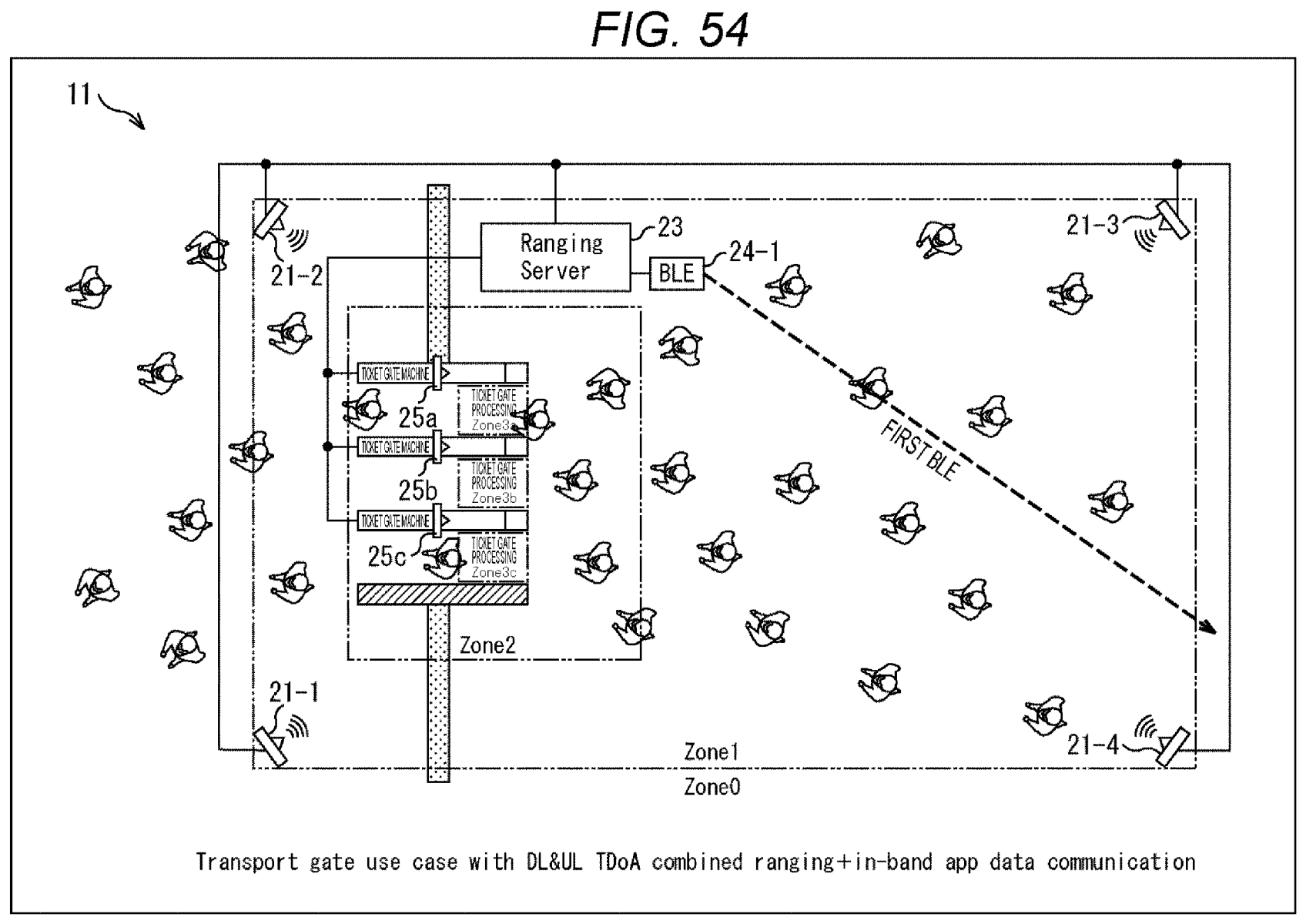

Ranging Server

23

BLE 24-1

FIRST BLE 21-1

21-2

21-3

21-4

Zone0

Zone1

Zone2

TICKET GATE PROCESSING Zone3a

TICKET GATE PROCESSING Zone3b

TICKET GATE PROCESSING Zone3c

TICKET GATE MACHINE

25a

25b

25c

Transport gate use case with DL&UL TDoA combined ranging+in-band app data communication 105
HARD DISK
104
RAM
103
ROM
102
CPU
101
110
INPUT/OUTPUT INTERFACE
111
REMOVABLE RECORDING MEDIUM
DRIVE
109
COMMUNICATION UNIT
108
INPUT UNIT
107
OUTPUT UNIT
106
COMPUTER

INFORMATION PROCESSING SYSTEM, INFORMATION PROCESSING TERMINAL, AND INFORMATION PROCESSING METHOD

CROSS REFERENCE TO RELATED APPLICATIONS

This application is a U.S. National Phase of International Patent Application No. PCT/JP2022/005797 filed on Feb. 15, 2022, which claims priority benefit of Japanese Patent Application No. JP 2021-098948 filed in the Japan Patent Office on Jun. 14, 2021. Each of the above-referenced applications is hereby incorporated herein by reference in its entirety.

TECHNICAL FIELD

The present disclosure relates to an information processing system, an information processing terminal, and an information processing method, and more particularly, to an information processing system, an information processing terminal, and an information processing method capable of performing payment processing more reliably.

BACKGROUND ART

Conventionally, near field communication (NFC) that performs wireless communication at a short distance of about 10 cm has been used in a fare payment system for paying a fare at a ticket gate of a station. When the user performs an operation of touching a ticket gate machine with a mobile terminal including a non-contact integrated circuit (IC), information processing for paying a fare is executed.

Meanwhile, in recent years, a technology for enabling a fare to be paid in a touchless manner by using Ultra Wide Band (UWB), Bluetooth Low Energy (BLE) (registered trademark), or the like that performs wireless communication in a wider range in a fare payment system has been developed.

For example, Patent Document 1 discloses an information processing system that performs authentication by communication in a first communication distance and performs processing such as a ticket gate by communication in a second communication distance shorter than the first communication distance.

CITATION LIST

Patent Document

Patent Document 1: WO 2016/009738

SUMMARY OF THE INVENTION

Problems to be Solved by the Invention

Incidentally, in a fare payment system using UWB, BLE, or the like, it is assumed that a plurality of ticket gates is installed at a station, and a large number of users pass through the ticket gates. At this time, it is necessary to provide technologies such as ensuring simultaneous connection of a large number of mobile terminals, specifying which ticket gate a user passes through, avoiding interference between electromagnetic waves for ranging and electromagnetic waves for data communication, and quickly processing communication with a secure element of a mobile terminal. Thus, it is required to achieve a fare payment system capable of accurately connecting a mobile terminal and a ticket gate and reliably executing fare payment processing.

In addition, since Two Way Ranging (TWR), which is often used for distance measurement of UWB, uses a large number of UWB packets (communication amount) required for one distance measurement, it is necessary to maintain the UWB Link with all the devices to be measured for distance measurement even in a case where a large number of users are rushing in like a use case of a ticket gate. Therefore, since a large amount of UWB communication is required in proportion, it is difficult to avoid interference in the time domain. Furthermore, while a large amount of UWB communication for distance measurement occurs, UWB data communication also needs to be performed while avoiding interference, and it seems to be practically difficult to allocate sufficient time while avoiding interference. Meanwhile, in a case where the UWB distance measurement area is extremely narrowed in order to reduce the UWB communication amount, there is a concern that the UWB connection time via OOB (BLE), which is usually made before the start of UWB communications, may not be long enough to allow all mobile terminals to reliably connect with the ticket gate and pass through the ticket gate.

The present disclosure has been made in view of such a situation, and is to enable payment processing to be performed more reliably.

Solutions to Problems

An information processing system according to a first aspect of the present disclosure includes: a payment processing unit that performs data communication for executing payment processing with an information processing terminal; and a positioning processing unit that performs positioning by switching a positioning method for measuring a position of the information processing terminal for each of a plurality of ranging zones from a wide area to a narrow area set according to a distance from the payment processing unit.

An information processing method according to a first aspect of the present disclosure includes an information processing system performing positioning by switching a positioning method for measuring a position of an information processing terminal for each of a plurality of ranging zones from a wide area to a narrow area set according to a distance from a payment processing unit that performs data communication for executing payment processing with the information processing terminal.

In the first aspect of the present disclosure, positioning is performed by switching a positioning method for measuring a position of an information processing terminal for each of a plurality of ranging zones from a wide area to a narrow area set according to a distance from a payment processing unit that performs data communication for executing payment processing with the information processing terminal.

An information processing terminal according to a second aspect of the present disclosure includes an application execution unit configured to execute: a payment application that performs payment processing with an information processing system including a payment processing unit; and a positioning application that performs positioning by switching a positioning method for measuring a position of the information processing terminal itself for each of a plurality of ranging zones from a wide area to a narrow area set according to a distance from the payment processing unit.

An information processing method according to a second aspect of the present disclosure includes causing an information processing terminal to execute: a payment application that performs payment processing with an information processing system including a payment processing unit; and a positioning application that performs positioning by switching a positioning method for measuring a position of the information processing terminal itself for each of a plurality of ranging zones from a wide area to a narrow area set according to a distance from the payment processing unit.

In the second aspect of the present disclosure, a payment application that performs payment processing with an information processing system including a payment processing unit, and a positioning application that performs positioning by switching a positioning method for measuring a position of the information processing terminal itself for each of a plurality of ranging zones from a wide area to a narrow area set according to a distance from the payment processing unit are executed.

BRIEF DESCRIPTION OF DRAWINGS

FIG. 3 is a diagram for explaining configuration examples of an anchor system and a mobile terminal and a flow of data.

FIG. 23 is a sequence diagram for explaining payment processing.

FIG. 27 is a diagram for explaining abnormal system processing.

FIG. 32 is a diagram for explaining configuration examples of an anchor system and a mobile terminal and a flow of data.

FIG. 33 is a diagram for explaining execution processing of application data communication during UWB in-band communication.

FIG. 38 is a sequence diagram for explaining Application data communication processing in detail.

MODE FOR CARRYING OUT THE INVENTION

Hereinafter, specific embodiments to which the present technology is applied are described in detail with reference to the drawings.

First Configuration Example of Payment Processing System

Figure 1:
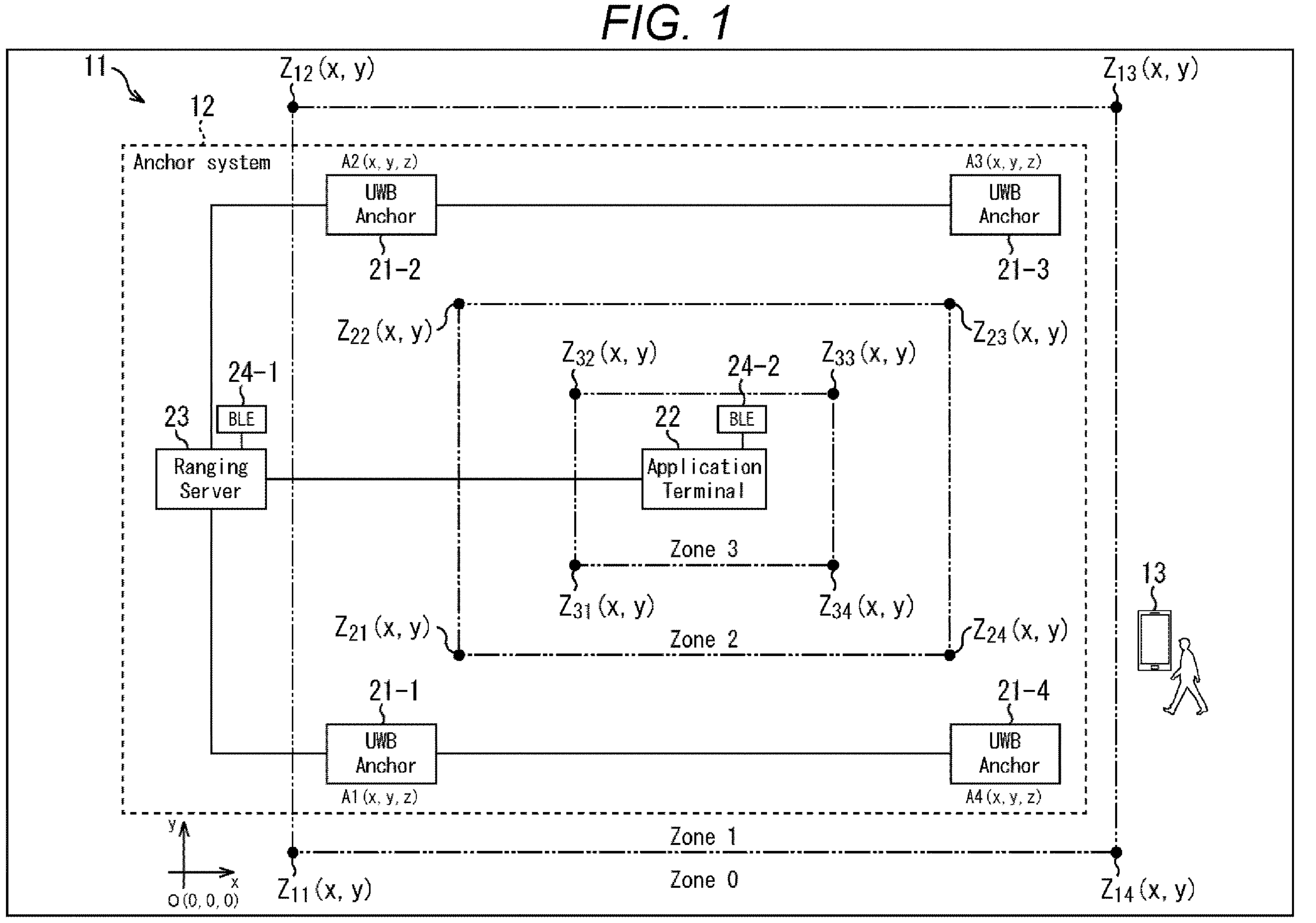
FIG. 1 is a block diagram illustrating a configuration example of a first embodiment of a payment processing system to which the present technology is applied.

FIG. 1 is a block diagram illustrating a configuration example of a first embodiment of a payment processing system to which the present technology is applied.

For example, a payment processing system 11 illustrated in FIG. 1 provides payment processing performed between an anchor system 12 and a mobile terminal 13. In addition, in the payment processing system 11, as illustrated, ranging zones Zone0 to Zone3 indicated by two-dot chain lines are set, and a positioning method is switched between the anchor system 12 and the mobile terminal 13 in the ranging zone Zone1 and the ranging zones Zone2 and Zone3.

The ranging zone Zone0 is a free zone and is an area where positioning is not performed between the anchor system 12 and the mobile terminal 13. The ranging zone Zone1 is set as a wide area inside a boundary with the ranging zone Zone0, and is an area in which positioning is performed on the mobile terminal 13 side by a Downlink Time Difference of Arrival (TDoA) method. The ranging zone Zone2 is set inside the ranging zone Zone1, and is an area where positioning is performed on the anchor system 12 side by the Uplink TDoA method in response to notification from the mobile terminal 13 to the anchor system 12. The ranging zone Zone3 is set as a narrow area inside the ranging zone Zone2, and positioning is performed on the anchor system 12 side by the Uplink TDoA method similarly to the ranging zone Zone2. In addition, the ranging zone Zone3 is an area in which a ranging server 23 of the anchor system 12 instructs an application terminal 22 to perform payment data communication with the mobile terminal 13. As described above, the ranging zone is an area set according to the distance from the application terminal 22 in order to switch the positioning method for measuring the position of the mobile terminal 13 between the Downlink TDoA method and the Uplink TDoA method.

As illustrated in FIG. 1, the anchor system 12 is configured by connecting four UWB anchors 21-1 to 21-4, the application terminal 22, and the ranging server 23 via a network interface. Further, in the anchor system 12, the application terminal 22 includes a BLE device 24-2, and the ranging server 23 includes a BLE device 24-1.

The UWB anchors 21-1 to 21-4 perform UWB communication with the mobile terminal 13. Furthermore, the UWB anchors 21-1 to 21-4 communicate with the ranging server 23 via a network interface, and transmit and receive information necessary for positioning calculation (Ranging, Data), command information with the mobile terminal 13, and the like.

The application terminal 22 performs application data communication for performing payment processing with the mobile terminal 13 via the BLE device 24-2. In addition, the application terminal 22 communicates with the ranging server 23 via a network interface.

The ranging server 23 performs positioning calculation of the mobile terminal 13 on the basis of the time information from the UWB anchors 21-1 to 21-4. The ranging server 23 communicates with the application terminal 22 via the network interface and controls the operation of the application terminal 22. The ranging server 23 connects the mobile terminal 13 and the anchor system 12 via the BLE device 24-1. The ranging server 23 transmits the position information of the UWB anchors 21-1 to 21-4 and the map information including the range information of the ranging zones Zone0 to Zone3 to the mobile terminal 13.

For example, the map information includes absolute coordinates A1 (x, y, z) of the UWB anchor 21-1, absolute coordinates A2 (x, y, z) of the UWB anchor 21-2, absolute coordinates A3 (x, y, z) of the UWB anchor 21-3, absolute coordinates A4 (x, y, z) of the UWB anchor 21-4, absolute coordinates $Z_{11}$ (x, y) to $Z_{14}$ (x, y) of the ranging zone Zone1, absolute coordinates $Z_{21}$ (x, y) to $Z_{24}$ (x, y) of the ranging zone Zone2, and absolute coordinates $Z_{31}$ (x, y) to $Z_{34}$ (x, y) of the ranging zone Zone3.

The mobile terminal 13 performs UWB communication with the UWB anchors 21-1 to 21-4, and performs positioning calculation by itself on the basis of time information acquired from the UWB anchors 21-1 to 21-4 by Downlink TDoA. Then, the mobile terminal 13 switches the operation depending on where its position is in the ranging zones Zone0 to Zone3. The mobile terminal 13 performs first BLE communication with the BLE device 24-1 of the ranging server 23, and performs second BLE communication with the BLE device 24-2 of the application terminal 22.

The payment processing system 11 is configured in this manner, the ranging zones Zone0 to Zone3 are set according to the distance from the application terminal 22, and positioning is performed by switching the positioning method for measuring the position of the mobile terminal 13.

Processing performed in each of the ranging zones Zone0 to Zone3 in the payment processing system 11 will be described with reference to FIG. 2.

In the ranging zone Zone0, the mobile terminal 13 executes Out of Band (OOB) scan. Then, when detecting the first BLE ADV signal transmitted from the BLE device 24-1 of the application terminal 22, the mobile terminal 13 establishes the first BLE connection with the anchor system 12.

In the ranging zone Zone1 (distant wide area), the mobile terminal 13 performs positioning of the mobile terminal 13 itself by the Downlink TDoA method. Note that, in the ranging zone Zone1, simultaneous positioning of a large number of (for example, about 1024 or more) mobile terminals 13 is possible. Then, when the mobile terminal 13 moves from the ranging zone Zone1 to the ranging zone Zone2, the positioning method is switched.

In the ranging zone Zone2, the anchor system 12 performs positioning of the mobile terminal 13 by the Uplink TDoA method. Note that, in the ranging zone Zone2, for example, simultaneous positioning of about 64 mobile terminals 13 is possible.

When the mobile terminal 13 enters the ranging zone Zone3 (narrow area in the vicinity) where payment communication is performed, a notification of entry into the ranging zone Zone3 is provided to the application terminal 22. The application terminal 22 performs payment data communication (for example, a purchase payment at a store) by BLE communication of the BLE device 24-2.

As described above, in the payment processing system 11, bidirectional communication is performed by including the device ID information unique to the mobile terminal 13 in the Uplink TDOA BLINK packet and the Downlink BLINK packet in order to perform communication necessary for switching of the positioning method, operation control, and the like. Then, by switching the positioning method between the ranging zone Zone1 and the ranging zones Zone2 and Zone3, interference during UWB data communication, interference during UWB distance measurement communication, and UWB and BLE link budget can be suppressed, and the payment processing can be performed more reliably.

A configuration example of the anchor system 12 and the mobile terminal 13 and a flow of data between the anchor system 12 and the mobile terminal 13 will be described with reference to FIG. 3.

As described with reference to FIG. 1, the anchor system 12 includes the UWB anchors 21-1 to 21-4, the application terminal 22, the ranging server 23, the BLE device 24-1, and the BLE device 24-2.

As illustrated in FIG. 3, the mobile terminal 13 includes a BLE chip 31, a UWB chip 32, an embedded Secure Element (eSE) chip 33, a device host 34, a ranging software library 35, and a payment application 36.

The BLE chip 31 performs first BLE communication with the BLE device 24-1 and second BLE communication with the BLE device 24-2.

The UWB chip 32 performs UWB communication with the UWB anchors 21-1 to 21-4. The UWB chip 32 transmits an Uplink TDoA BLINK packet to the UWB anchors 21-1 to 21-4, and receives a Downlink BLINK packet transmitted from the UWB anchors 21-1 to 21-4.

For example, the eSE chip 33 can provide a function equivalent to that of a hardware chip such as FeliCa (registered trademark) or Mifare (registered trademark) by executing an NFC applet 37 such as FeliCa or Mifare.

The device host 34 is an application processor, and executes a positioning application referring to the ranging software library 35 and the payment application 36. For example, the device host 34 executes a positioning application that performs positioning by switching a positioning method for measuring a location of the mobile terminal 13, and performs positioning when the mobile terminal 13 is in the ranging zone Zone1. In addition, the device host 34 executes the payment application 36 and performs payment processing with the application terminal 22 of the anchor system 12.

<Processing Example of Payment Processing> Each processing performed in the payment processing of the payment processing system 11 will be described in detail with reference to FIGS. 4, 5, 6, 7A, 7B, 8A, 8B, 8C, 9, 10A, 10B, 11, 12, 13A, 13B, 14, 15, 16, 17A, 17B, 18, 19, 20, 21, and 22.

Figure 4:
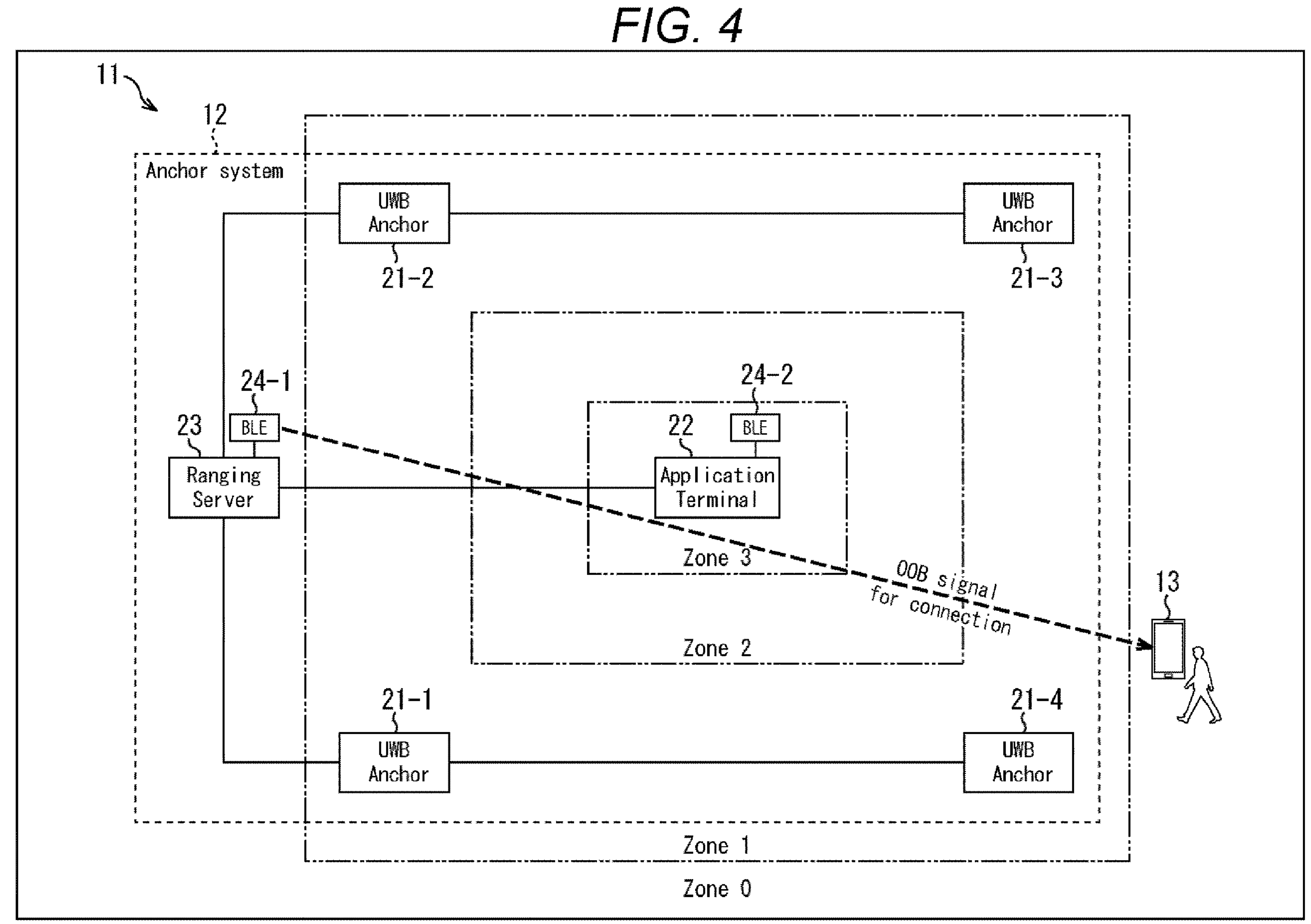
FIG. 4 is a diagram for explaining device search processing.

FIG. 4 is a diagram for explaining device search processing.

As illustrated in FIG. 4, the device search processing is performed on the mobile terminal 13 in the ranging zone Zone0.

After the system is started, the anchor system 12 starts UWB communication including a plurality of UWB communication modes on the basis of ranging time schedule information to be described later, and starts first OOB communication by the BLE device 24-1 of the ranging server 23.

The mobile terminal 13 periodically performs a first BLE scan to detect a first BLE ADV signal transmitted from the BLE device 24-1 of the ranging server 23 until detecting the first BLE ADV signal.

Figure 5:
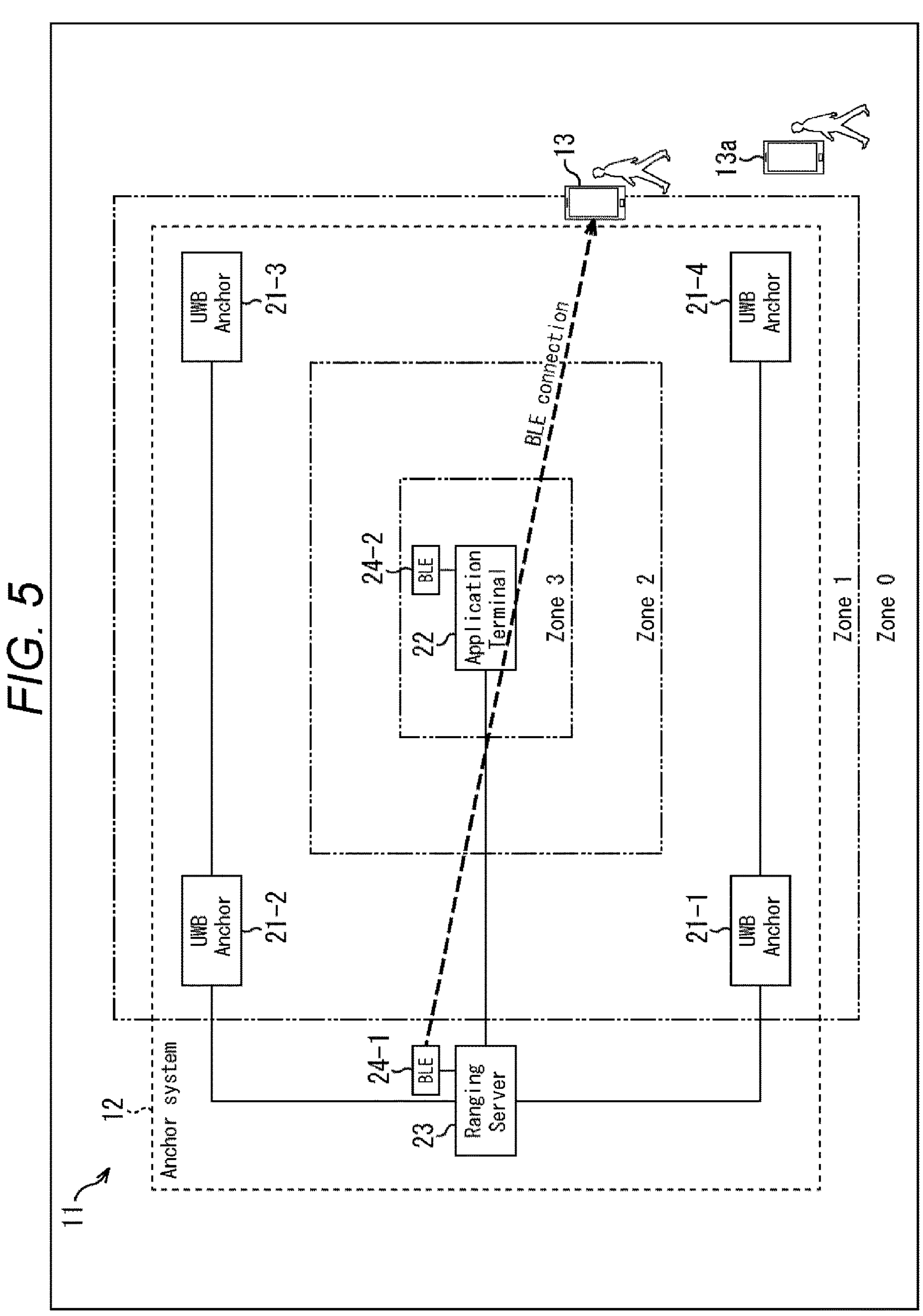
FIG. 5 is a diagram for explaining BLE connection processing.

FIG. 5 is a diagram for explaining first BLE connection processing.

As illustrated in FIG. 5, the first BLE connection processing is performed when the mobile terminal 13 enters the ranging zone Zone1 from the ranging zone Zone0.

The anchor system 12 periodically transmits a BLINK packet from the UWB anchors 21-1 to 21-4 on the basis of the ranging time schedule information.

Upon receiving the first BLE ADV signal transmitted from the BLE device 24-1 of the ranging server 23, the mobile terminal 13 establishes the first BLE connection with the anchor system 12. Then, the mobile terminal 13 performs mutual authentication with the anchor system 12 as necessary on the first BLE communication path.

Subsequently, the anchor system 12 and the mobile terminal 13 exchange various types of setting information necessary for ranging. Examples of various types of setting information necessary for ranging include UWB communication setting information, UWB ranging time schedule information, map information, device ID information, and information specific to an application layer.

The UWB communication setting information includes, for example, a mutual media access control (MAC) address, a communication speed, and the like. The ranging time schedule information of UWB includes, for example, a ranging cycle, a BLINK slot, and other information. The map information includes position information of the UWB anchors 21-1 to 21-4 and range information of the ranging zones Zone0 to Zone3.

The device ID information includes an identification (ID) for identifying the mobile terminal 13. The information specific to the application layer includes, for example, type information of the payment application and the like.

The anchor system 12 and the mobile terminal 13 store the setting information acquired from the other party in their respective memories.

Thereafter, the mobile terminal 13 activates the UWB chip 32, starts Downlink TDoA ranging, and scans UWB BLINK signals from the UWB anchors 21-1 to 21-4.

After the exchange of the setting information as described above ends and the mobile terminal 13 starts the Downlink TDoA ranging, the connection of the first BLE connection is disconnected from the mobile terminal 13 side or the anchor system 12 side, and the first BLE connection ends. Note that, after the first BLE connection with the mobile terminal 13 ends, the anchor system 12 starts transmitting the first BLE ADV signal again to search for another mobile terminal 13*a* other than the mobile terminal 13.

Figure 6:
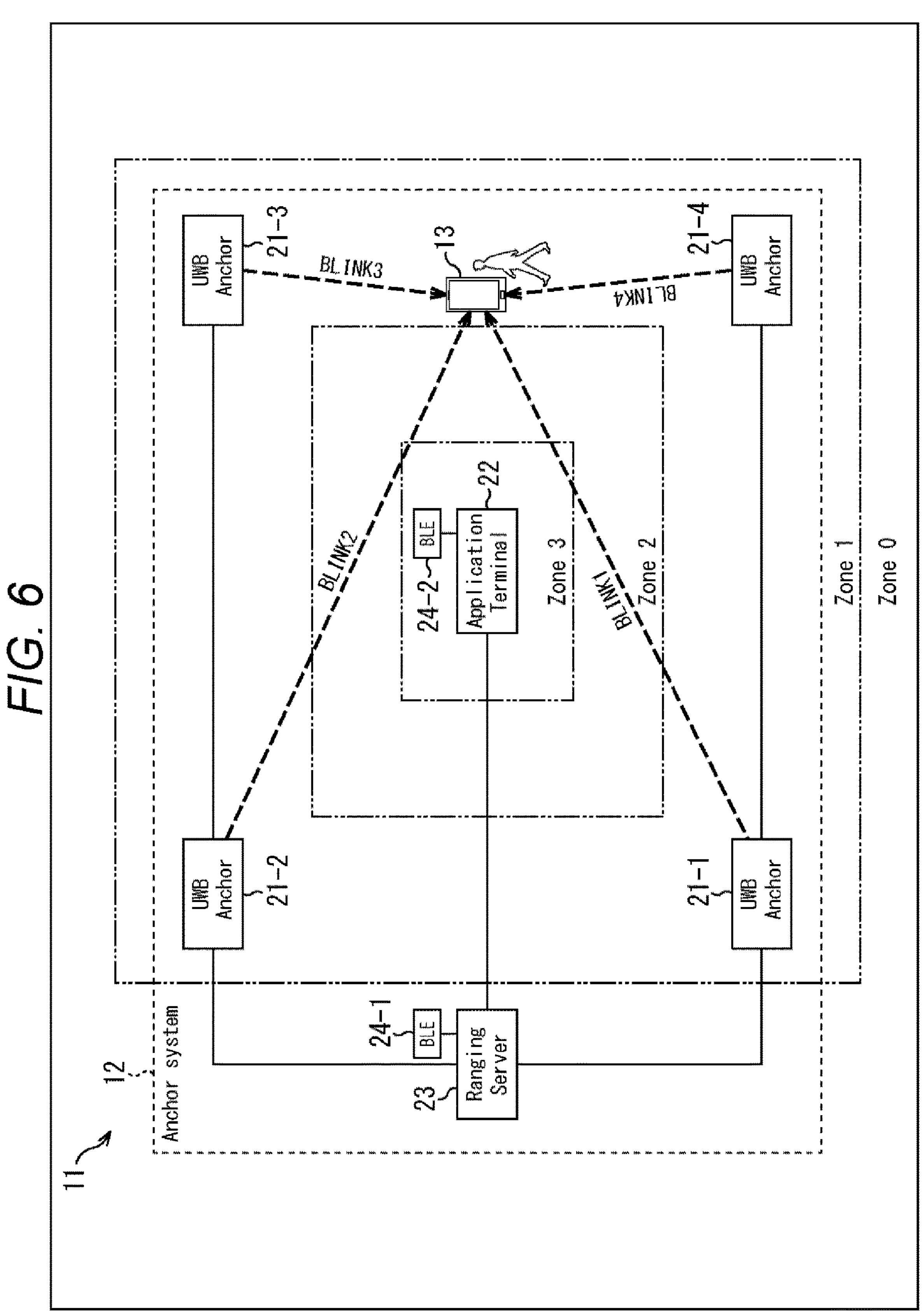
FIG. 6 is a diagram for explaining Downlink TDoA positioning start processing.

FIG. 6 is a diagram for explaining Downlink TDoA positioning start processing.

As illustrated in FIG. 6, the Downlink TDoA positioning start processing is performed by the mobile terminal 13 in the ranging zone Zone1.

The mobile terminal 13 starts recognition of its own absolute position by performing positioning calculation on the basis of time difference information indicating a time difference between arrival times of BLINK packets transmitted from the UWB anchors 21-1 to 21-4 by Downlink TDoA ranging and position information of the UWB anchors 21-1 to 21-4 included in map information acquired from the anchor system 12.

For example, the positioning principle of TDoA that is most easily understood will be described. For example, an intersection of circles having radii of the distances L1 to L3 from the three UWB anchors 21-1 to 21-3 to the mobile terminal 13 is determined at one point on a plane, so that the position of the mobile terminal 13 can be specified. However, since the distance L cannot be directly obtained from the arrival time of the BLINK packet, the mobile terminal 13 measures the time difference between the arrival times of the BLINK packets transmitted from two UWB anchors 21. For example, the time difference of the arrival time can be converted into a distance using the speed of light that is the propagation speed of the pulsed BLINK packet. Then, the distance obtained from the time difference of the arrival time can be geometrically expressed by the position of the mobile terminal 13 and the position of the UWB anchor 21, and the location where the mobile terminal 13 may exist can be specified on a hyperbola.

At this time, since the UWB anchors 21-1 to 21-4 need to transmit the BLINK packet with an accurate fixed time difference, synchronization is performed by a method described later with reference to FIGS. 7A and 7B.

Note that, in a stage (distant) where the mobile terminal 13 is in the ranging zone Zone1, the mobile terminal 13 may reduce the frequency of receiving the Downlink BLINK packet and suppress the positioning cycle to be low in order to suppress power consumption depending on the use case. Furthermore, the anchor system 12 and the mobile terminal 13 sequentially repeat the device search processing (FIG. 4), the first BLE connection processing (FIG. 5), and the Downlink TDoA positioning start processing (FIG. 6), thereby being able to execute positioning of the plurality of mobile terminals 13 in parallel. At this time, since Downlink TDoA ranging is performed in the ranging zone Zone1, the anchor system 12 can perform simultaneous positioning of a large number of mobile terminals 13 without interference of UWB communication.

An example of a method of synchronizing the UWB anchors 21-1 to 21-4 will be described with reference to FIGS. 7A and 7B.

Figures 7A, 7B:
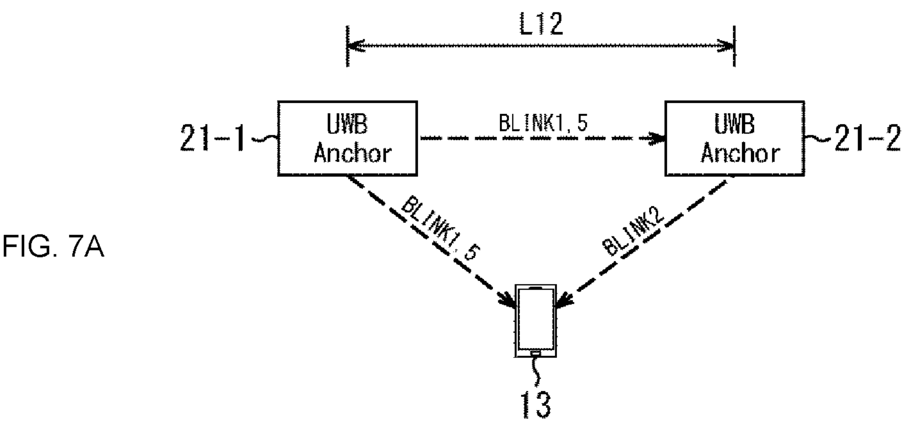
FIGS. 7A and 7B are diagrams for explaining a method of synchronizing UWB anchors.

First, as illustrated in FIG. 7A, a method in which the UWB anchor 21-1 is synchronized with the UWB anchor 21-2 in a case where the UWB anchor 21-2 and the UWB anchor 21-1 are disposed apart from each other by the distance L12 will be described.

As illustrated in FIG. 7B, the UWB anchor 21-1 transmits BLINK1 at timing T1 and transmits BLINK5 at timing T5 4 ms after timing T1.

The UWB anchor 21-2 receives BLINK1 at timing t1 delayed from timing T1 by the arrival delay period Td12. Similarly, the UWB anchor 21-2 receives BLINK5 at timing t5 delayed from timing T5. The UWB anchor 21-2 counts a period Tp15 (=4 ms) from timing t1 to timing t5 with its own clock, and grasps the number of clocks of 1 ms. That is, the number of clocks of 1 ms corresponds to the period Tp12 from timing T1 to timing T2.

The UWB anchor 21-2 can calculate the arrival delay period Td12 (=L12/c) on the basis of the relationship between the distance L12 to the UWB anchor 21-1 and the speed of light c. As a result, the UWB anchor 21-2 can acquire timing T2 (=t1−(Tp12−Td12)) at which BLINK2 is transmitted on the basis of timing t1 at which BLINK1 is received, the period Tp12 from timing T1 to timing T2, and the arrival delay period Td12. Therefore, after receiving the BLINK1 transmitted from the UWB anchor 21-1 at timing T1, the UWB anchor 21-2 can transmit the BLINK2 at timing T2 that is exactly 1 ms after timing T1.

In a similar manner, the UWB anchor 21-3 may obtain timing T3 for transmitting BLINK3, and the UWB anchor 21-4 may obtain timing T4 for transmitting BLINK4.

In this way, in the anchor system 12, the timing of transmitting the BLINK packet can be set so that the UWB anchors 21-1 to 21-4 are synchronized with each other.

Figure 8A:
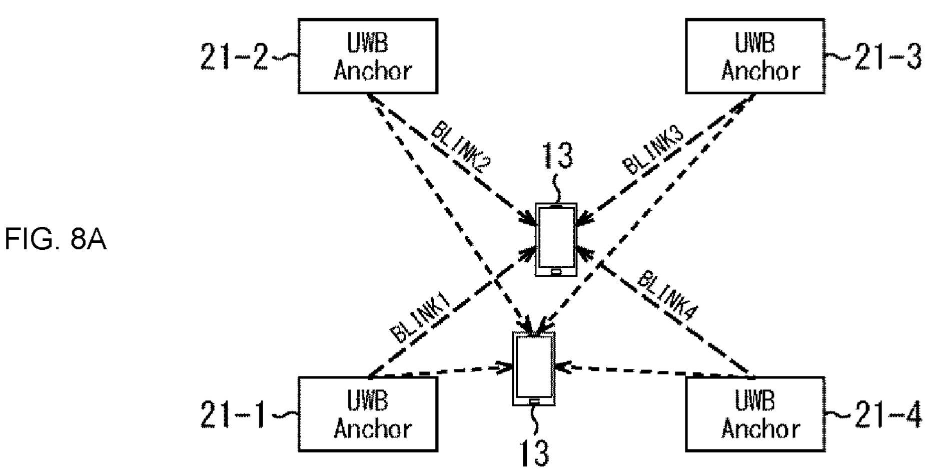
FIGS. 8A, 8B, and 8C are diagrams for explaining Downlink TDoA.
Figure 8B:
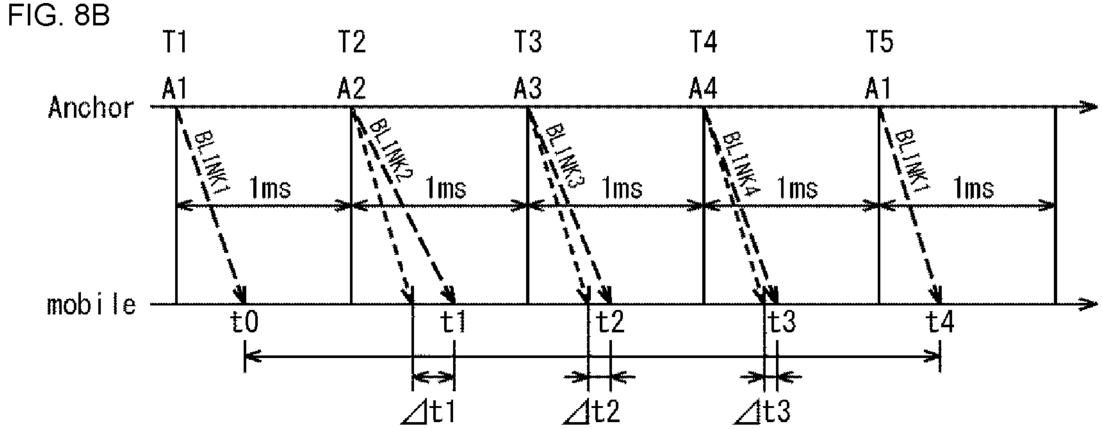
Figure 8C:
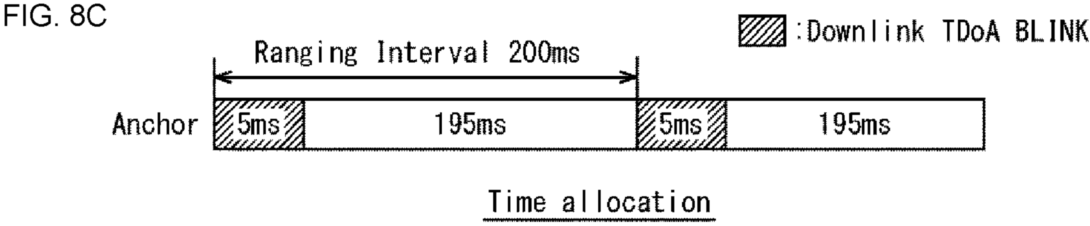

FIGS. 8A, 8B, and 8C are diagrams for explaining Downlink TDoA for transmitting pulses from the UWB anchors 21-1 to 21-4 to the mobile terminal 13.

For example, with the UWB anchor 21-1 as the master anchor, as illustrated in FIG. 8A, the UWB anchor 21-1 transmits BLINK1, the UWB anchor 21-2 transmits BLINK2, the UWB anchor 21-3 transmits BLINK3, and the UWB anchor 21-4 transmits BLINK4. Transmission of these BLINK packets is performed by broadcast, and in principle, the number of mobile terminals 13 connected to the UWB anchors 21-1 to 21-4 is not limited, and it is possible to simultaneously connect to a plurality of (two in FIGS. 8A, 8B, and 8C) mobile terminals 13.

As described above with reference to FIGS. 7A and 7B, since the UWB anchors 21-1 to 21-4 are strictly synchronized, the BLINK packet can be transmitted at timing T of exactly every 1 ms.

That is, as illustrated in FIG. 8B, the UWB anchor 21-1 as a master anchor transmits BLINK1 at timing T1. Then, the UWB anchor 21-2 transmits BLINK2 at timing T2 1 ms after timing T1, the UWB anchor 21-3 transmits BLINK3 at timing T3 1 ms after timing T2, and the UWB anchor 21-4 transmits BLINK4 at timing T4 1 ms after timing T3. Thereafter, the UWB anchor 21-1, which is a master anchor, retransmits the BLINK1 at timing T5 that is 1 ms after timing T4.

Then, the mobile terminal 13 can acquire time differences Δt1 to Δt3 between the arrival time to of BLINK1 transmitted from the UWB anchor 21-1 and the arrival times t1 to t3 of BLINK2 to 4 transmitted from the UWB anchors 21-2 to 21-4.

FIG. 8C illustrates an example of time allocation of the UWB anchors 21-1 to 21-4. Since the UWB communication amount required for positioning is small, as illustrated, assuming that the ranging interval is set to 200 ms, Downlink TDoA BLINK can be set as short as 5 ms, and the exclusive time occupancy is only 2.5%. Note that the actual UWB signal burst period can be set shorter.

Figure 9:
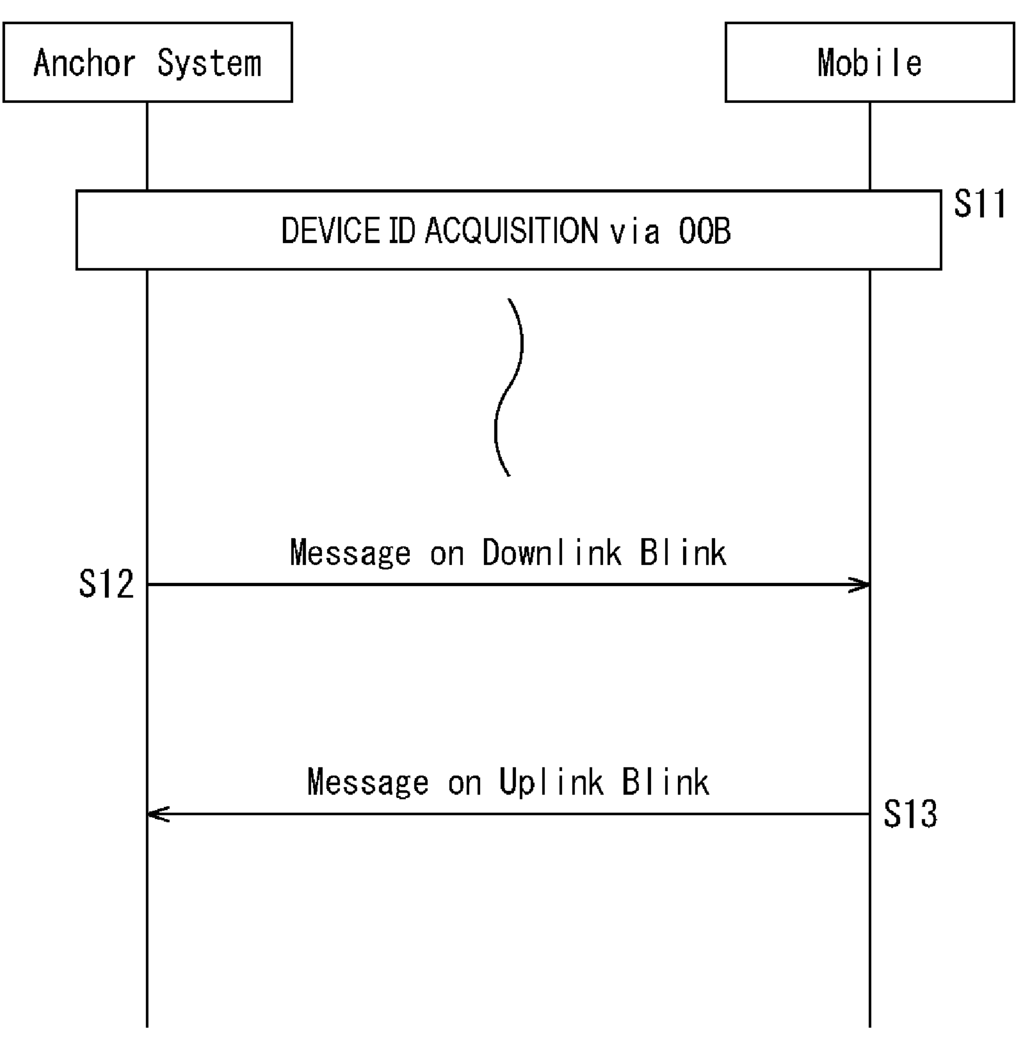
FIG. 9 is a sequence diagram for explaining a TDoA bidirectional communication channel.

FIG. 9 is a sequence diagram illustrating a TDoA bidirectional communication channel between the anchor system 12 and the mobile terminal 13.

In step S11, the first BLE communication (OOB) in the first BLE connection processing described with reference to FIG. 5 is performed between the anchor system 12 and the mobile terminal 13. As a result, the anchor system 12 acquires device ID information for specifying the mobile terminal 13.

Figure 10A:
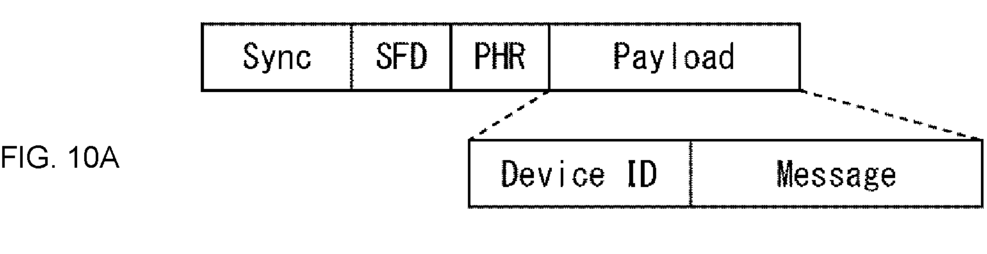
FIGS. 10A and 10B are diagrams illustrating an example of a Downlink BLINK packet and an Uplink BLINK packet.

In step S12, the anchor system 12 stores the device ID information and the message of the mobile terminal 13 in the payload of the Downlink BLINK packet (Message on Downlink Blink) as illustrated in FIG. 10A, and transmits the device ID information and the message to the mobile terminal 13.

Figure 10B:
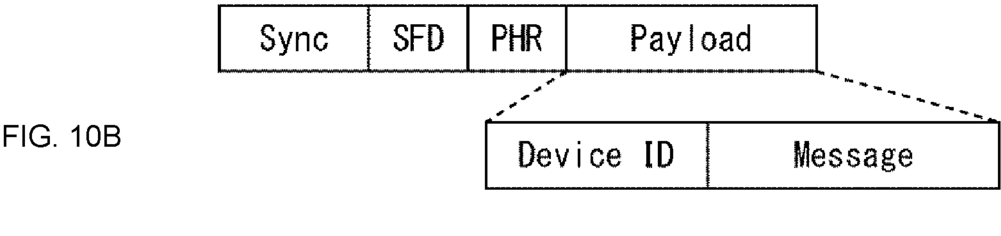

In step S13, in response to the Downlink BLINK packet transmitted in step S12, the mobile terminal 13 stores the device ID information and the message of the mobile terminal 13 in the payload (Message on Uplink Blink) as illustrated in FIG. 10B, and transmits the Uplink BLINK packet to the anchor system 12.

As described above, in the TDoA bidirectional communication channel, the Downlink BLINK packet and the Downlink BLINK packet can include data information. Therefore, by transmitting the information including the device ID information unique to the mobile terminal 13, the anchor system 12 can communicate with the mobile terminal 13 specified by the device ID information. Note that the Downlink BLINK packet and the Downlink BLINK packet are used mainly for the purpose of controlling ranging (switching, termination, and the like), but for example, application layer communication can also be performed.

Note that the configurations of the frames of the Downlink BLINK packet and the Uplink BLINK packet illustrated in FIGS. 10A and 10B are merely examples, and the present invention is not limited to this configuration.

Figure 11:
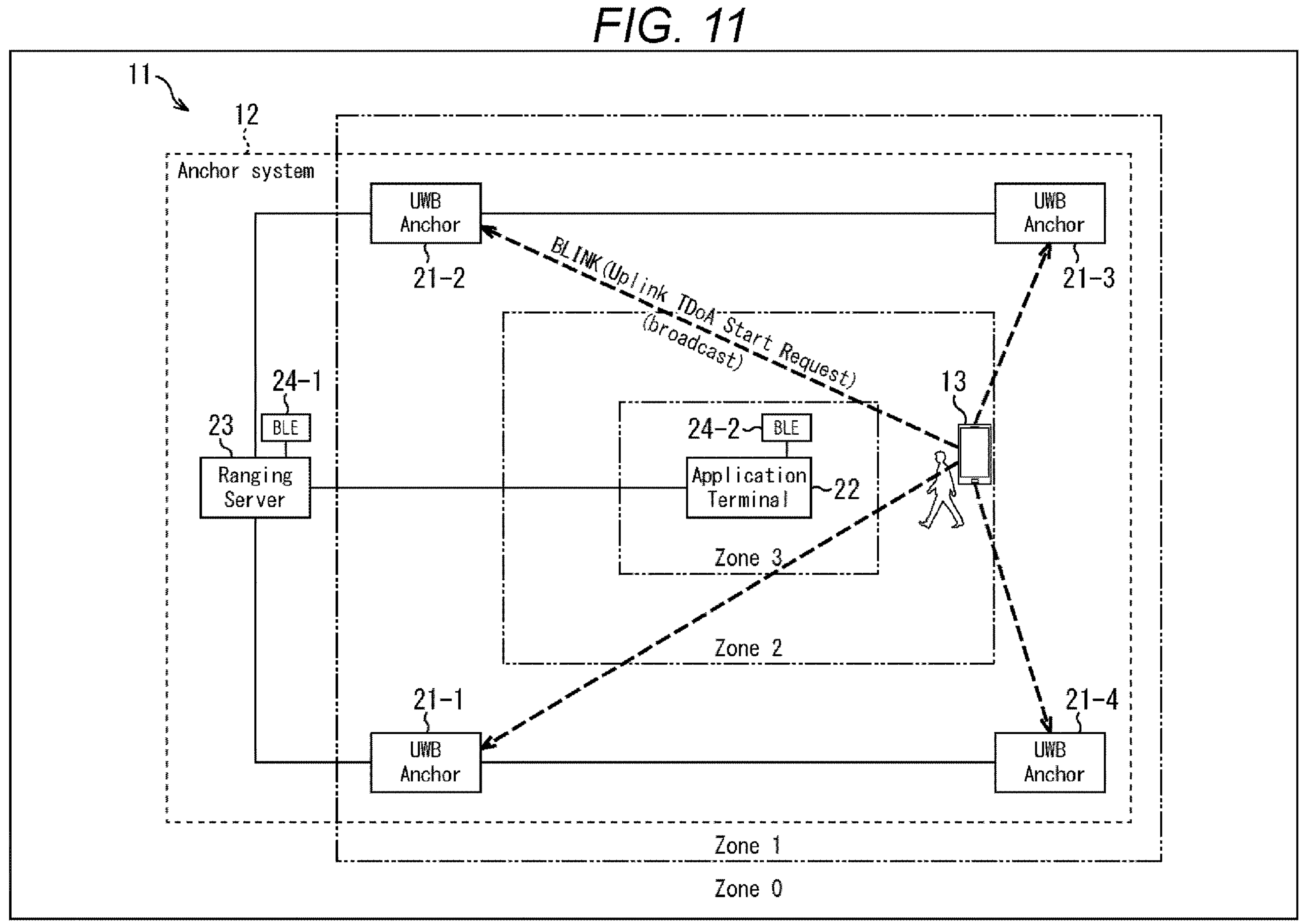
FIG. 11 is a diagram for explaining Uplink TDoA start request notification processing.

FIG. 11 is a diagram for explaining Uplink TDoA start request notification processing.

As illustrated in FIG. 11, the Uplink TDoA start request notification processing is performed when the mobile terminal 13 enters the ranging zone Zone2 from the ranging zone Zone1.

The anchor system 12 periodically scans an Uplink TDoA BLINK packet transmitted from the mobile terminal 13 on the basis of the ranging time schedule information.

Figure 12:
FIG. 12 is a diagram illustrating an example of an Uplink TDoA BLINK packet.

The mobile terminal 13 can recognize that the mobile terminal has entered the ranging zone Zone2 from the ranging zone Zone1 by self-positioning calculation. Then, when recognizing entry into the ranging zone Zone2, the mobile terminal 13 transmits an Uplink TDoA BLINK packet in which the device ID information of the mobile terminal 13 and the Uplink TDoA Start Request message are stored in the payload to the anchor system 12 as illustrated in FIG. 12. At this time, the mobile terminal 13 transmits the Uplink TDoA BLINK packet at a timing when transmission of the Uplink TDoA positioning start request is permitted on the basis of the ranging time schedule information designated at the time of connection from the anchor system 12.

Figures 13A, 13B:
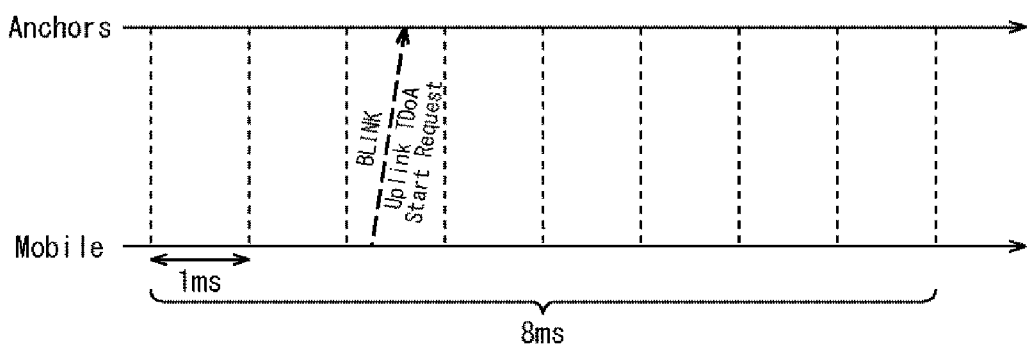
FIGS. 13A and 13B are diagrams for explaining Uplink TDoA Start Request (1st Uplink BLINK).

FIGS. 13A and 13B are diagrams for explaining Uplink TDoA Start Request (1st Uplink BLINK).

As illustrated in FIG. 13A, when detecting entry into the ranging zone Zone2, the mobile terminal 13 broadcasts an Uplink TDoA Start Request BLINK packet, which is a type of Uplink BLINK packet, to the UWB anchors 21-1 to 21-4 once in principle. At this time, since there is a possibility that a plurality of mobile terminals 13 enters the ranging zone Zone2 at the same timing, a plurality of slots is prepared and an Uplink TDoA Start Request BLINK packet is randomly transmitted. In the example illustrated in FIG. 13A, eight slots of 8 ms are prepared, and an Uplink TDoA Start Request BLINK packet is transmitted in the third slot.

FIG. 13B illustrates time allocation of the UWB anchors 21-1 to 21-4. Since the Uplink TDoA Start Request BLINK packet is used only for notifying the UWB anchors 21-1 to 21-4 from the mobile terminal 13 when starting the Uplink TDoA, it is necessary to secure a dedicated section between the ranging intervals. In the example illustrated in FIG. 13B, a section of 8 ms is secured for the 200 ms ranging interval in order to transmit the Uplink TDoA Start Request BLINK packet.

Figure 14:
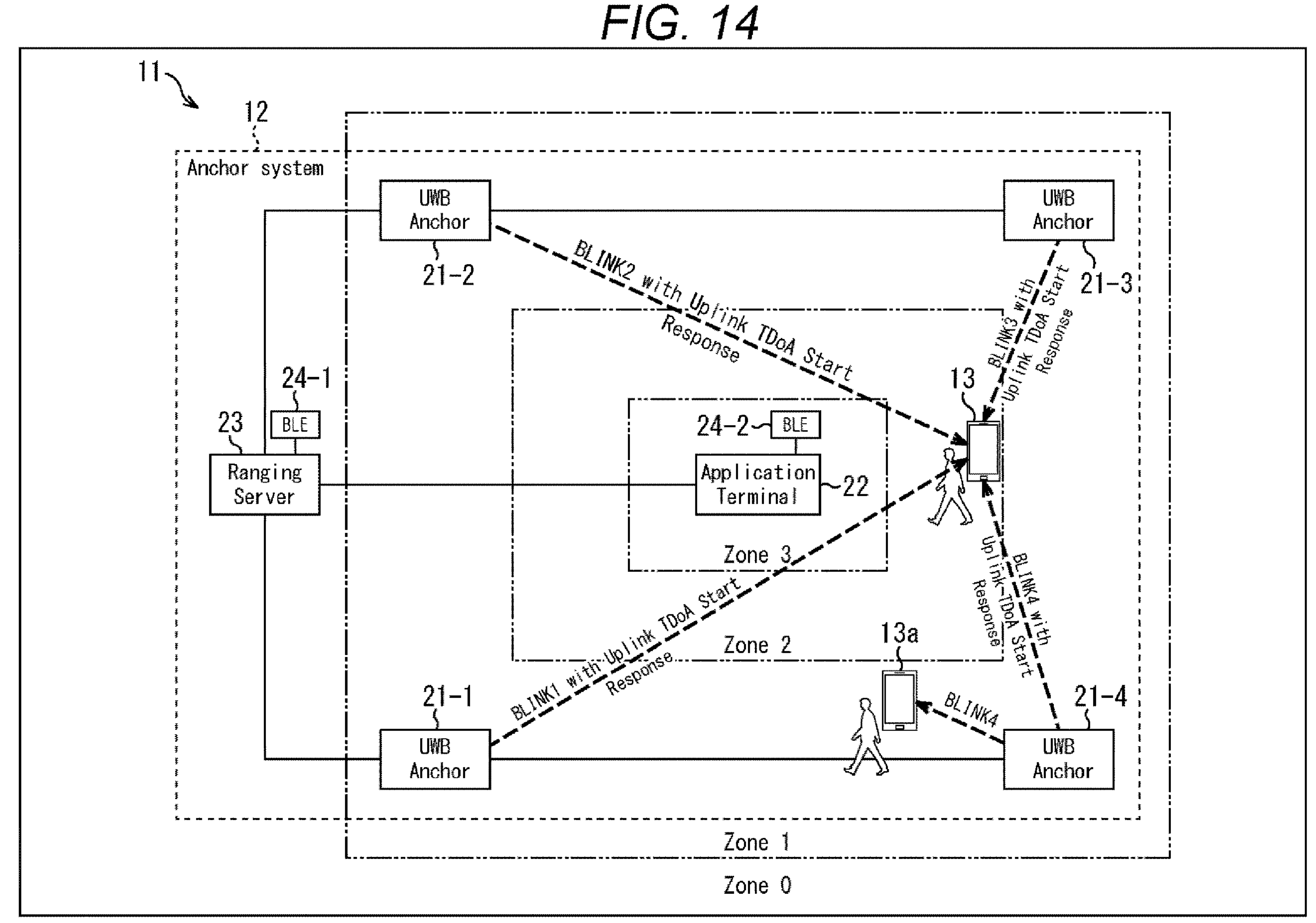
FIG. 14 is a diagram for explaining Uplink TDoA positioning start request response processing.

FIG. 14 is a diagram for explaining Uplink TDoA positioning start request response processing.

As illustrated in FIG. 14, the Uplink TDoA positioning start request response processing is performed on the mobile terminal 13 in the ranging zone Zone2.

The anchor system 12 receives the Uplink TDoA Start Request transmitted from the mobile terminal 13 by the UWB anchors 21-1 to 21-4. The anchor system 12 collates the device ID information of the mobile terminal 13 included in the received Uplink TDoA Start Request with the information list of the connected devices recorded in the internal memory.

Figure 15:
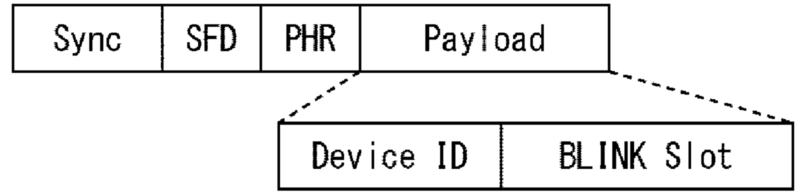
FIG. 15 is a diagram illustrating an example of a Downlink BLINK packet.

For example, in a case where the device ID information of the mobile terminal 13 is already included in the information list of the connected devices as a result of the collation, the anchor system 12 transmits Uplink TDoA Start Response from the UWB anchors 21-1 to 21-4 at the time of transmitting the next Downlink BLINK packet on the basis of the ranging time schedule information. For example, as illustrated in FIG. 15, device ID information and Uplink Blink Slot information of the mobile terminal 13 are stored in a payload of a Downlink BLINK packet for transmitting an Uplink TDoA Start Response.

Meanwhile, in a case where the device ID information of the mobile terminal 13 is not included in the information list of the connected devices as a result of the collation, the anchor system 12 can perform error notification by a Downlink BLINK packet. Alternatively, in this case, the anchor system 12 may ignore the Uplink TDoA Start Request transmitted from the mobile terminal 13.

Note that it is also assumed that another mobile terminal 13*a* other than the mobile terminal 13 that has transmitted the Uplink TDoA Start Request receives the Uplink TDoA Start Response. However, since the mobile terminal 13*a* has not entered the ranging zone Zone2, the Uplink TDoA Start Request has not been transmitted. Therefore, the mobile terminal can ignore the device ID information and the Uplink Blink Slot information acquired from the Uplink TDoA Start Response.

Figure 16:
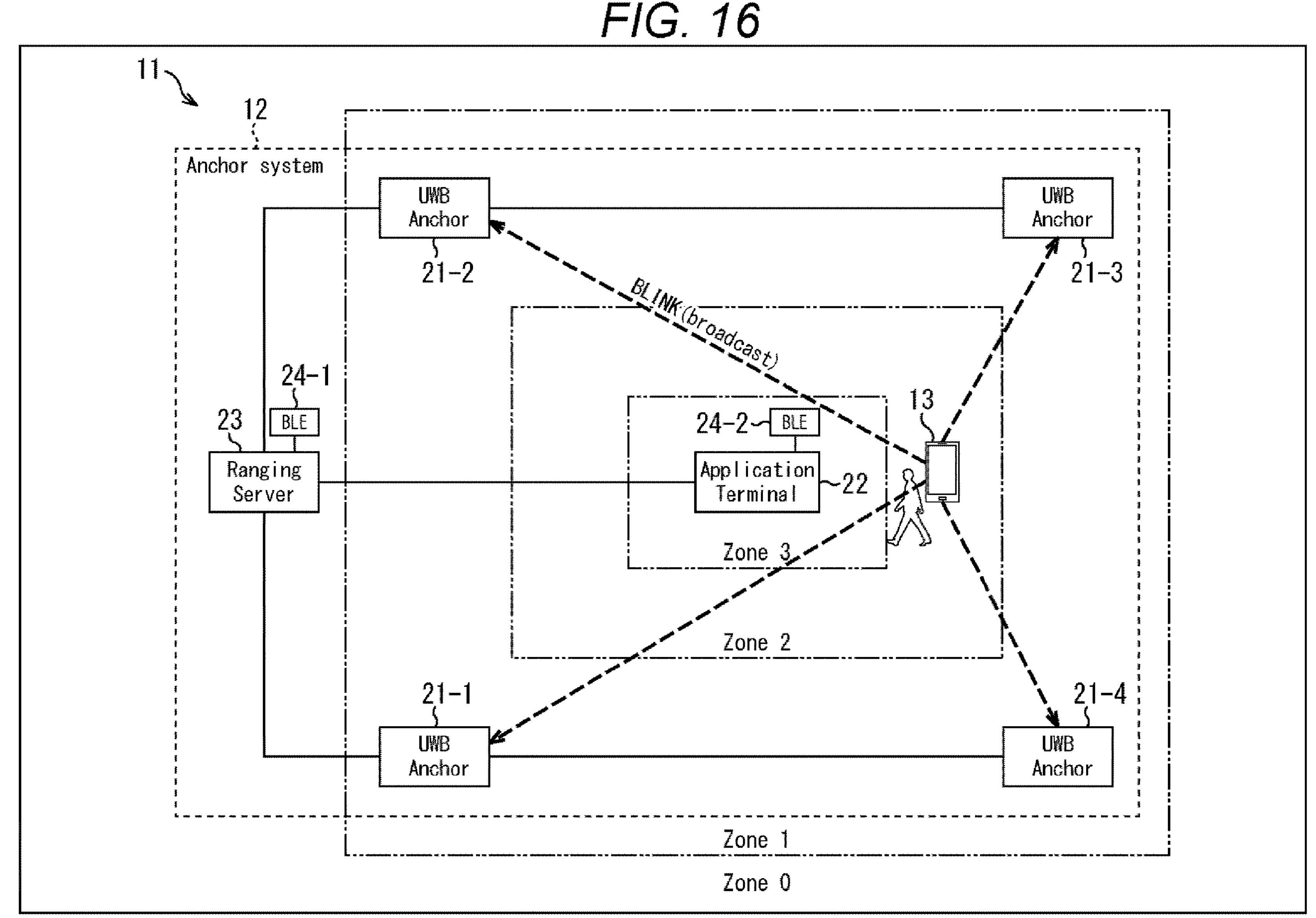
FIG. 16 is a diagram for explaining Uplink TDoA start processing.

FIG. 16 is a diagram for explaining Uplink TDoA start processing.

As illustrated in FIG. 16, the Uplink TDoA start processing is performed by the mobile terminal 13 in the ranging zone Zone2.

The mobile terminal 13 broadcasts the BLINK packet to the anchor system 12 in the slot designated in the Uplink Blink Slot information received from the anchor system 12. The BLINK packet includes device ID information of the mobile terminal 13.

The anchor system 12 receives a BLINK packet transmitted from the mobile terminal 13 at the UWB anchors 21-1 to 21-4. The ranging server 23 of the anchor system 12 performs positioning calculation on the basis of time difference information of arrival times at which BLINK packets arrive at the UWB anchors 21-1 to 21-4 by Uplink TDoA ranging and position information of the UWB anchors 21-1 to 21-4. As a result, the ranging server 23 starts recognizing the absolute position of the mobile terminal 13.

At this time, the mobile terminal 13 continues to receive the Downlink BLINK packet even after entering the ranging zone Zone2. Further, the mobile terminal 13 initiates a second BLE scan to detect a second BLE ADV signal.

Here, Uplink TDoA (pulse transmission from the mobile terminal 13 to the UWB anchors 21-1 to 21-4) will be described with reference to FIGS. 17A and 17B.

Figure 17A:
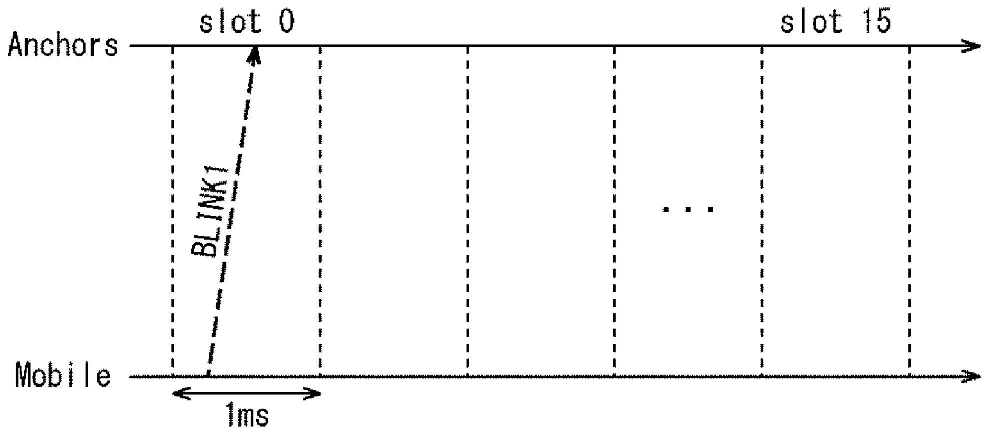
FIGS. 17A and 17B are diagrams for explaining Uplink TDoA.

As illustrated in FIG. 17A, in the Uplink TDoA start processing, the mobile terminal 13 transmits a BLINK packet to the UWB anchors 21-1 to 21-4 in the slot designated in the Uplink Blink Slot information. In the illustrated example, the BLINK packet is transmitted in the first slot in the 16 slots.

The UWB anchors 21-1 to 21-4 are strictly synchronized, and each notify the ranging server 23 of the arrival time at which the BLINK packet has arrived. The ranging server 23 knows all the position information of the UWB anchors 21-1 to 21-4, and can specify the absolute position of the mobile terminal 13 by detecting the time difference between the arrival times. Note that the calculation method for calculating the position from the time difference of the arrival time is the same as the positioning principle of the TDoA described above.

Figure 17B:
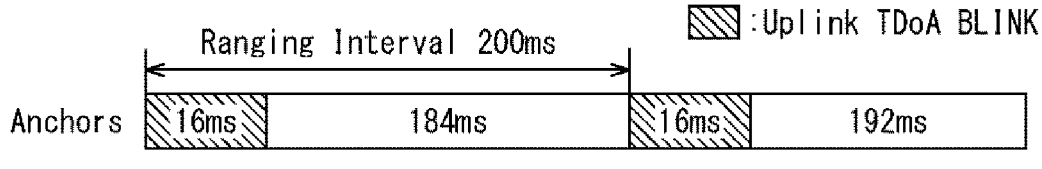

FIG. 17B illustrates an example of time allocation of the UWB anchors 21-1 to 21-4. As illustrated, assuming that the ranging interval is set to 200 ms, Uplink TDoA BLINK is set to 16 ms, and simultaneous positioning of 16 mobile terminals 13 is possible. As described above, in the Uplink TDoA, the communication amount is larger than that in the DL TDoA described above, but the communication amount can be reduced as compared with the DS-TWR described later.

Figure 18:
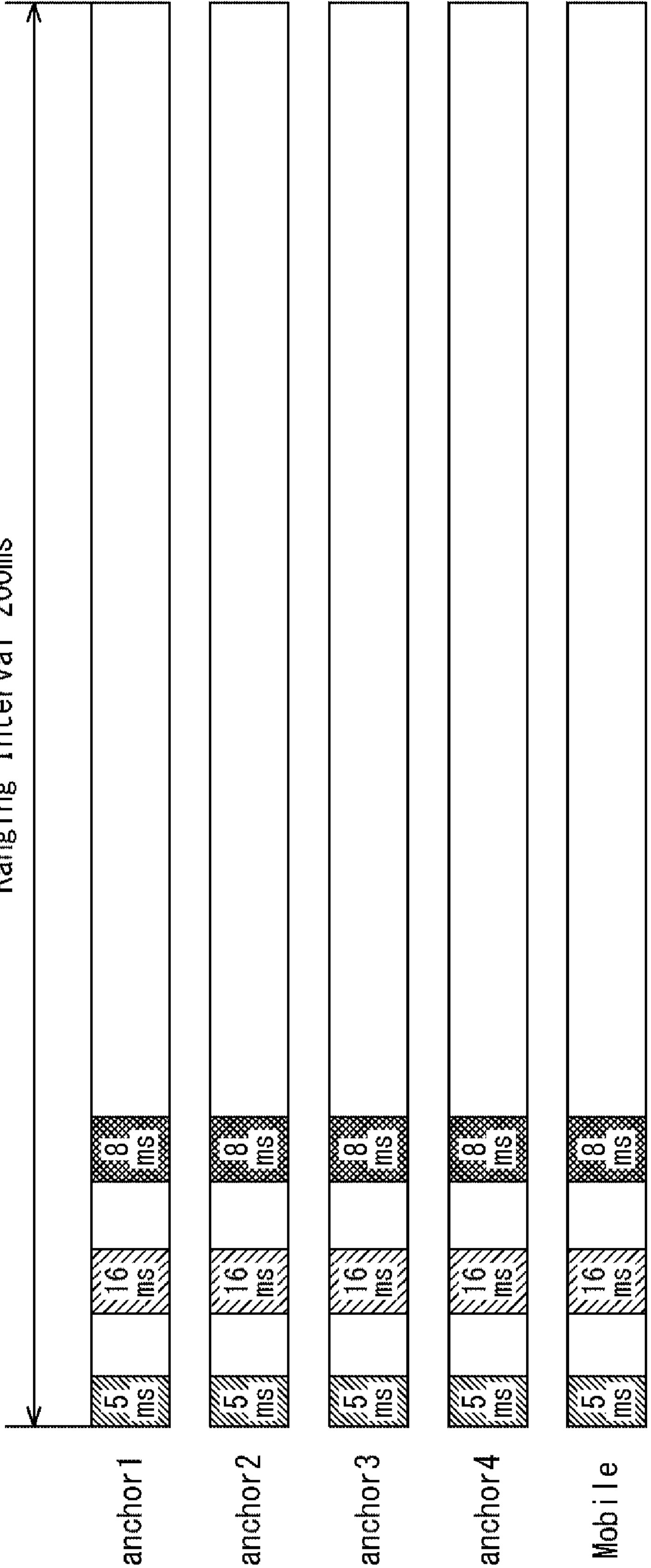
FIG. 18 is a diagram illustrating an example of a ranging time schedule.

FIG. 18 illustrates an example of a ranging time schedule of the UWB anchors 21-1 to 21-4 and the mobile terminal 13.

As illustrated in FIG. 18, 5 ms is provided as the ranging time for the Downlink TDoA BLINK, 16 ms is provided as the ranging time for the Uplink TDOA BLINK, and 8 ms is provided as the ranging time for the Uplink TDoA Start Request BLINK.

Note that where to arrange the BLINK periods of Downlink TDOA BLINK, Uplink TDoA BLINK, and Uplink TDoA Start Request BLINK in the ranging cycle depends on implementation. As illustrated in the drawing, they may be arranged with an interval therebetween, or may be arranged together.

Figure 19:
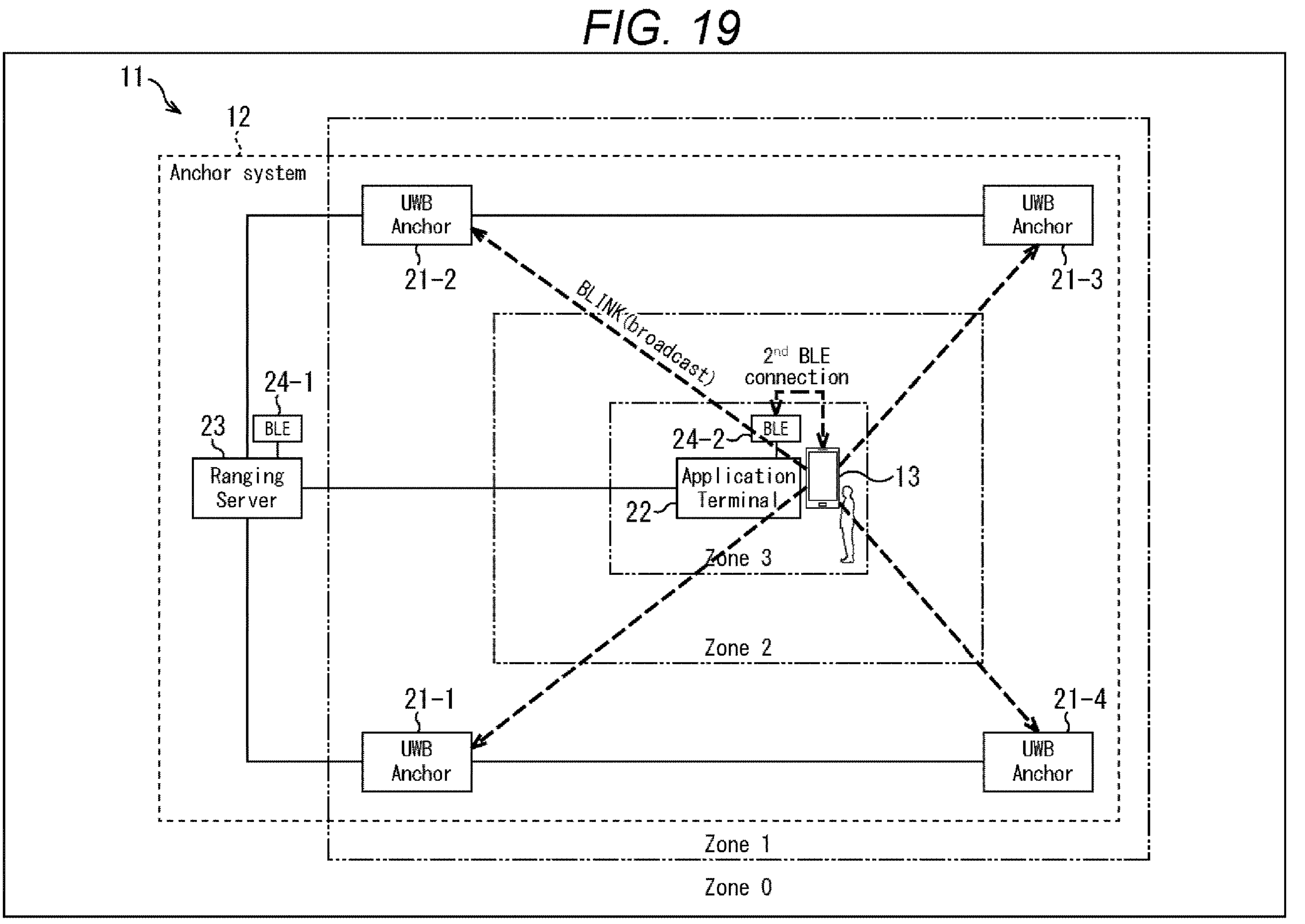
FIG. 19 is a diagram for explaining execution processing of application data communication.

FIG. 19 is a diagram for explaining execution processing of application data communication.

As illustrated in FIG. 19, the execution processing of the application data communication is performed, for example, when the user of the mobile terminal 13 enters the ranging zone Zone3 from the ranging zone Zone2 in order to make a payment.

The ranging server 23 of the anchor system 12 detects that the mobile terminal 13 enters the ranging zone Zone3 by Uplink TDoA positioning. The anchor system 12 instructs the application terminal 22 to transmit a second BLE ADV signal request to the mobile terminal 13, and the application terminal 22 starts transmitting the second BLE ADV signal from the BLE device 24-2. The second BLE ADV signal includes information specific to the mobile terminal 13 (for example, ADV_DIRECT_IND). Therefore, only the mobile terminal 13 responds and transmits a connection request for the second BLE connection to the anchor system 12. As a result, a second BLE connection is established between the BLE device 24-2 of the application terminal 22 and the mobile terminal 13.

After the second BLE connection is established, the application terminal 22 performs application data communication (for example, payment communication) with the mobile terminal 13 on the second BLE communication path.

Figure 20:
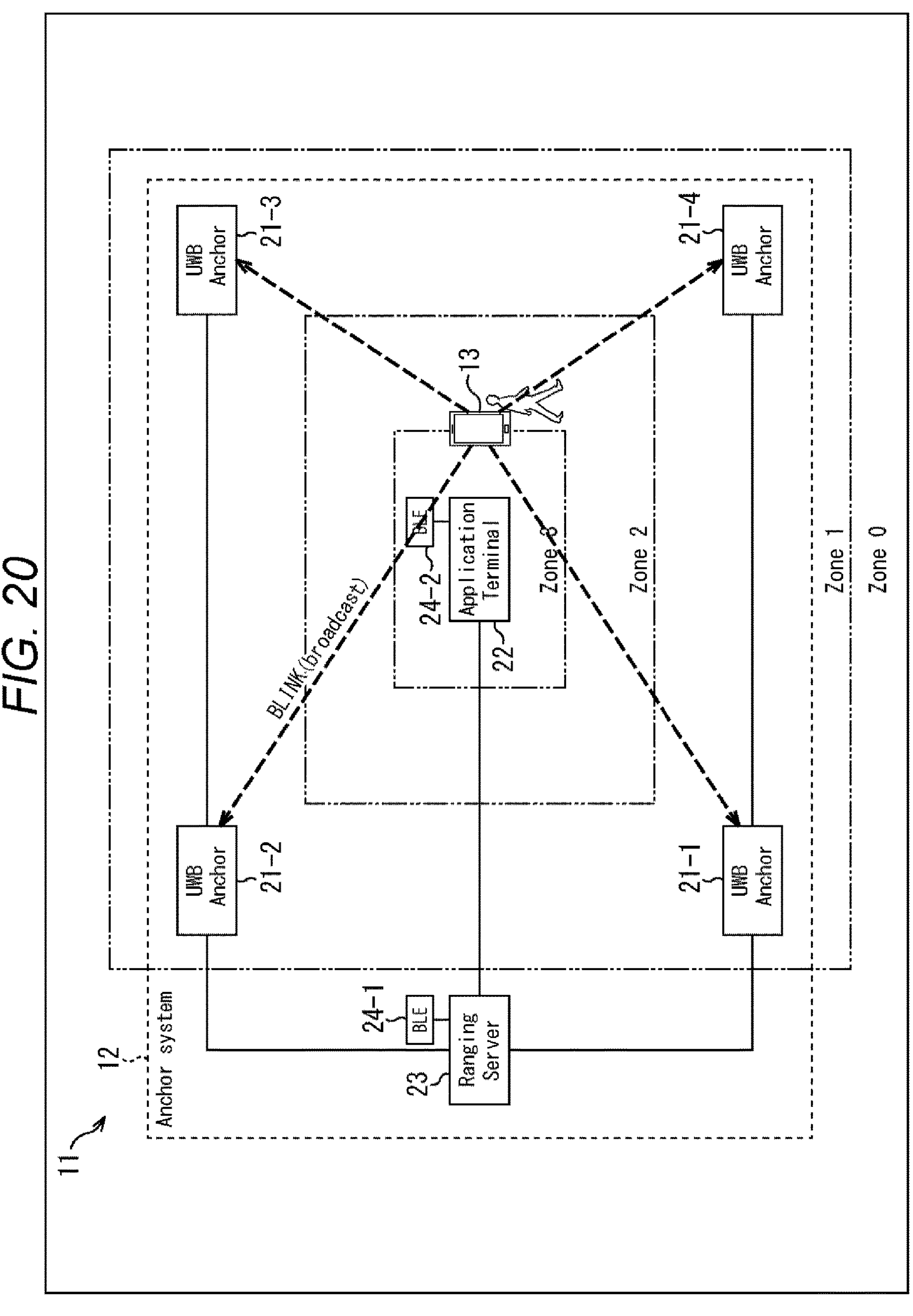
FIG. 20 is a diagram for explaining termination processing of application data communication.

FIG. 20 is a diagram for explaining termination processing of application data communication.

As illustrated in FIG. 20, the termination processing of the application data communication is performed when the user of the mobile terminal 13 leaves the ranging zone Zone3 to the ranging zone Zone2 after the completion of the application data communication.

When detecting that the mobile terminal 13 has left the ranging zone Zone3 by the continuing Uplink TDoA positioning, the ranging server 23 of the anchor system 12 notifies the application terminal 22 of the leaving of the mobile terminal 13 from the ranging zone Zone3. Upon receiving the notification of the mobile terminal 13 leaving, the application terminal 22 disconnects the second BLE connection with the mobile terminal 13.

Here, as another pattern, the application terminal 22 may immediately disconnect the second BLE connection after the application data communication is completed. Alternatively, when the user of the mobile terminal 13 performs an end request input or the like on the user interface of the application on the mobile terminal 13, the second BLE connection may be disconnected with the input as a trigger.

Note that, depending on the use case, a case is also assumed in which the mobile terminal 13 leaves the ranging zone Zone3 to the ranging zone Zone2 and then enters the ranging zone Zone3 again to perform application data communication. In such a case, after disconnecting the second BLE connection, the mobile terminal 13 may again initiate the second BLE scan to detect the second BLE ADV signal.

Figure 21:
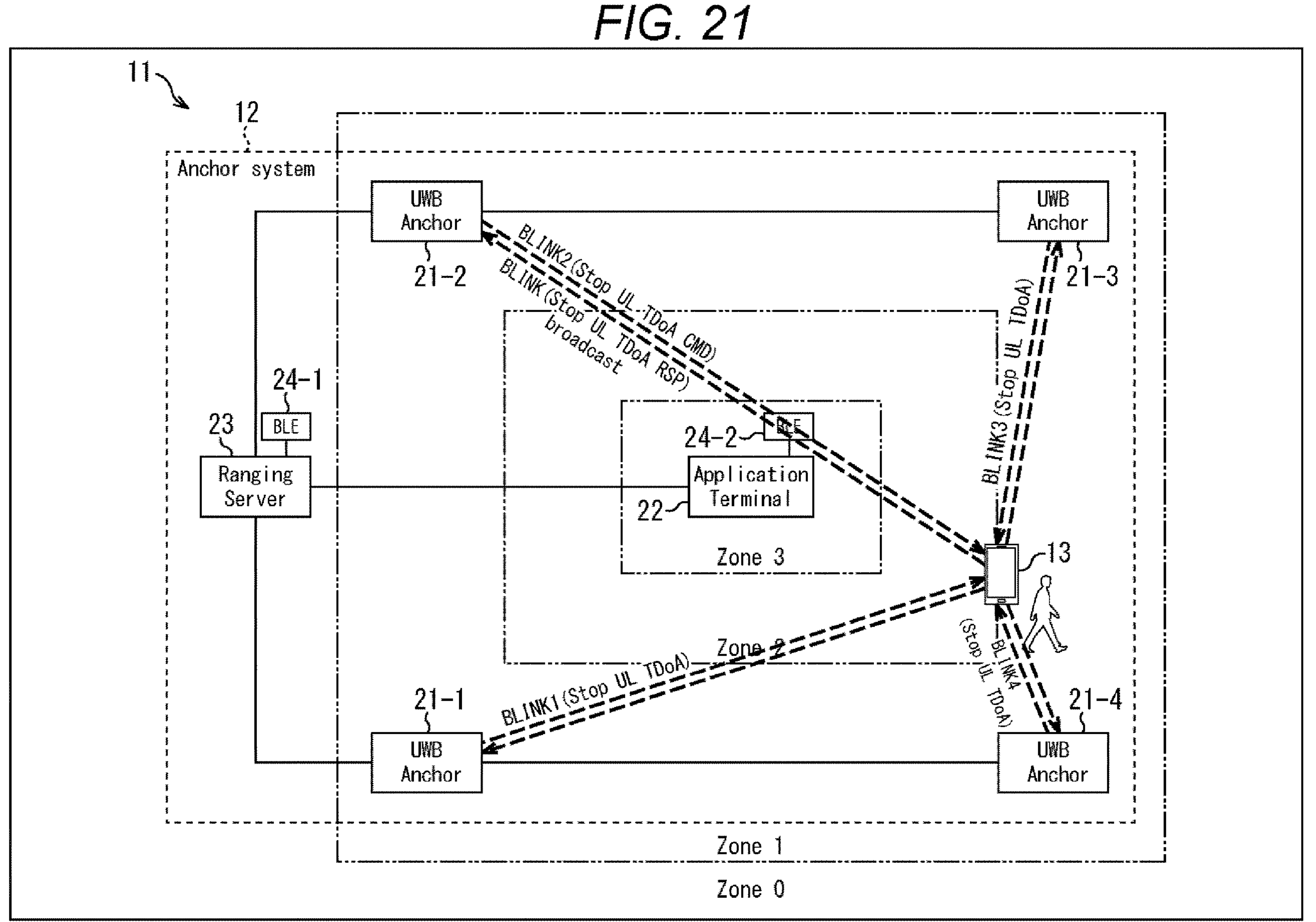
FIG. 21 is a diagram for explaining termination processing of Uplink TDoA ranging.

FIG. 21 is a diagram for explaining termination processing of Uplink TDoA ranging.

As illustrated in FIG. 21, the termination processing of the Uplink TDoA ranging is performed when the user of the mobile terminal 13 who has finished the application data communication moves away from the application terminal 22 and then leaves the ranging zone Zone2 to the ranging zone Zone1.

The ranging server 23 of the anchor system 12 detects that the mobile terminal 13 has left the ranging zone Zone3 by Uplink TDoA positioning. The anchor system 12 transmits a Downlink TDoA BLINK packet including the device ID information of the mobile terminal 13 and an Uplink TDoA end request command.

The mobile terminal 13 receives the Downlink TDoA BLINK packet and acquires the Uplink TDoA end request command included in the Downlink TDoA BLINK packet. Then, the mobile terminal 13 transmits an Uplink TDoA end response message on the Uplink TDoA BLINK packet at the time of transmitting the next Uplink TDoA BLINK packet, and thereafter stops transmitting the Uplink TDoA BLINK packet.

When receiving the Uplink TDoA end response message, the anchor system 12 opens the slot for Uplink TDoA BLINK in the ranging time schedule.

After stopping Uplink TDOA BLINK, the mobile terminal 13 starts self-positioning again by receiving a Downlink TDoA BLINK packet.

For example, thereafter, in a case where the mobile terminal 13 enters the ranging zone Zone2 again, the processes subsequent to the above-described Uplink TDoA start request notification processing (FIG. 11) are executed again.

Figure 22:
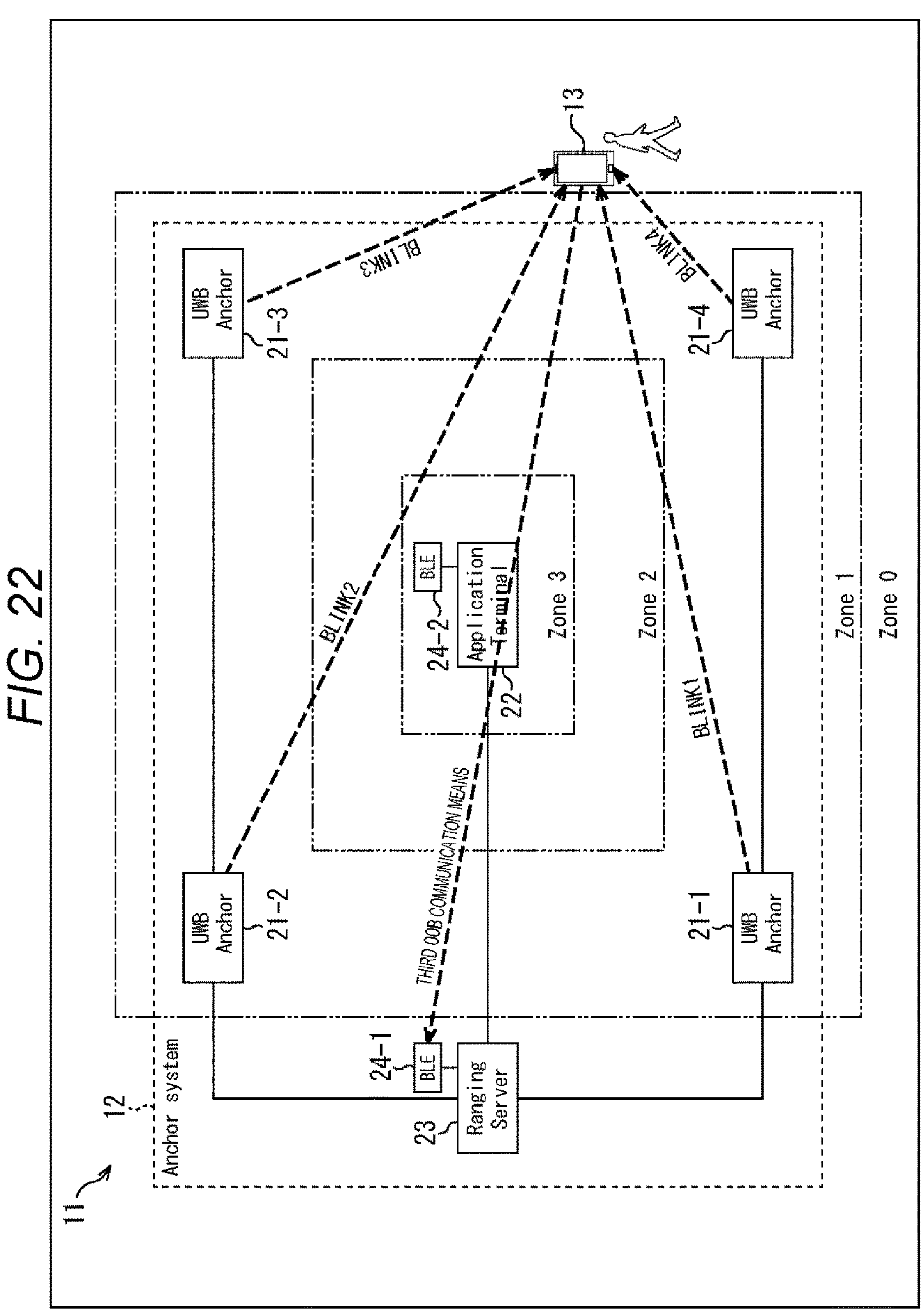
FIG. 22 is a diagram for explaining termination processing of Downlink TDoA ranging.

FIG. 22 is a diagram for explaining termination processing of Downlink TDoA ranging.

As illustrated in FIG. 22, when the user of the mobile terminal 13 leaves the ranging zone Zone1 to the ranging zone Zone0, termination processing of Downlink TDoA ranging is performed.

When detecting the leaving to the ranging zone Zone0 by the Downlink TDoA ranging, the mobile terminal 13 ends the Downlink TDoA ranging. When ending the Downlink TDoA ranging, the mobile terminal 13 can notify the anchor system 12 of the end of the Downlink TDoA ranging by using a third OOB communication means (Wireless Fidelity (WiFi), Mobile Network Operator (MNO) network, and the like). Note that, in a case where there is no third OOB communication means, the mobile terminal 13 may not provide a notification of the end of the Downlink TDoA ranging.

In a case where a notification of the end of the Downlink TDoA ranging by the third OOB communication means is provided to the mobile terminal 13, the anchor system 12 immediately clears the connection information of the mobile terminal 13. Meanwhile, in a case where a notification of the end of the Downlink TDoA ranging by the third OOB communication means is not provided to the mobile terminal 13, the anchor system 12 clears the connection information of the mobile terminal 13 after a certain period of time (for example, 1 hour) has elapsed since the connection.

As described above, in the payment processing system 11, the positioning method can be switched for each of the ranging zones Zone1 to Zone3 set according to the distance and range from the application terminal 22. For example, in the ranging zone Zone1 that is a distant wide area, positioning is performed on the mobile terminal 13 side by the Downlink TDoA method. Further, in the ranging zone Zone2 closer to the application terminal 22 than the ranging zone Zone1, the mobile terminal 13 notifies the anchor system 12 side of entry into the ranging zone Zone2, and performs positioning on the anchor system 12 side by the Uplink TDoA method. Then, when the mobile terminal 13 enters the ranging zone Zone3, which is a narrow area in the vicinity where payment communication is performed, the application terminal 22 performs payment data communication by BLE communication.

In order to perform communication necessary for switching of such a positioning method and operation control, bidirectional communication is performed by including device ID information unique to the mobile terminal 13 in the Downlink BLINK packet and the Uplink BLINK packet. Then, the self-positioning of the mobile terminal 13 and the positioning of the mobile terminal 13 on the anchor system 12 side are combined and switched according to the position of the mobile terminal 13, whereby the interference problem at the time of UWB data communication, the interference problem at the time of UWB distance measurement communication, and the UWB and BLE link budget problems can be solved. As a result, in the payment processing system 11, the anchor system 12 can perform connection and payment processing with a large number of mobile terminals 13.

Processing Example of Payment Processing

Payment processing executed in the payment processing system 11 will be described with reference to sequence diagrams illustrated in FIGS. 23 to 25.

In step S21, the mobile terminal 13 starts the first BLE scan.

In step S22, the anchor system 12 transmits a first BLE ADV signal.

In step S23, the mobile terminal 13 transmits a connection request to the anchor system 12 in response to receiving the first BLE ADV signal transmitted from the anchor system 12 in step S22.

In step S24, the first BLE communication is performed between the anchor system 12 and the mobile terminal 13, and ranging setting, acquisition of map information, exchange of device ID information, and the like are performed. Then, the mobile terminal 13 starts Downlink TDoA positioning.

In step S25, the anchor system 12 disconnects the first BLE communication with the mobile terminal 13.

In step S26, the anchor system 12 transmits a Downlink BLINK packet from the UWB anchors 21-1 to 21-4, for example, at the timing of every 1 ms as described above.

In step S27, the mobile terminal 13 performs positioning calculation on the basis of the time difference between the arrival times at which the Downlink BLINK packets transmitted from the UWB anchors 21-1 to 21-4 arrive at the mobile terminal 13 and the position information of the UWB anchors 21-1 to 21-4.

Thereafter, similarly, transmission of a Downlink BLINK packet from the UWB anchors 21-1 to 21-4 and positioning calculation by the mobile terminal 13 are repeatedly performed. Then, when entry of the mobile terminal 13 into the ranging zone Zone2 is detected by the positioning calculation performed in step S29 on the basis of the Downlink BLINK packets transmitted from the UWB anchors 21-1 to 21-4 in step S28, the process proceeds to step S30.

In step S30, the mobile terminal 13 transmits an Uplink TDoA BLINK packet (FIG. 12) in which the device ID information of the mobile terminal 13 and the Uplink TDoA Start Request message are stored in the payload to the anchor system 12.

In step S31, the anchor system 12 transmits a Downlink BLINK packet including Uplink TDoA Start Response in response to receiving the Uplink TDoA BLINK packet transmitted in step S30. As illustrated in FIG. 15 described above, the device ID information and the Uplink Blink Slot information are stored in the payload of the Downlink BLINK packet.

In step S32, the mobile terminal 13 starts the second BLE scan.

In step S33, the mobile terminal 13 transmits an Uplink TDOA BLINK packet.

In step S34, in the anchor system 12, the ranging server 23 performs positioning calculation on the basis of a time difference between arrival times at which the Uplink TDoA BLINK packet transmitted from the mobile terminal 13 arrives at the UWB anchors 21-1 to 21-4 and position information of the UWB anchors 21-1 to 21-4.

Thereafter, transmission of a Downlink BLINK packet from the UWB anchors 21-1 to 21-4 (step S35), transmission of an Uplink TDoA BLINK packet from the mobile terminal 13 (step S36), and positioning calculation by the ranging server 23 are repeatedly performed. Then, on the basis of the Uplink TDoA BLINK packet transmitted from the mobile terminal 13 in step S37, when it is detected that the mobile terminal 13 has entered the ranging zone Zone3 by the positioning calculation performed in step S38, the process proceeds to step S39.

In step S39, in the anchor system 12, the application terminal 22 transmits the second BLE ADV signal from the BLE device 24-2.

In step S40, in response to receiving the second BLE ADV signal transmitted in step S39, the mobile terminal 13 transmits a connection request for the second BLE connection to the anchor system 12. As a result, a second BLE connection is established between the BLE device 24-2 of the application terminal 22 and the mobile terminal 13.

In step S41, second BLE communication is performed between the anchor system 12 and the mobile terminal 13, and application data communication (for example, payment communication) is performed.

Then, when the application data communication ends, transmission of a Downlink BLINK packet from the UWB anchors 21-1 to 21-4 (step S42), transmission of an Uplink TDoA BLINK packet from the mobile terminal 13 (step S43), and positioning calculation by the ranging server 23 are repeatedly performed. Thereafter, when it is detected by the positioning calculation performed in step S44 that the mobile terminal 13 has left the ranging zone Zone3, the process proceeds to step S45.

In step S45, the anchor system 12 disconnects the second BLE connection with the mobile terminal 13.

In step S46, the mobile terminal 13 starts the second BLE scan, and transmission of a Downlink BLINK packet from the UWB anchors 21-1 to 21-4 (step S47), transmission of an Uplink TDoA BLINK packet from the mobile terminal 13 (step S48), and positioning calculation by the ranging server 23 (step S49) are repeatedly performed.

Then, in response to the Downlink BLINK packets transmitted from the UWB anchors 21-1 to 21-4 in step S50, when it is detected by the positioning calculation performed in step S52 that the mobile terminal 13 has left the ranging zone Zone2 on the basis of the Uplink TDoA BLINK packet transmitted from the mobile terminal 13 in step S51, the process proceeds to step S53.

In step S53, the anchor system 12 transmits a Downlink TDoA BLINK packet including the device ID information of the mobile terminal 13 and the Uplink TDoA end request command to the mobile terminal 13.

In step S54, in response to receiving the Uplink TDoA end request command transmitted in step S53, the mobile terminal 13 transmits an Uplink TDoA BLINK packet including an Uplink TDoA end response message to the anchor system 12.

In step S55, the anchor system 12 opens the slot for Uplink TDOA BLINK in the ranging time schedule in response to reception of the Uplink TDoA end response message transmitted in step S54.

In step S56, after stopping the Uplink TDoA ranging and the second BLE scan, the mobile terminal 13 starts self-positioning again by receiving a Downlink TDOA BLINK packet.

Thereafter, transmission of a Downlink BLINK packet from the UWB anchors 21-1 to 21-4 (step S57) and positioning calculation by the mobile terminal 13 (step S58) are repeatedly performed. Then, when it is detected that the mobile terminal 13 has left and entered the ranging zone Zone1 by the positioning calculation performed in step S61 on the basis of the Downlink BLINK packets transmitted from the UWB anchors 21-1 to 21-4 in step S60, the process proceeds to step S62.

In step S62, the mobile terminal 13 notifies the anchor system 12 of the end of the Downlink TDoA ranging by the third OOB communication means.

In step S63, the mobile terminal 13 ends the Downlink TDoA ranging and starts the first BLE scan.

In step S64, the anchor system 12 clears the connection information of the mobile terminal 13.

<Abnormal System Processing>

Figure 26:
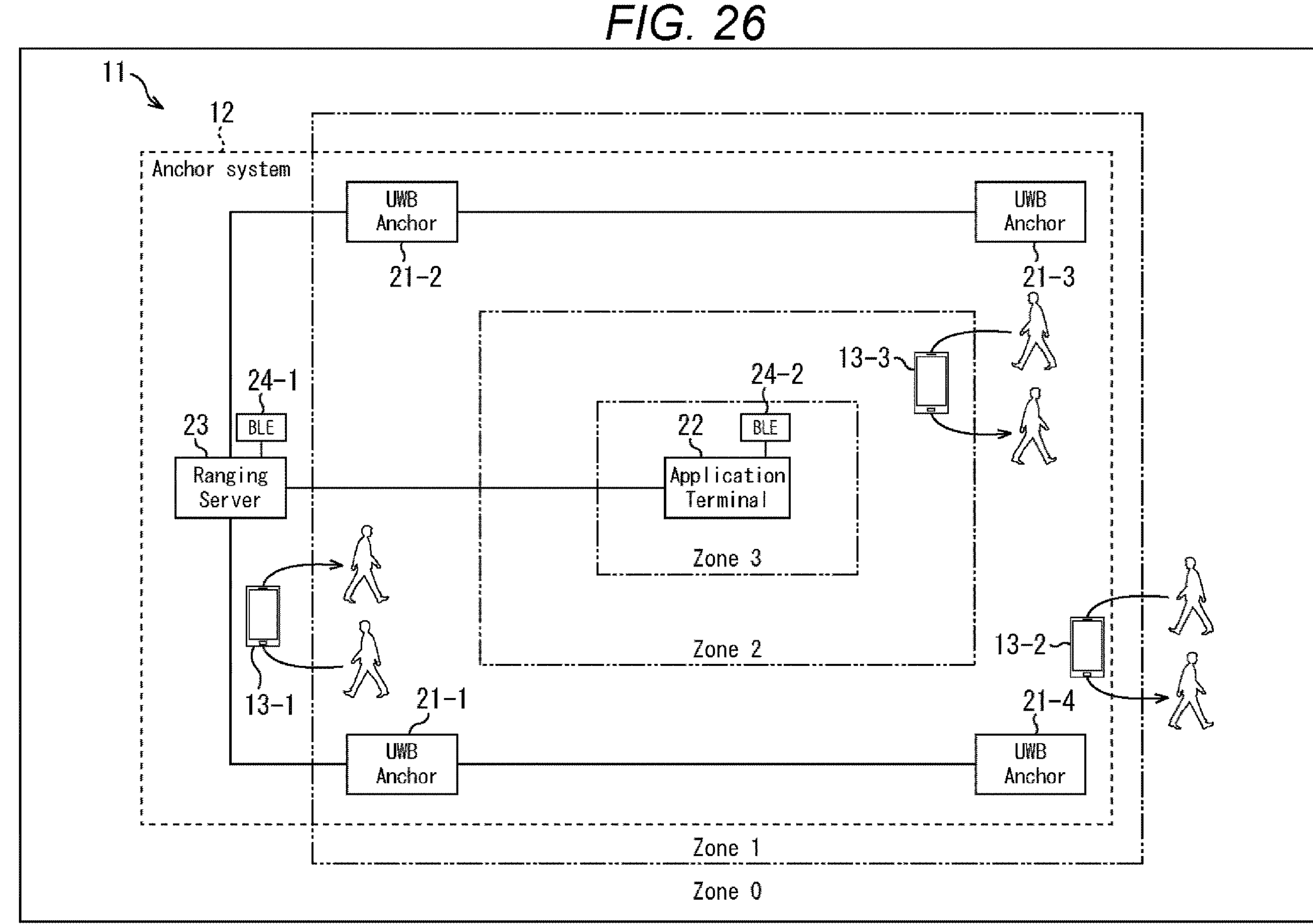
FIG. 26 is a diagram for explaining abnormal system processing.

FIGS. 26 and 27 are diagrams for explaining abnormal system processing assumed in the payment processing system 11.

As in the mobile terminal 13-1 illustrated in FIG. 26, in a case of returning to the ranging zone Zone1 immediately after leaving the ranging zone Zone1 to the ranging zone Zone0, a case is assumed in which the mobile terminal 13-1 enters the ranging zone Zone1 again before the anchor system 12 clears the connection information of the mobile terminal 13-1. In this case, after the mobile terminal 13-1 finishes the Downlink TDoA ranging, in a case of entering the ranging zone Zone1 again before the anchor system 12 clears the connection information of the mobile terminal 13-1, the connection information of the mobile terminal 13 is only required to be overwritten at the time of reconnection.

As in the mobile terminal 13-2 illustrated in FIG. 26, a case is assumed in which the mobile terminal enters the ranging zone Zone1 from the ranging zone Zone0 and returns to the ranging zone Zone0 without entering the ranging zone Zone2. In this case, the mobile terminal 13-2 is only required to notify the anchor system 12 of the end notification of the Downlink TDoA ranging by the third OOB communication means, or the anchor system 12 side is only required to clear the connection information of the mobile terminal 13-2 after a certain period of time (for example, 1 hour) has elapsed after connection.

As in the mobile terminal 13-3 illustrated in FIG. 26, a case is assumed in which after entering the ranging zone Zone2 from the ranging zone Zone1, the mobile terminal returns to the ranging zone Zone1 without entering the ranging zone Zone3. In this case, since the anchor system 12 can detect that the mobile terminal 13-3 has left the ranging zone Zone1 by the Uplink TDoA ranging, it is only required to perform the above-described Uplink TDoA ranging termination processing (FIG. 21).

As in the mobile terminals 13-1 and 13-2 illustrated in FIG. 27, a case is assumed in which a user possesses a plurality of mobile terminals 13 corresponding to a payment application. In this case, a notification that the user possesses the plurality of mobile terminals 13 may be provided by using a display or the like of the application terminal 22, and the user may be caused to select the mobile terminal 13 to execute payment. Alternatively, when a plurality of mobile terminals 13 corresponding to a payment application such as a ticket gate machine is detected, an error notification may be performed.

In addition, in a case where it can be detected by UL TDoA positioning that a plurality of mobile terminals 13 is actually in the ranging zone Zone3, it is possible to implement either a response to be selected by the user or a response to be notified of an error as described above according to the requirement of the application.

By the way, it is assumed that a plurality of mobile terminals 13 is held in different places by the user, and for example, it is assumed that the mobile terminal 13-1 is held by hand and the mobile terminal 13-2 is put in a backpack. In such a case, since there is a difference in position between the mobile terminal 13-1 and the mobile terminal 13-2, there may be a situation where the mobile terminal 13-1 enters the ranging zone Zone3 and the mobile terminal 13-2 remains in the ranging zone Zone2. Therefore, in such a case, since the anchor system 12 can grasp the trajectory of the mobile terminals 13-1 and 13-2, it is possible to consider that the same user possesses those indicating the same trajectory in the ranging zone Zone2, and to take a similar measure to the case where the mobile terminals 13-1 and 13-2 simultaneously enter the ranging zone Zone3 as described above.

<State Machine of Mobile Terminal>

Figure 28:
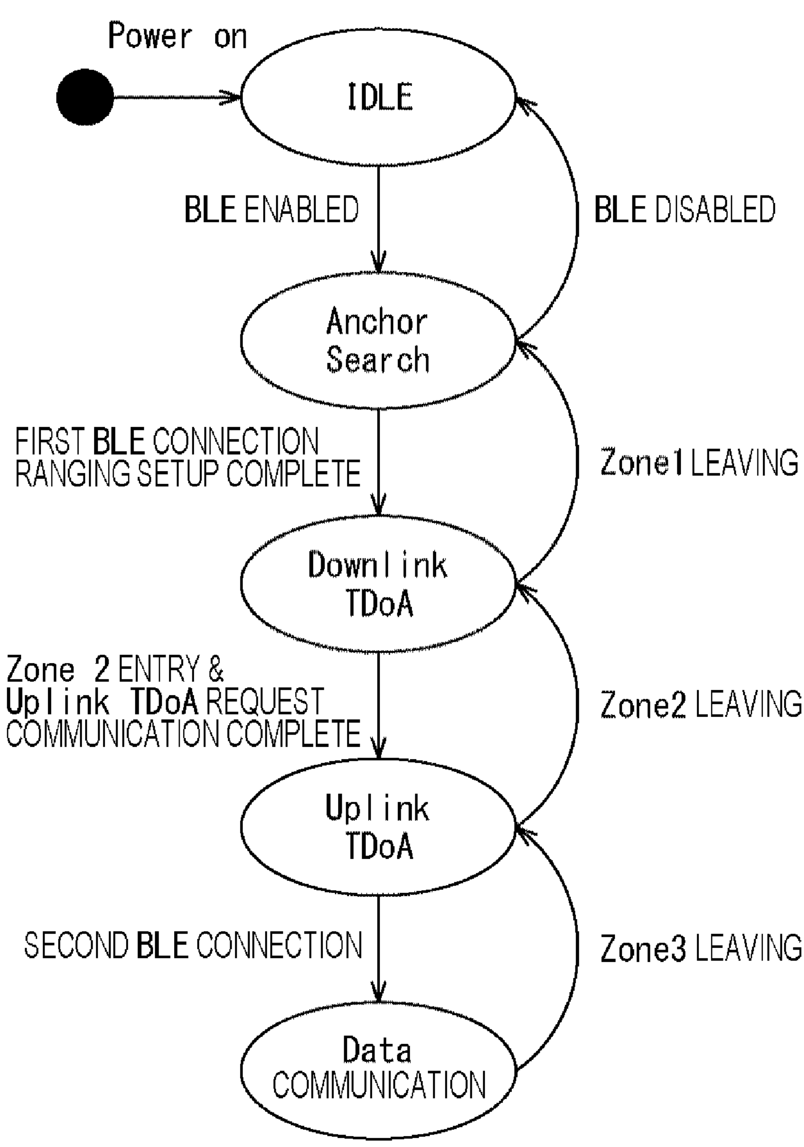
FIG. 28 is a diagram illustrating an example of a state machine of a mobile terminal.

FIG. 28 is a diagram illustrating a state machine of the mobile terminal 13.

When the mobile terminal 13 is powered on, it transitions to an idle state, and when the BLE chip 31 is enabled, the mobile terminal 13 transitions to an anchor search state that performs a first BLE scan to search the anchor system 12.

In the anchor search state, when the BLE chip 31 is disabled, the mobile terminal 13 returns to the idle state, while when the first BLE connection is established and preparations for Downlink TDoA ranging are completed, the mobile terminal 13 transitions to the Downlink TDoA state.

In the Downlink TDoA state, when the mobile terminal 13 leaves the ranging zone Zone1, the mobile terminal 13 returns to the Downlink TDoA state, while when entering the ranging zone Zone2 and completing the communication for requesting the start of the Uplink TDoA positioning, the mobile terminal transitions to the Uplink TDoA state.

In the Uplink TDoA state, when the mobile terminal 13 leaves the ranging zone Zone2, the mobile terminal 13 returns to the Uplink TDoA state, while when the second BLE connection is established, the mobile terminal 13 transitions to the data communication state.

In the data communication state, when the mobile terminal 13 leaves the ranging zone Zone3, the mobile terminal 13 returns to the Uplink TDoA state.

Configuration Example Including Plurality of Application Terminals

Figure 29:
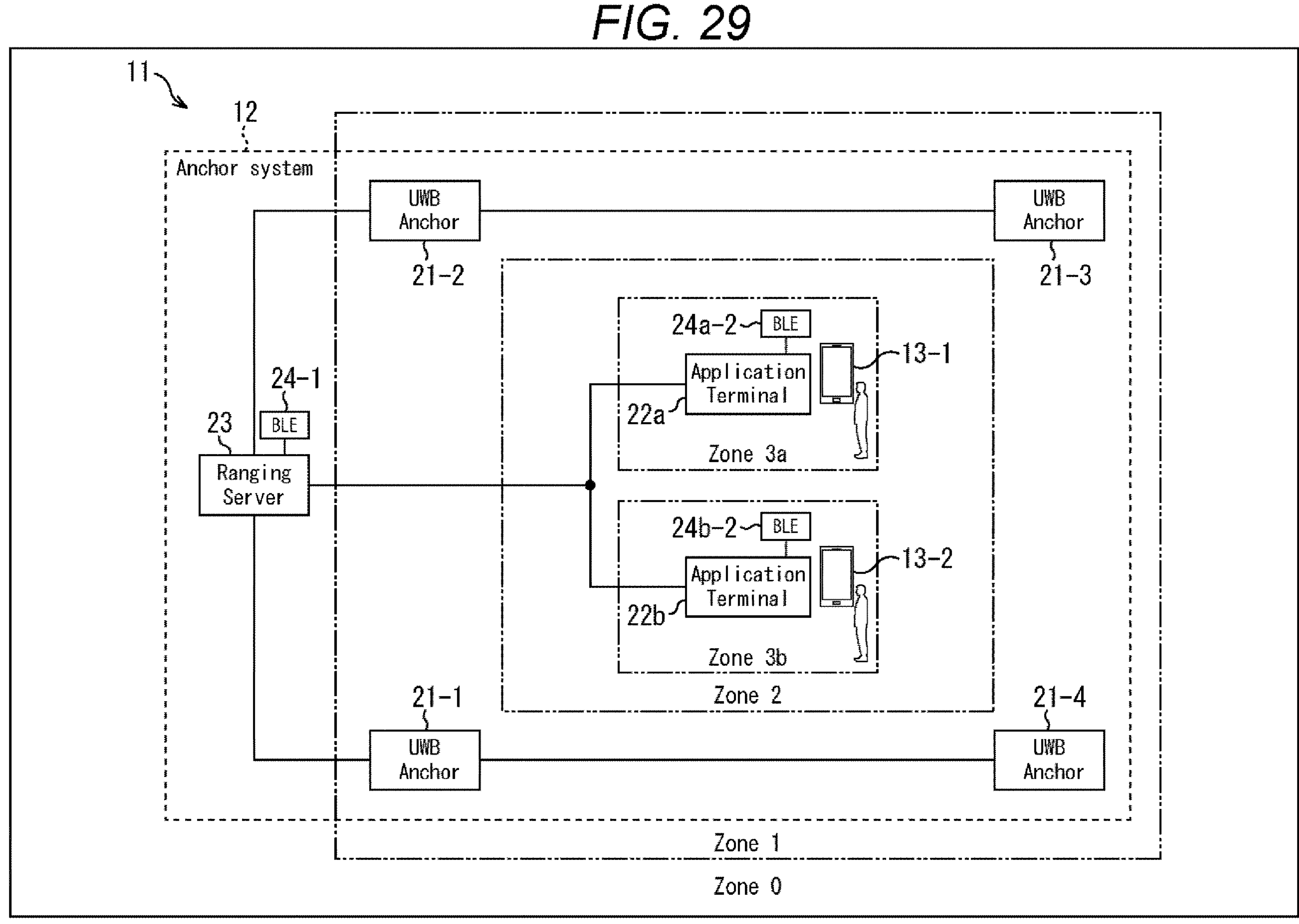
FIG. 29 is a diagram illustrating a configuration example including two application terminals.

FIG. 29 illustrates a configuration example including two application terminals **22*a* and 22*b***.

For example, even in the configuration in which the anchor system 12 includes the plurality of application terminals 22, the device search processing (FIG. 4), the BLE connection processing (FIG. 5), the Downlink TDoA positioning start processing (FIG. 6), the Uplink TDoA start request notification processing (FIG. 11), the Uplink TDoA positioning start request response processing (FIG. 14), and the Uplink TDoA start processing (FIG. 16) described above are similarly performed.

Here, execution processing of application data communication performed when the mobile terminal 13 enters the ranging zone Zone3 in a configuration in which the anchor system 12 includes a plurality of application terminals 22 will be described.

As illustrated in FIG. 29, in a configuration in which the anchor system 12 includes two application terminals **22*a* and 22*b*, it is necessary to appropriately perform pairing between the two application terminals 22***a* and 22*b* and the plurality of mobile terminals 13.

The anchor system 12 can recognize which mobile terminal 13 has entered which ranging zone Zone3 by the Uplink TDoA ranging. Therefore, appropriate pairing can be easily realized as follows.

The anchor system 12 detects that the mobile terminal 13-1 has entered the ranging zone Zone3a in which the application terminal 22*a* is installed by the Uplink TDoA ranging. Accordingly, the anchor system 12 instructs the application terminal 22*a* to transmit a second BLE ADV signal request to the mobile terminal 13-1, and the application terminal 22*a* starts transmitting the second BLE ADV signal.

This second BLE ADV signal contains information specific to the mobile terminal 13-1 (for example, ADV_DIRECT_IND), and only the mobile terminal 13-1 responds and transmits a connection request for the second BLE connection to the anchor system 12. As a result, a second BLE connection is established between a BLE device 24*a*-2 of the application terminal 22*a* and the mobile terminal 13-1. After the second BLE connection is established, the application terminal 22*a* performs application data communication (for example, payment communication) with the mobile terminal 13-1 on the second BLE communication path.

Meanwhile, when application data communication is being executed between the application terminal 22*a* and the mobile terminal 13-1, the anchor system 12 detects that the mobile terminal 13-2 has entered the ranging zone Zone3b in which the application terminal 22*b* is installed. Accordingly, the anchor system 12 instructs the application terminal 22*b* to transmit the second BLE ADV signal request to the mobile terminal 13-2, and the application terminal 22*b* starts transmitting the second BLE ADV signal.

This second BLE ADV signal contains information specific to the mobile terminal 13-2 (for example, ADV_DIRECT_IND), and only the mobile terminal 13-2 responds and transmits a connection request for the second BLE connection to the anchor system 12. As a result, a second BLE connection is established between a BLE device 24*b*-2 of the application terminal 22*b* and the mobile terminal 13-2. After the second BLE connection is established, the application terminal 22*b* performs application data communication (for example, payment communication) with the mobile terminal 13-2 on the second BLE communication path.

Second Configuration Example of Payment Processing System

Figure 30:
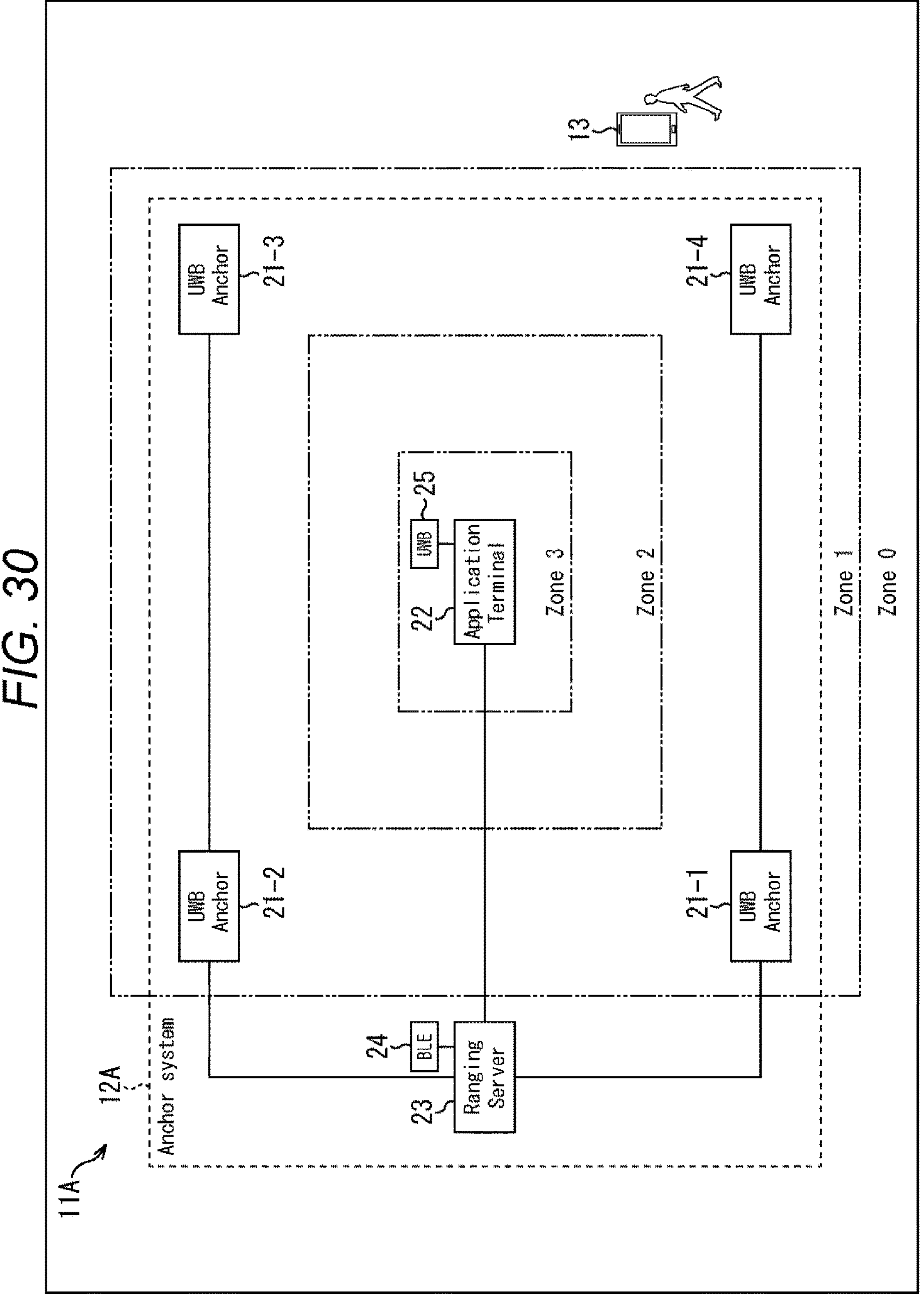
FIG. 30 is a block diagram illustrating a configuration example of a second embodiment of a payment processing system to which the present technology is applied.

FIG. 30 is a block diagram illustrating a configuration example of a second embodiment of a payment processing system to which the present technology is applied.

In a payment processing system 11A illustrated in FIG. 30, configurations common to those of the payment processing system 11 in FIG. 1 are denoted by the same reference numerals, and a detailed description thereof will be omitted. That is, the payment processing system 11A is common to the payment processing system 11 of FIG. 1 in that an anchor system 12A includes four UWB anchors 21-1 to 21-4, an application terminal 22, and a ranging server 23, and the application terminal 22 includes a BLE device 24.

Then, in the payment processing system 11A, the anchor system 12A has a configuration different from that of the payment processing system 11 in FIG. 1 in that the ranging server 23 includes a UWB data communication anchor 25.

The UWB data communication anchor 25 performs application data communication using UWB in-band communication with the mobile terminal 13. For example, UWB in-band communication is suitable for use in a use case requiring high-speed communication such as a ticket gate.

Figure 31:
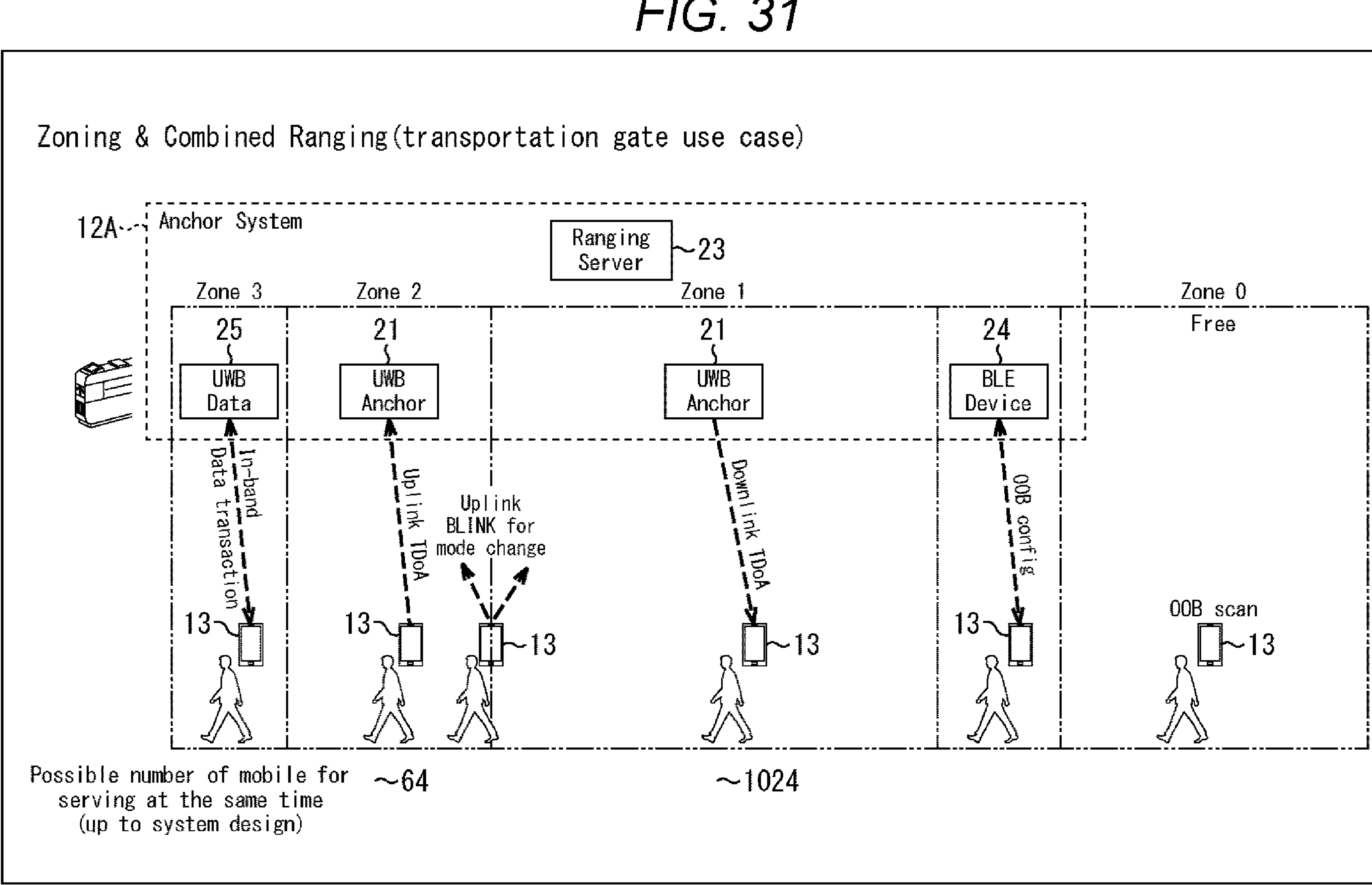
FIG. 31 is a diagram for explaining processing performed for each ranging zone.

Processing performed in each of the ranging zones Zone0 to Zone3 in the payment processing system 11A will be described with reference to FIG. 31.

Figure 2:
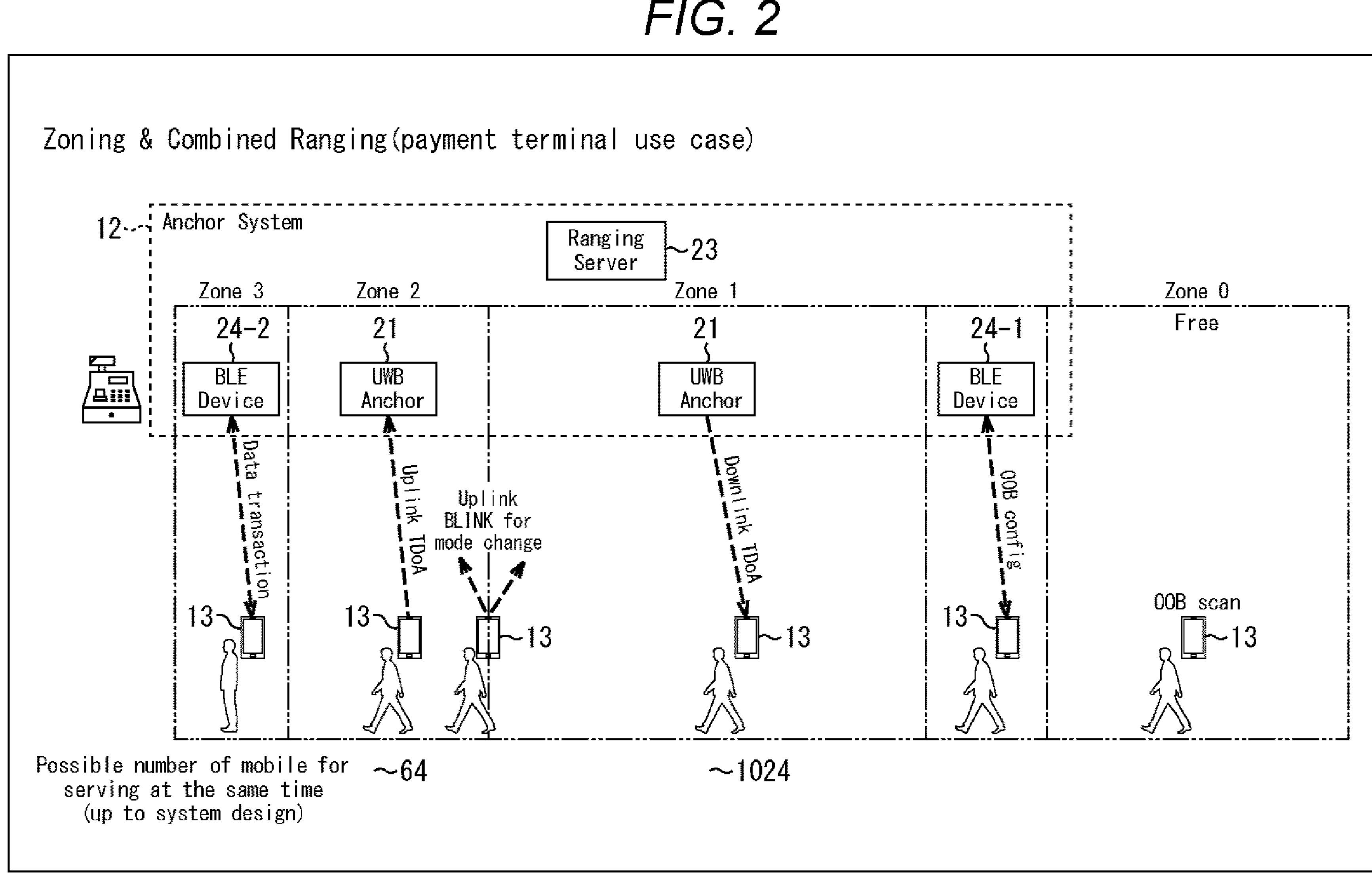
FIG. 2 is a diagram for explaining processing performed for each ranging zone.

Processing similar to that described with reference to FIG. 2 is performed in the ranging zones Zone0 to Zone2.

Then, when the mobile terminal 13 enters the ranging zone Zone3 (a narrow area in the vicinity) where payment communication is performed, a notification of entry into the ranging zone Zone3 is provided to the application terminal 22. The application terminal 22 performs payment data communication (for example, fare payment at a ticket gate) by UWB in-band communication of the UWB data communication anchor 25.

A configuration example of the anchor system 12A and the mobile terminal 13 and a flow of data between the anchor system 12A and the mobile terminal 13 will be described with reference to FIG. 32.

As described with reference to FIG. 30, the anchor system 12A includes the UWB anchors 21-1 to 21-4, the application terminal 22, the ranging server 23, the BLE device 24, and the UWB data communication anchor 25.

The mobile terminal 13 includes the BLE chip 31, the UWB chip 32, the eSE chip 33, the device host 34, the ranging software library 35, and the payment application 36, as described with reference to FIG. 3.

The BLE chip 31 performs first BLE communication with the BLE device 24.

The UWB chip 32 performs UWB communication with the UWB anchors 21-1 to 21-4. The UWB chip 32 transmits an Uplink TDoA BLINK packet to the UWB anchors 21-1 to 21-4, and receives a Downlink BLINK packet transmitted from the UWB anchors 21-1 to 21-4.

Further, the UWB chip 32 performs application data communication using UWB in-band communication with the UWB data communication anchor 25, and directly exchanges data with the NFC applet 37 of the eSE chip 33. That is, in application data communication using UWB in-band communication, data can be exchanged at high speed without passing through the payment application 36.

The device host 34 executes a positioning application that performs positioning by switching a positioning method for measuring a location of the mobile terminal 13, and performs positioning when the mobile terminal 13 is in the ranging zone Zone1.

FIG. 33 is a diagram for explaining execution processing of application data communication using UWB in-band communication.

For example, in the payment processing system 11A, the device search processing (FIG. 4), the BLE connection processing (FIG. 5), the Downlink TDoA positioning start processing (FIG. 6), the Uplink TDoA start request notification processing (FIG. 11), the Uplink TDoA positioning start request response processing (FIG. 14), and the Uplink TDoA start processing (FIG. 16) described above are performed similarly to the payment processing system 11 in FIG. 1.

As illustrated in FIG. 33, execution processing of application data communication using UWB in-band communication is performed when the mobile terminal 13 enters the ranging zone Zone3.

The ranging server 23 of the anchor system 12A detects that the mobile terminal 13 enters the ranging zone Zone3 by Uplink TDoA positioning. The anchor system 12A transmits an application data communication start command to the mobile terminal 13 by using the TDoA bidirectional communication channel. This command includes information necessary for data communication, such as the MAC address and preamble pattern of the UWB data communication anchor 25.

When receiving the application data communication start message on the TDoA bidirectional communication channel, the mobile terminal 13 returns an application data communication start response on the TDoA bidirectional communication channel. Then, the mobile terminal 13 transitions to the UWB data communication state and waits for the UWB data packet from the UWB data communication anchor 25 of the application terminal 22.

The anchor system 12A notifies the application terminal 22 of information necessary for UWB data communication, such as the MAC address of the mobile terminal 13, and also instructs the mobile terminal 13 to start application data communication.

The application terminal 22 performs application data communication (for example, payment communication) by the UWB data communication anchor 25 with the mobile terminal 13 by UWB in-band communication. In this case, in order to avoid interference with the Uplink TDoA ranging and the Downlink TDoA ranging, a data communicable section is provided on the ranging time schedule, and the application terminal 22 and the mobile terminal 13 perform application data communication only in this data communicable section on the UWB in-band.

Figure 34:
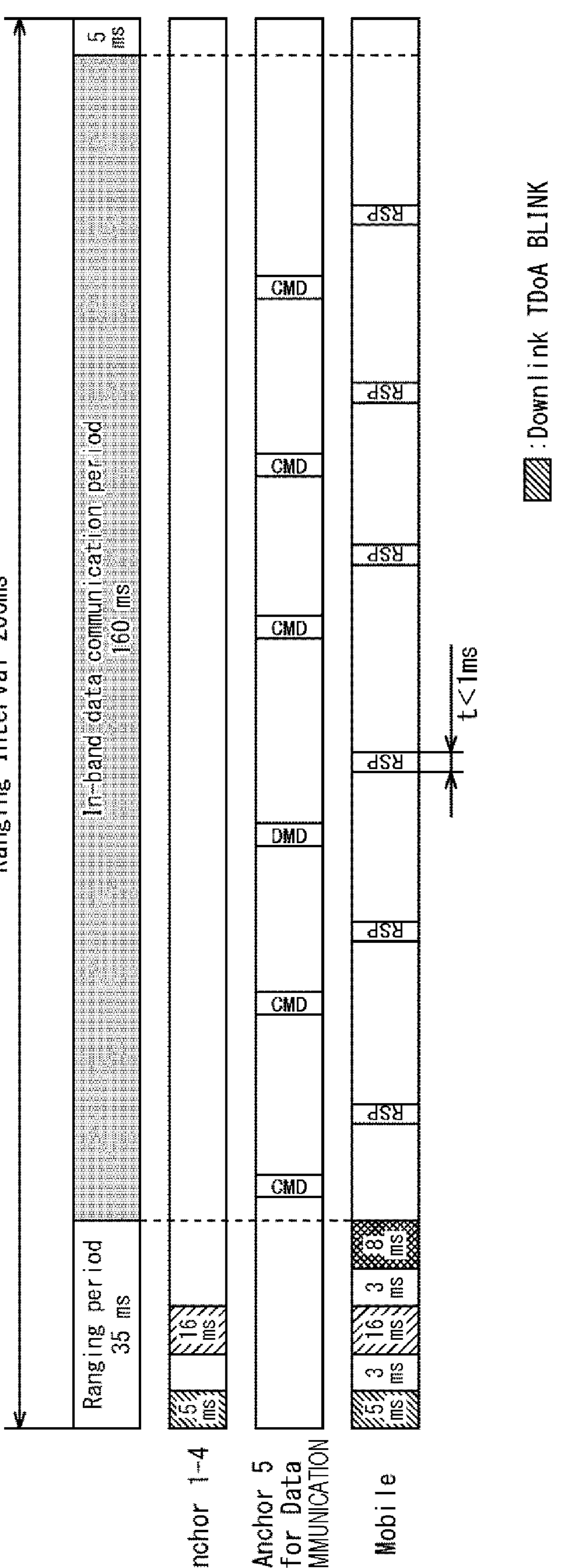
FIG. 34 is a diagram illustrating an example of a ranging time schedule at the time of UWB in-band application data communication.

FIG. 34 is a diagram illustrating an example of a ranging time schedule including an in-band data communication section during UWB in-band application data communication.

In the payment processing system 11A, a ranging interval (200 ms) is divided into a ranging section (35 ms), a data communication section (160 ms), and a guard time section (5 ms), and data communication is mutually performed at arbitrary timing within the data communication slot.

In the payment processing system 11A, the UWB data communication anchor 25 and the mobile terminal 13 can start data communication only in the data communication section, and transmission in the guard time section and the ranging section is prohibited.

For example, since the data communication rate is as fast as 6.81 Mbps and the communication time is short (for example, DMD and RSP are less than or equal to 1 ms), even if data communication is performed between the UWB anchors 21-1 to 21-4 and the mobile terminal 13 at any timing, the probability of interference is low. In addition, during high pulse repetition frequency (HPRF), the data communication rate becomes 27.24 Mbps, and the interference probability further decreases.

In addition, by changing the pattern of the preamble for each pair of the UWB data communication anchor 25 and the mobile terminal 13, it is possible to avoid erroneous reception of packets from other pairs.

Note that, even in the configuration in which the payment processing system 11A includes the plurality of application terminals 22, it is possible to easily cope with the execution processing of the application data communication similarly to the above description with reference to FIG. 29.

Figure 35:
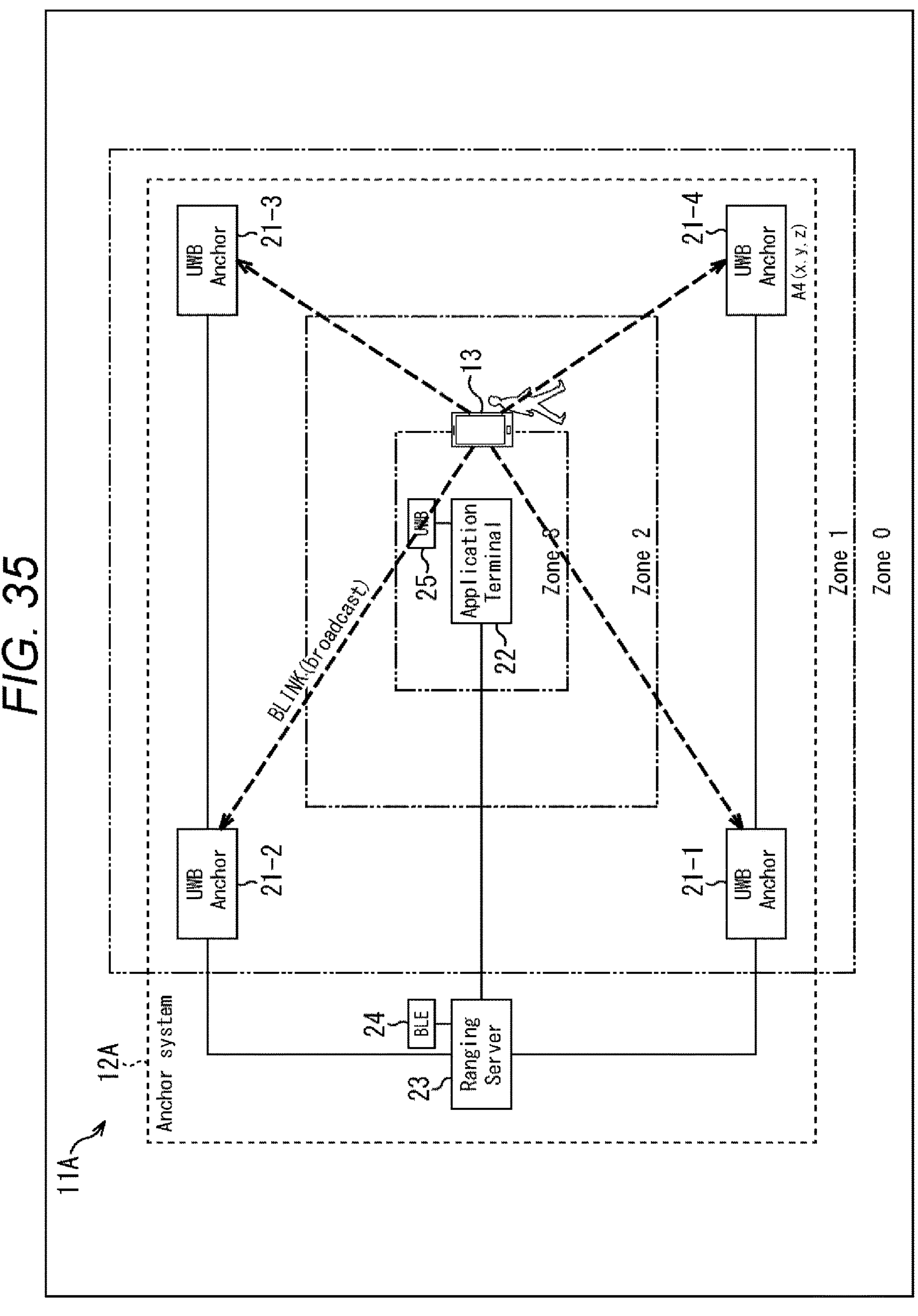
FIG. 35 is a diagram for explaining termination of application data communication during UWB in-band communication.

FIG. 35 is a diagram for explaining termination processing of application data communication during UWB in-band communication.

As illustrated in FIG. 35, the termination processing of the application data communication during the UWB in-band communication is performed when the user of the mobile terminal 13 leaves the ranging zone Zone3 to the ranging zone Zone2 after the application data communication is completed.

For example, after the application data communication is completed, the application terminal 22 notifies the anchor system 12A of the completion of the application data communication. Then, when detecting the leaving of the mobile terminal 13 from the ranging zone Zone3 by the continuing Uplink TDoA positioning, the anchor system 12A notifies the mobile terminal 13 of the application data communication end command using the TDoA bidirectional communication channel.

Upon receiving the application data communication end notification, the mobile terminal 13 ends the UWB data communication and returns an application data communication end response to the anchor system 12A using the TDoA bidirectional communication channel.

Thereafter, in the payment processing system 11A, the termination processing of the Uplink TDoA ranging (FIG. 21) and the termination processing of the Downlink TDoA ranging (FIG. 22) described above are performed similarly to the payment processing system 11 in FIG. 1.

Figure 36:
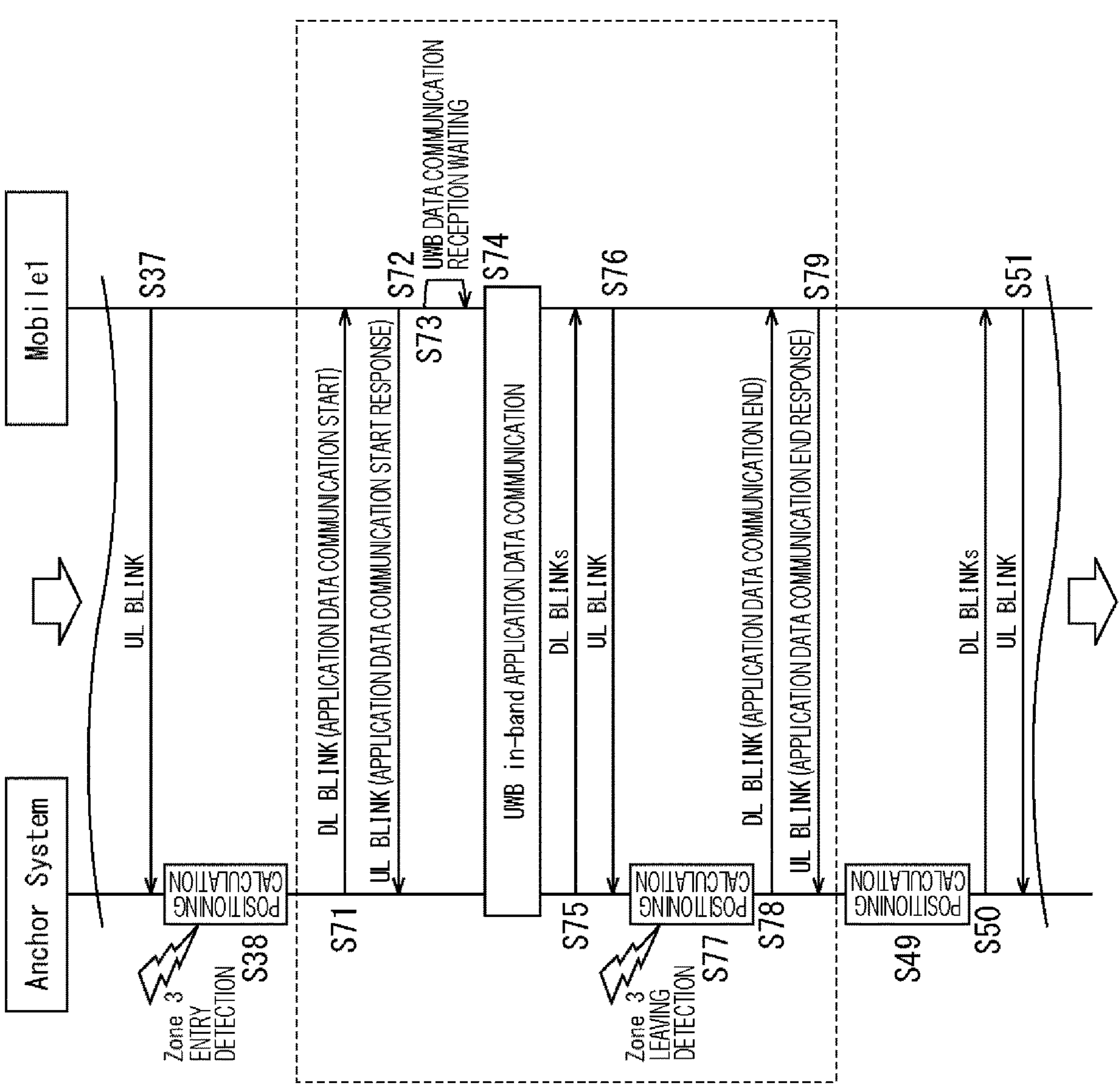
FIG. 36 is a sequence diagram for explaining payment processing.

FIG. 36 is a sequence diagram illustrating payment processing executed in the payment processing system 11A.

Figure 24:
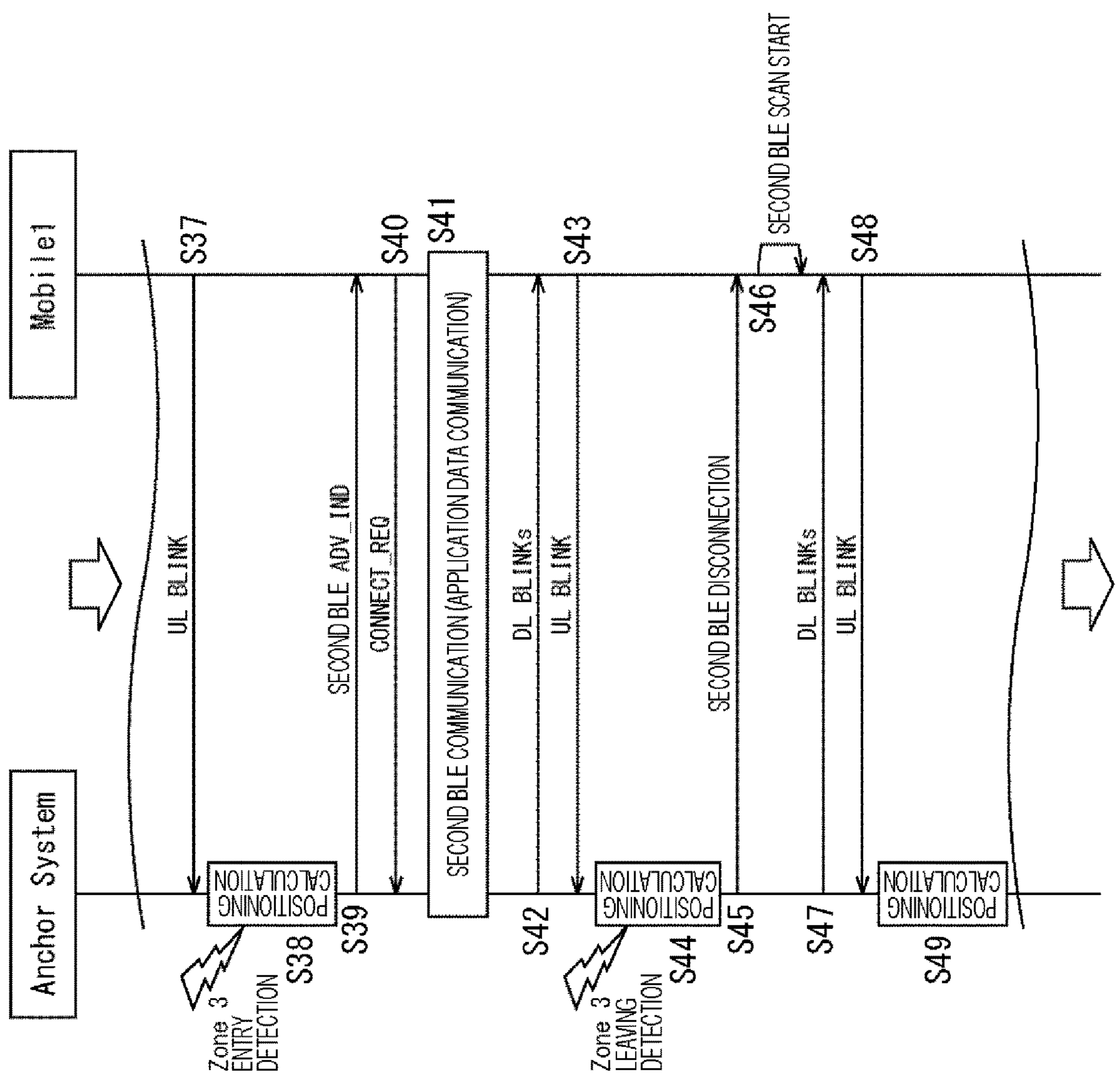
FIG. 24 is a sequence diagram for explaining payment processing.
Figure 25:
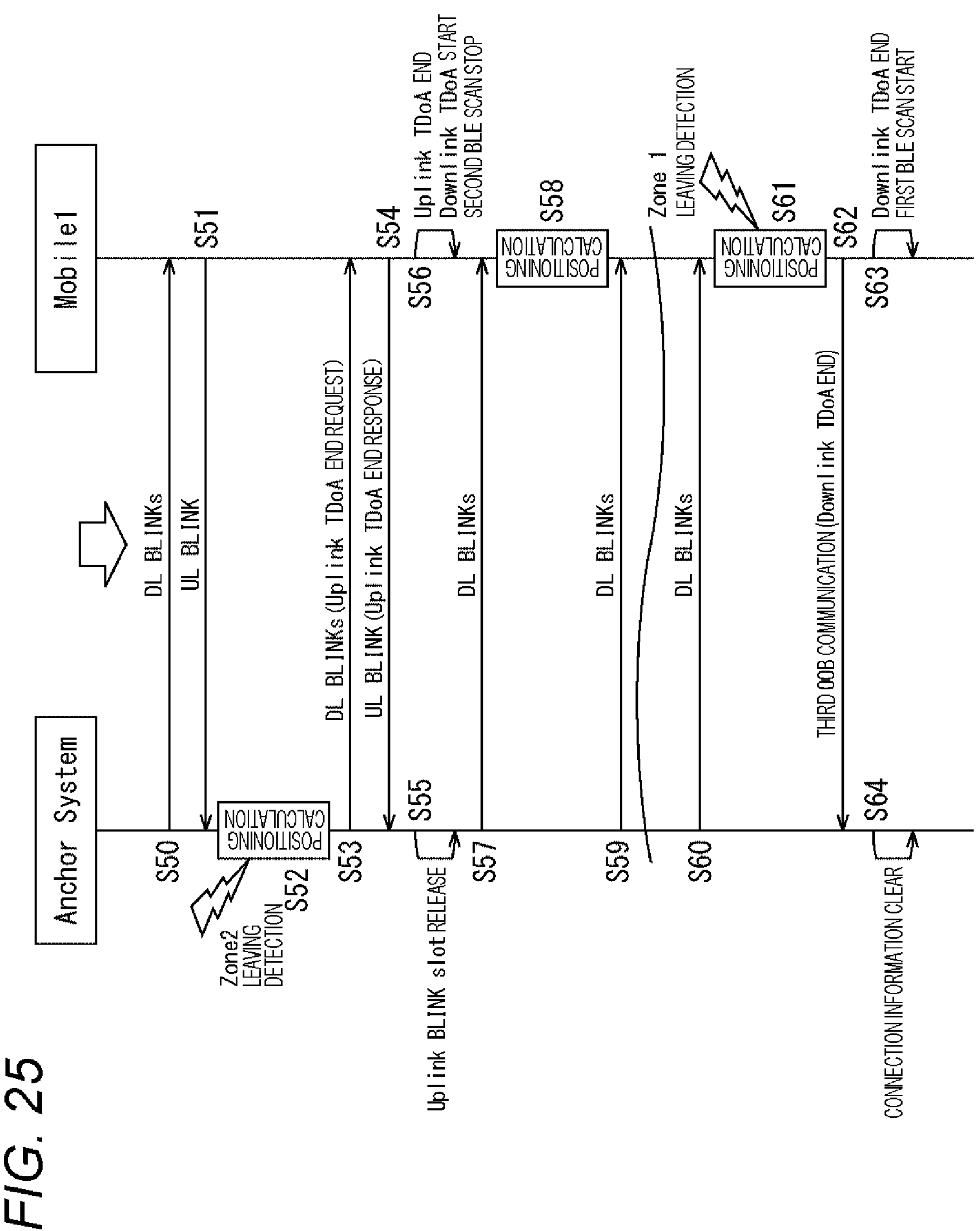
FIG. 25 is a sequence diagram for explaining payment processing.

For example, the processing from step S21 in FIG. 23 to step S38 in FIG. 24 described above is performed similarly to the payment processing system 11. Then, in the payment processing system 11A, when the entry of the mobile terminal 13 into the ranging zone Zone3 is detected by the positioning calculation performed in step S38, the process proceeds to step S71.

In step S71, the anchor system 12A transmits an application data communication start command to the mobile terminal 13 by using the TDoA bidirectional communication channel.

In step S72, in response to receiving the application data communication start message transmitted in step S71, the mobile terminal 13 returns an application data communication start response on the TDoA bidirectional communication channel.

In step S73, the mobile terminal 13 transitions to the UWB data communication state and waits for the UWB data packet from the UWB data communication anchor 25 of the application terminal 22.

In step S74, application data communication (for example, payment communication) is performed by UWB in-band communication between the UWB data communication anchor 25 of the application terminal 22 and the mobile terminal 13.

Then, when the application data communication using the UWB in-band communication ends, a Downlink BLINK packet from the UWB anchors 21-1 to 21-4 (step S75), transmission of an Uplink TDoA BLINK packet from the mobile terminal 13 (step S76), and positioning calculation by the ranging server 23 are repeatedly performed. Thereafter, when it is detected by the positioning calculation performed in step S77 that the mobile terminal 13 has left the ranging zone Zone3, the process proceeds to step S78.

In step S78, the anchor system 12A notifies the mobile terminal 13 of the application data communication end command by using the TDoA bidirectional communication channel.

In step S79, in response to receiving the application data communication end notification transmitted in step S78, the mobile terminal 13 ends the UWB data communication, and returns an application data communication end response to the anchor system 12A using the TDoA bidirectional communication channel.

Thereafter, the processing in and after step S49 in FIG. 24 described above is performed similarly to the payment processing system 11.

Figure 37:
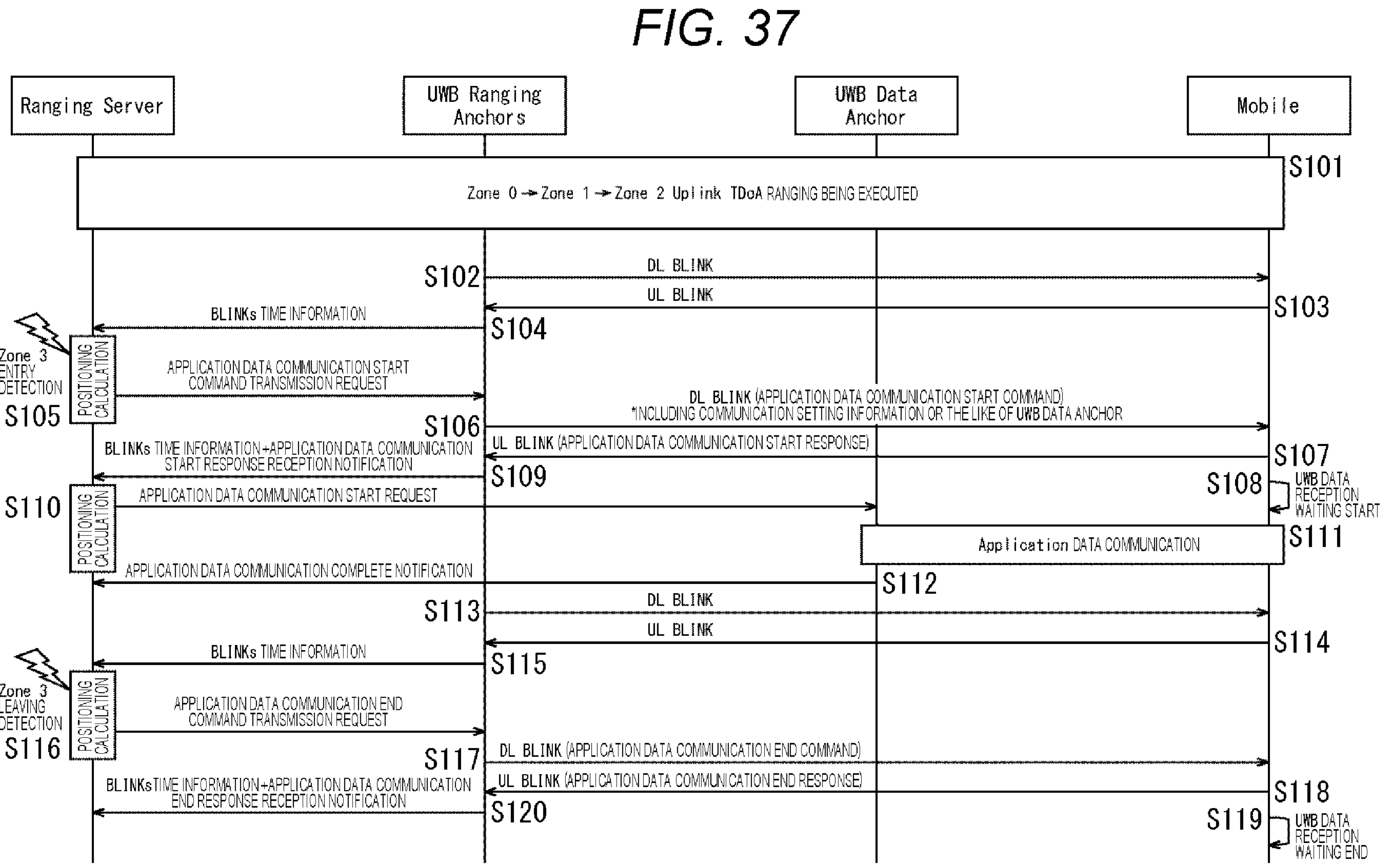
FIG. 37 is a sequence diagram illustrating UWB in-band application data communication processing in detail.

FIG. 37 is a sequence diagram for explaining in detail the UWB in-band application data communication processing performed in step S74 of FIG. 36.

In step S101, between the ranging server 23, the UWB anchors 21-1 to 21-4, the UWB data communication anchor 25, and the mobile terminal 13, Uplink TDoA ranging in the ranging zone Zone2 is performed after entering the ranging zone Zone1 from the ranging zone Zone0 and entering the ranging zone Zone2 via Downlink TDoA.

In step S102, the UWB anchors 21-1 to 21-4 transmit a Downlink BLINK packet to the mobile terminal 13.

In step S103, in response to receiving the Downlink BLINK packet transmitted in step S102, the mobile terminal 13 transmits an Uplink TDoA BLINK packet to the UWB anchors 21-1 to 21-4.

In step S104, the UWB anchors 21-1 to 21-4 supply time information indicating the arrival time of the Uplink TDoA BLINK packet from the mobile terminal 13 to the ranging server 23.

In step S105, the ranging server 23 performs positioning calculation on the basis of a time difference between arrival times at which the Uplink TDoA BLINK packet arrives at the UWB anchors 21-1 to 21-4 and position information of the UWB anchors 21-1 to 21-4. Then, when detecting that the mobile terminal 13 has entered the ranging zone Zone3, the ranging server 23 requests the UWB anchors 21-1 to 21-4 to start transmitting the application data communication start command.

In step S106, the UWB anchors 21-1 to 21-4 transmit the application data communication start command to the mobile terminal 13 using the TDoA bidirectional communication channel. This command includes information necessary for data communication, such as the MAC address and preamble pattern of the UWB data communication anchor 25.

In step S107, when receiving the application data communication start command in the TDoA bidirectional communication channel, the mobile terminal 13 returns an application data communication start response on the TDoA bidirectional communication channel.

In step S108, the mobile terminal 13 transitions to the UWB data communication state and waits for the UWB data packet from the UWB data communication anchor 25 of the application terminal 22.

In step S109, the UWB anchors 21-1 to 21-4 supply the ranging server 23 with time information indicating the arrival time of the Uplink TDoA BLINK packet from the mobile terminal 13 and notification of reception of the application data communication start response.

In step S110, the ranging server 23 performs positioning calculation on the basis of a time difference between arrival times at which the Uplink TDoA BLINK packet arrives at the UWB anchors 21-1 to 21-4 and position information of the UWB anchors 21-1 to 21-4. Then, the ranging server 23 requests the UWB data communication anchor 25 to start application data communication.

In step S111, application data communication (for example, payment communication) is performed by UWB in-band communication between the mobile terminal 13 and the UWB data communication anchor 25.

Then, when the application data communication ends, in step S112, the UWB data communication anchor 25 notifies the ranging server 23 that the application data communication has been completed.

In step S113, the UWB anchors 21-1 to 21-4 transmit the Downlink BLINK packet to the mobile terminal 13.

In step S114, in response to receiving the Downlink BLINK packet transmitted in step S113, the mobile terminal 13 transmits an Uplink TDoA BLINK packet to the UWB anchors 21-1 to 21-4.

In step S115, the UWB anchors 21-1 to 21-4 supply time information indicating the arrival time of the Uplink TDoA BLINK packet from the mobile terminal 13 to the ranging server 23.

In step S116, the ranging server 23 performs positioning calculation on the basis of a time difference between arrival times at which the Uplink TDoA BLINK packet arrives at the UWB anchors 21-1 to 21-4 and position information of the UWB anchors 21-1 to 21-4. Then, when detecting that the mobile terminal 13 has left the ranging zone Zone3, the ranging server 23 requests the UWB anchors 21-1 to 21-4 to start transmitting the application data communication end command.

In step S117, the UWB anchors 21-1 to 21-4 transmit the application data communication end command to the mobile terminal 13 using the TDoA bidirectional communication channel.

In step S118, when receiving the application data communication end command in the TDoA bidirectional communication channel, the mobile terminal 13 returns an application data communication end response on the TDoA bidirectional communication channel.

In step S119, the mobile terminal 13 transitions to the UWB data reception waiting end state.

In step S120, the UWB anchors 21-1 to 21-4 supply the ranging server 23 with time information indicating the arrival time of the Uplink TDoA BLINK packet from the mobile terminal 13 and a notification of reception of the application data communication end response.

FIG. 38 is a sequence diagram illustrating the Application data communication processing performed in step S111 of FIG. 37 in detail.

In step S110 described above, when the ranging server 23 requests the UWB data communication anchor 25 to start application data communication, the process proceeds to step S131.

In step S131, the UWB data communication anchor 25 transmits a polling command to the UWB chip 32 of the mobile terminal 13.

In step S132, the UWB chip 32 receives the polling command transmitted in step S131 and supplies the polling command to the eSE chip 33.

In step S133, the eSE chip 33 executes the NFC applet 37 on the basis of the polling command and performs payment processing such as FeliCa.

In step S134, the eSE chip 33 supplies a polling response to the UWB chip 32 as a result of the payment processing performed on the basis of the polling command in step S133.

In step S135, the UWB chip 32 transmits the polling response supplied in step S134 to the UWB data communication anchor 25.

In step S136, the UWB data communication anchor 25 transmits a request service command to the UWB chip 32 in response to the polling response transmitted in step S135.

In step S137, the UWB chip 32 receives the request service command transmitted in step S136, and supplies the request service command to the eSE chip 33.

In step S138, the eSE chip 33 executes the NFC applet 37 on the basis of the request service command, and performs the FeliCa payment processing.

In step S139, the eSE chip 33 supplies a request service response to the UWB chip 32 as a result of the payment processing performed on the basis of the request service command in step S138.

In step S140, the UWB chip 32 transmits the request service response supplied in step S139 to the UWB data communication anchor 25.

In step S141, the UWB data communication anchor 25 transmits a write command to the UWB chip 32.

In step S142, the UWB chip 32 receives the write command transmitted in step S141 and supplies the write command to the eSE chip 33.

In step S143, the eSE chip 33 performs write processing according to the write command supplied in step S142.

In step S144, the eSE chip 33 supplies a write response to the UWB chip 32 as a response to the writing in step S143.

In step S145, the UWB chip 32 transmits the write response supplied in step S144 to the UWB data communication anchor 25.

Thereafter, the process proceeds to step S112 described above, and the UWB data communication anchor 25 notifies the ranging server 23 that the application data communication has been completed. Note that, in the above description, the sequence of FeliCa has been described as an example, but other NFC applications such as Mifare can be executed in a similar procedure.

Third Configuration Example of Payment Processing System

Figure 39:
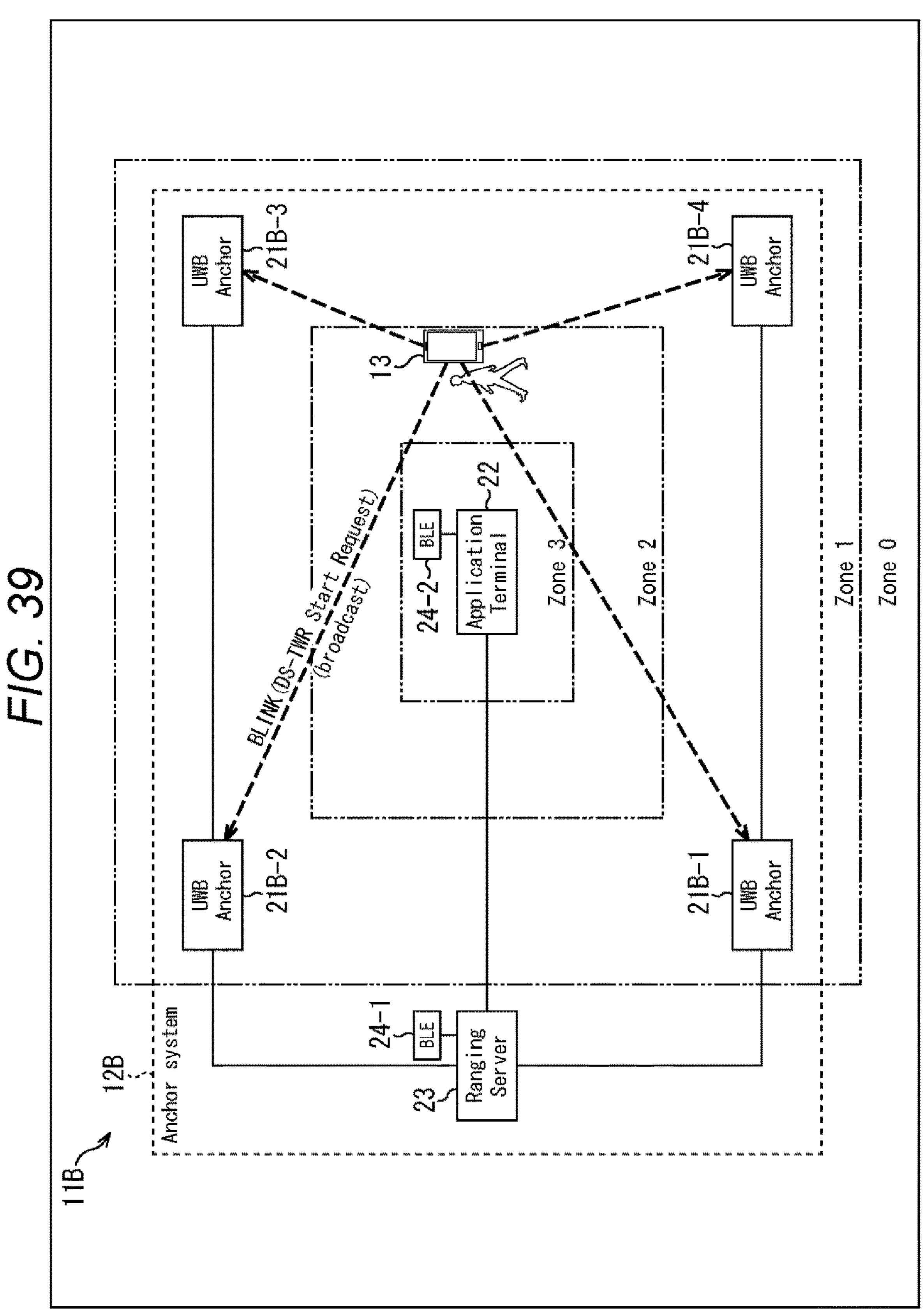
FIG. 39 is a block diagram illustrating a configuration example of a third embodiment of a payment processing system to which the present technology is applied.

FIG. 39 is a block diagram illustrating a configuration example of a third embodiment of a payment processing system to which the present technology is applied.

In a payment processing system 11B illustrated in FIG. 39, configurations common to those of the payment processing system 11 in FIG. 1 are denoted by the same reference numerals, and a detailed description thereof will be omitted. That is, the payment processing system 11B is common to the payment processing system 11 of FIG. 1 in that an anchor system 12B includes the application terminal 22 and the ranging server 23, the application terminal 22 includes the BLE device 24-1, and the ranging server 23 includes the BLE device 24-2.

Then, the payment processing system 11B has a different configuration from the payment processing system 11 of FIG. 1 in that the anchor system 12B includes four UWB anchors 21B-1 to 21B-4.

The UWB anchors 21B-1 to 21B-4 communicate with the mobile terminal 13 in the ranging zone Zone2 by secure ranging using DS-TWR.

The DS-TWR start request notification processing will be described with reference to FIG. 39.

For example, in the payment processing system 11B, the device search processing (FIG. 4), the BLE connection processing (FIG. 5), and the Downlink TDoA positioning start processing (FIG. 6) described above are performed similarly to the payment processing system 11 in FIG. 1.

As illustrated in FIG. 39, the DS-TWR start request notification processing is performed when the mobile terminal 13 enters the ranging zone Zone2 from the ranging zone Zone1.

The anchor system 12B periodically scans an Uplink TDoA BLINK packet transmitted from the mobile terminal 13 on the basis of the ranging time schedule information.

Figure 40:
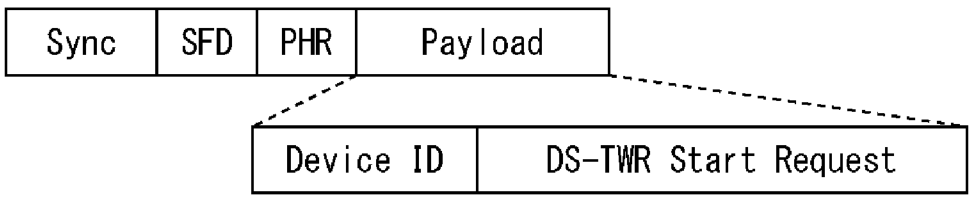
FIG. 40 is a diagram illustrating an example of an Uplink BLINK packet for DS-TWR Start Request message.

The mobile terminal 13 can recognize that the mobile terminal has entered the ranging zone Zone2 from the ranging zone Zone1 by self-positioning calculation. Then, when recognizing entry into the ranging zone Zone2, the mobile terminal 13 transmits an Uplink BLINK packet in which the device ID information of the mobile terminal 13 and the DS-TWR Start Request message (Mode Change Request message) are stored in the payload to the anchor system 12B as illustrated in FIG. 40. At this time, the mobile terminal 13 transmits the Uplink BLINK packet at a timing when transmission of the Uplink DS-TWR positioning start request is permitted on the basis of the ranging time schedule information designated at the time of connection from the anchor system 12B.

Figure 41A:
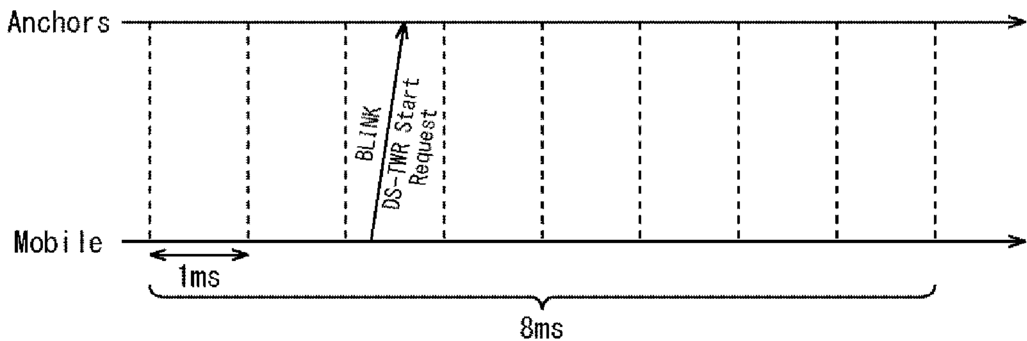
FIGS. 41A and 41B are diagrams for explaining a DS-TWR Start Request.
Figure 41B:
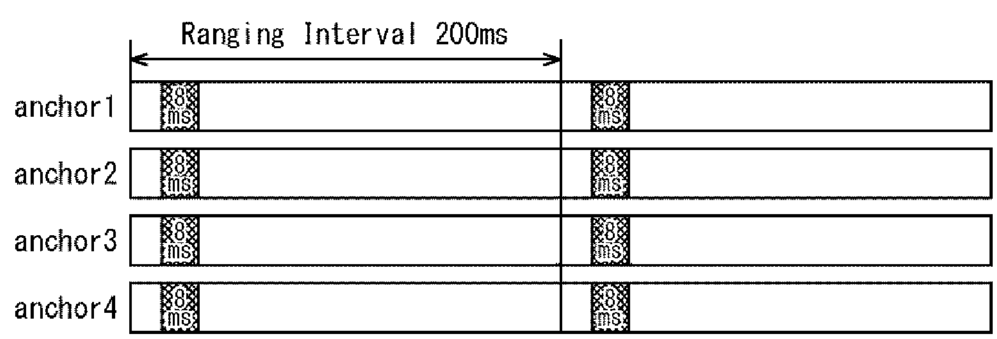

FIGS. 41A and 41B are diagrams for explaining a DS-TWR Start Request.

As illustrated in A of FIG. 41A, when detecting entry into the ranging zone Zone2, the mobile terminal 13 broadcasts a DS-TWR Start Request BLINK packet, which is a type of Uplink BLINK packet, to the UWB anchors 21B-1 to 21B-4 once in principle. At this time, similarly to the above description with reference to FIG. 13A, a plurality of slots is prepared and the DS-TWR Start Request BLINK packet is randomly transmitted.

FIG. 13B illustrates time allocation of the UWB anchors 21-1 to 21-4. In the transmission of the DS-TWR Start Request BLINK packet, a dedicated section is secured between the ranging intervals similarly to the above description with reference to FIG. 13B.

The DS-TWR positioning start request response processing will be described with reference to FIG. 42.

Figure 42:
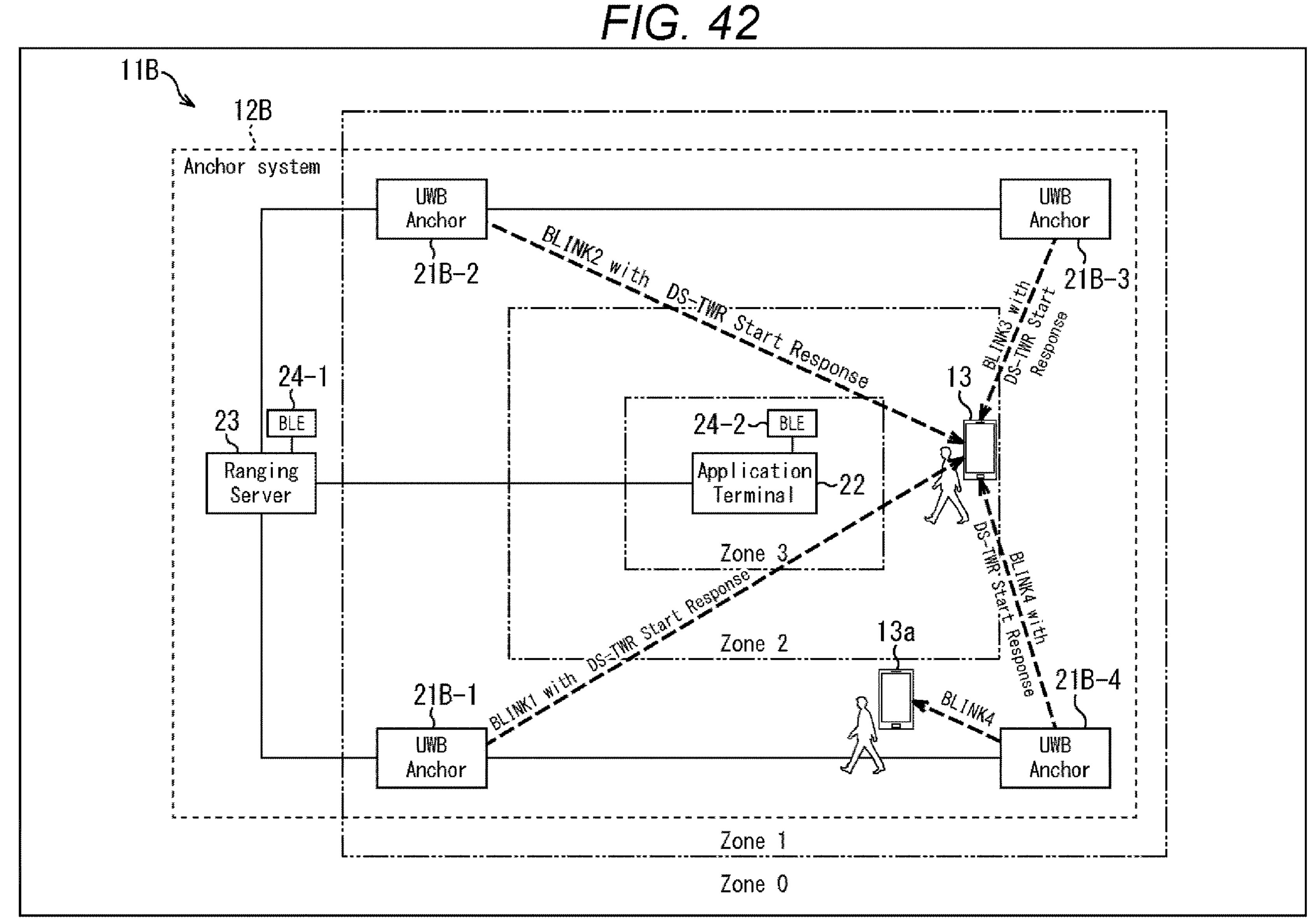

As illustrated in FIG. 42, the DS-TWR positioning start request response processing is performed on the mobile terminal 13 in the ranging zone Zone2.

The anchor system 12B receives a DS-TWR start request from the mobile terminal 13 at the UWB anchors 21B-1 to 21B-4. The anchor system 12B collates the device ID information of the mobile terminal 13 included in the received DS-TWR Start Request packet with the information list of the connected device recorded in the internal memory.

Figure 43:
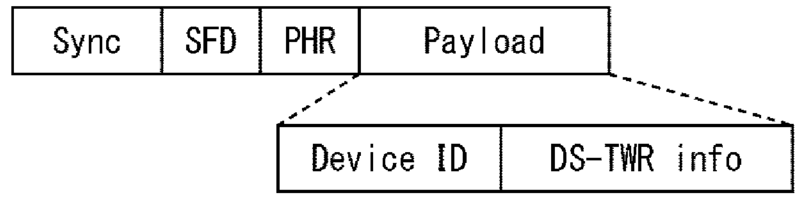

For example, in a case where the device ID information of the mobile terminal 13 is already included in the information list of the connected devices as a result of the collation, the anchor system 12B transmits the DS-TWR Start Response from the UWB anchors 21-1 to 21-4 at the time of transmitting the next Downlink BLINK packet on the basis of the ranging time schedule information. For example, as illustrated in FIG. 43, device ID information of the mobile terminal 13 and information necessary for DS-TWR are stored in a payload of a Downlink BLINK packet for transmitting a DS-TWR Start Response.

Meanwhile, in a case where the device ID information of the mobile terminal 13 is not included in the information list of the connected devices as a result of the collation, the anchor system 12B can perform error notification by a Downlink BLINK packet. Alternatively, in this case, the anchor system 12B may ignore the DS-TWR Start Request transmitted from the mobile terminal 13.

Note that it is also assumed that another mobile terminal 13*a* other than the mobile terminal 13 that has transmitted the DS-TWR Start Request receives the DS-TWR Start Response. However, since the mobile terminal 13*a* has not entered the ranging zone Zone2, the DS-TWR Start Request has not been transmitted. Therefore, the device ID information and the Uplink Blink Slot information acquired from the DS-TWR Start Response can be ignored.

Figure 44:
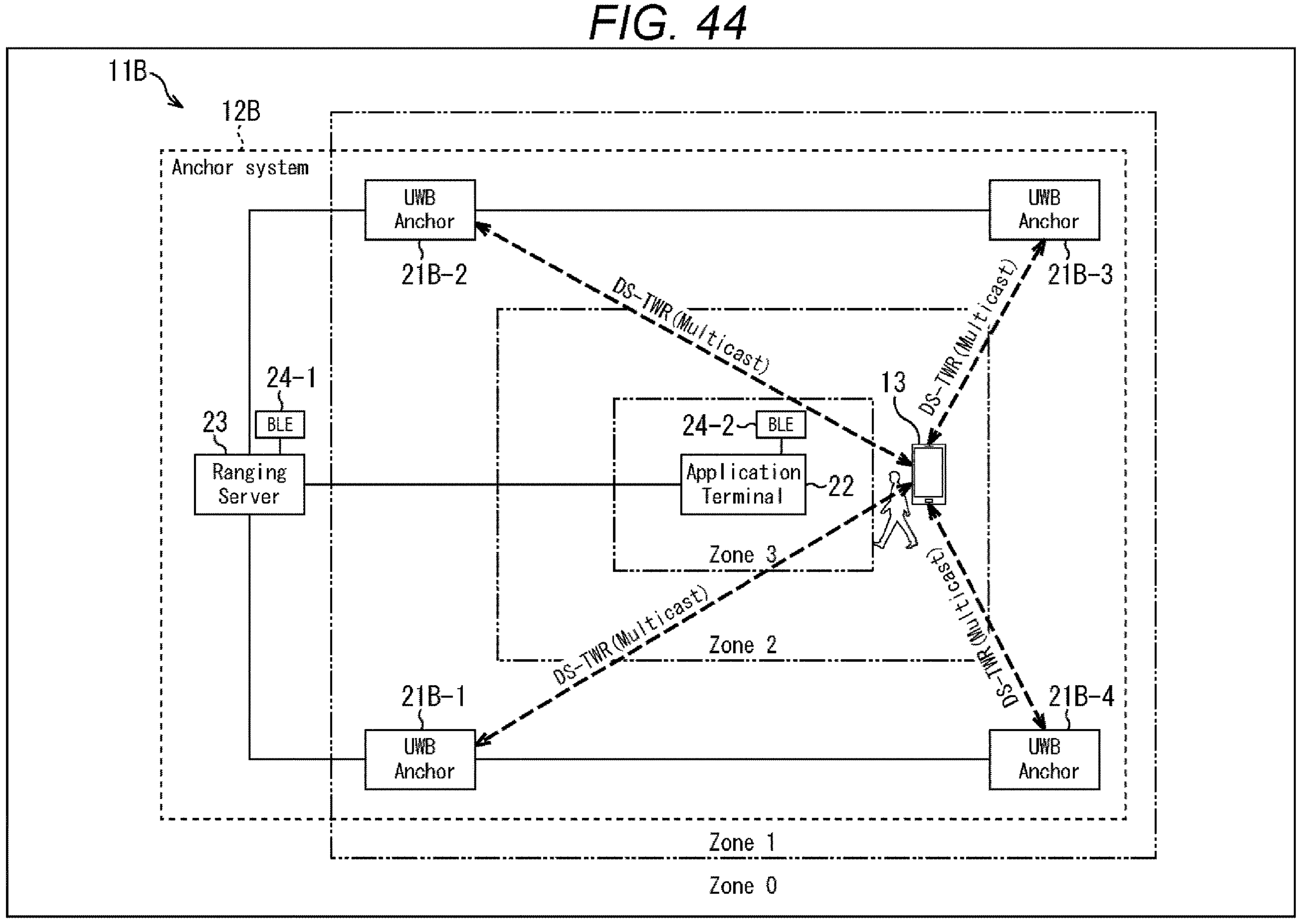

FIG. 44 is a diagram for explaining DS-TWR start processing.

As illustrated in FIG. 44, the DS-TWR start processing is performed by the mobile terminal 13 in the ranging zone Zone2.

The mobile terminal 13 executes DS-TWR with the UWB anchors 21B-1 to 21B-4. It is also possible to apply secure ranging at this time.

The UWB anchors 21B-1 to 21B-4 can perform TWR by multicast with a plurality of mobile terminals 13 at the same time (within the same session).

The anchor system 12B performs positioning calculation on the basis of distances L1 to L4 (distances between each of the UWB anchors 21B-1 to 21B-4 and the mobile terminal 13) which are distance measurement results of the UWB anchors 21B-1 to 21B-4 and position information of the UWB anchors 21B-1 to 21B-4. As a result, the ranging server 23 starts recognizing the absolute position of the mobile terminal 13.

At this time, the mobile terminal 13 continues to receive the Downlink BLINK packet even after entering the ranging zone Zone2. Further, the mobile terminal 13 initiates a second BLE scan to detect a second BLE ADV signal.

Figure 45:
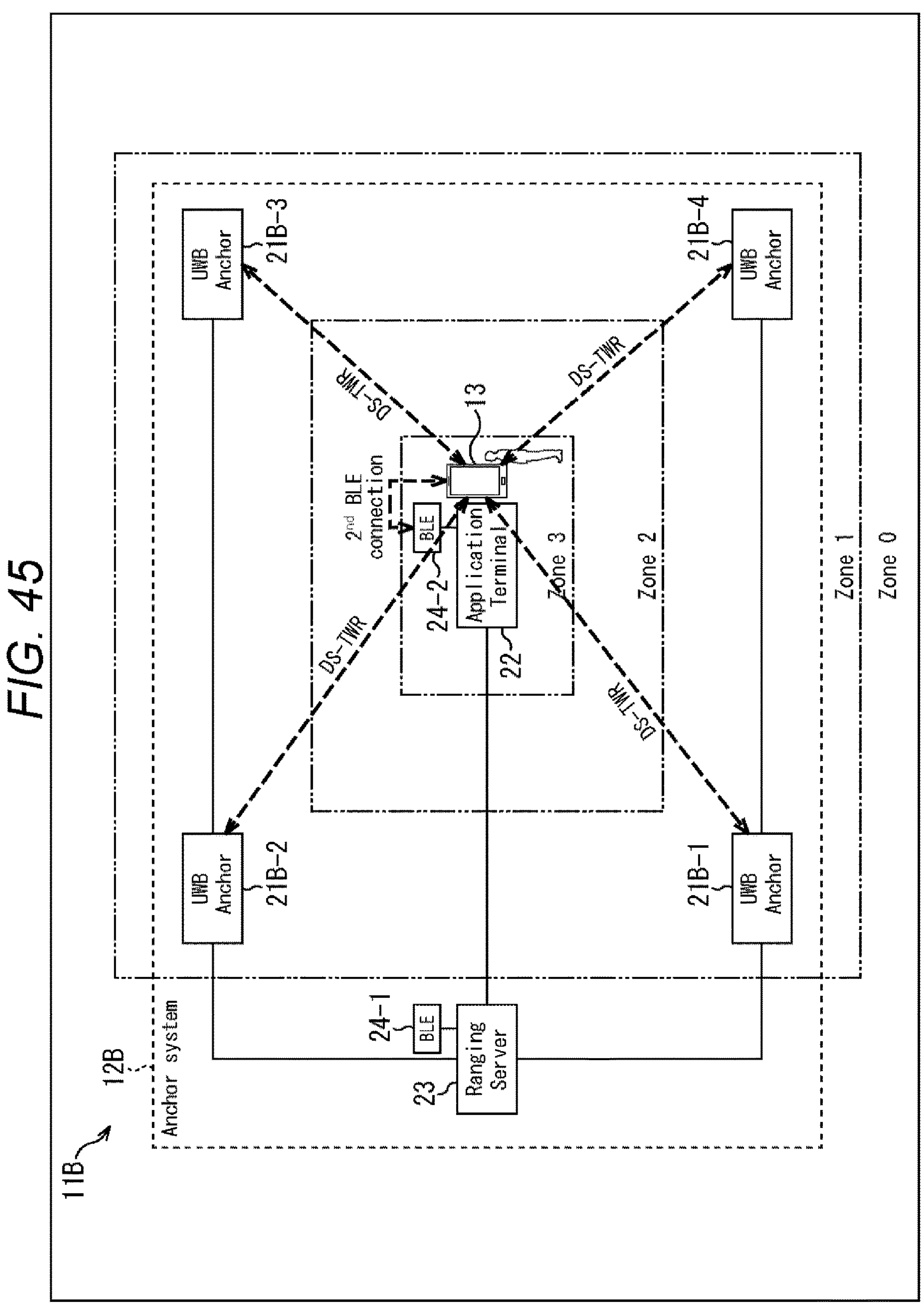

FIG. 45 is a diagram for explaining execution processing of application data communication.

As illustrated in FIG. 45, the execution processing of the application data communication is performed, for example, when the user of the mobile terminal 13 enters the ranging zone Zone3 from the ranging zone Zone2 in order to make a payment.

The ranging server 23 of the anchor system 12B detects that the mobile terminal 13 enters the ranging zone Zone3 by the DS-TWR positioning. The anchor system 12B instructs the application terminal 22 to transmit a second BLE ADV signal request to the mobile terminal 13, and the application terminal 22 starts transmitting the second BLE ADV signal from the BLE device 24-2. The second BLE ADV signal includes information specific to the mobile terminal 13 (for example, ADV_DIRECT_IND). Therefore, only the mobile terminal 13 responds and transmits a connection request for the second BLE connection to the anchor system 12B. As a result, a second BLE connection is established between the BLE device 24-2 of the application terminal 22 and the mobile terminal 13.

After the second BLE connection is established, the application terminal 22 performs application data communication (for example, payment communication) with the mobile terminal 13 on the second BLE communication path.

Figure 46:
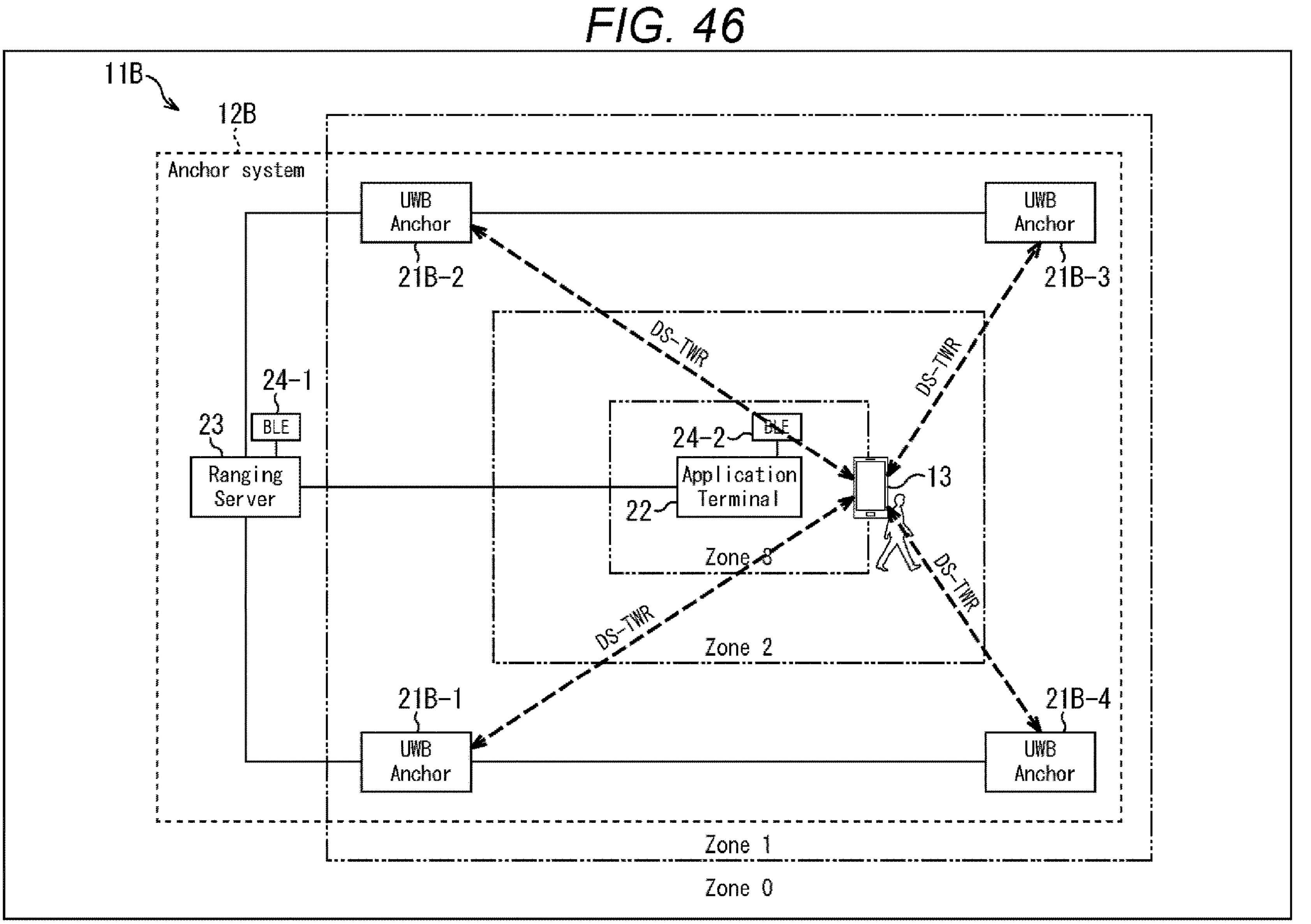

FIG. 46 is a diagram for explaining termination processing of application data communication.

As illustrated in FIG. 46, the termination processing of the application data communication is performed when the user of the mobile terminal 13 leaves the ranging zone Zone3 to the ranging zone Zone2 after the completion of the application data communication.

When detecting the leaving of the mobile terminal 13 from the ranging zone Zone3 by the continuing DS-TWR positioning, the ranging server 23 of the anchor system 12B notifies the application terminal 22 of the leaving of the mobile terminal 13 from the ranging zone Zone3.

Upon receiving the mobile terminal 13 leaving notification, the application terminal 22 disconnects the second BLE connection with the mobile terminal 13.

Here, as another pattern, the application terminal 22 may immediately disconnect the second BLE connection after the application data communication is completed. Alternatively, when the user of the mobile terminal 13 performs an end request input or the like on the user interface of the application on the mobile terminal 13, the second BLE connection may be disconnected with the input as a trigger.

Note that, depending on the use case, a case is also assumed in which the mobile terminal 13 leaves the ranging zone Zone3 to the ranging zone Zone2 and then enters the ranging zone Zone3 again to perform application data communication. In such a case, after disconnecting the second BLE connection, the mobile terminal 13 may again initiate the second BLE scan to detect the second BLE ADV signal.

Figure 47:
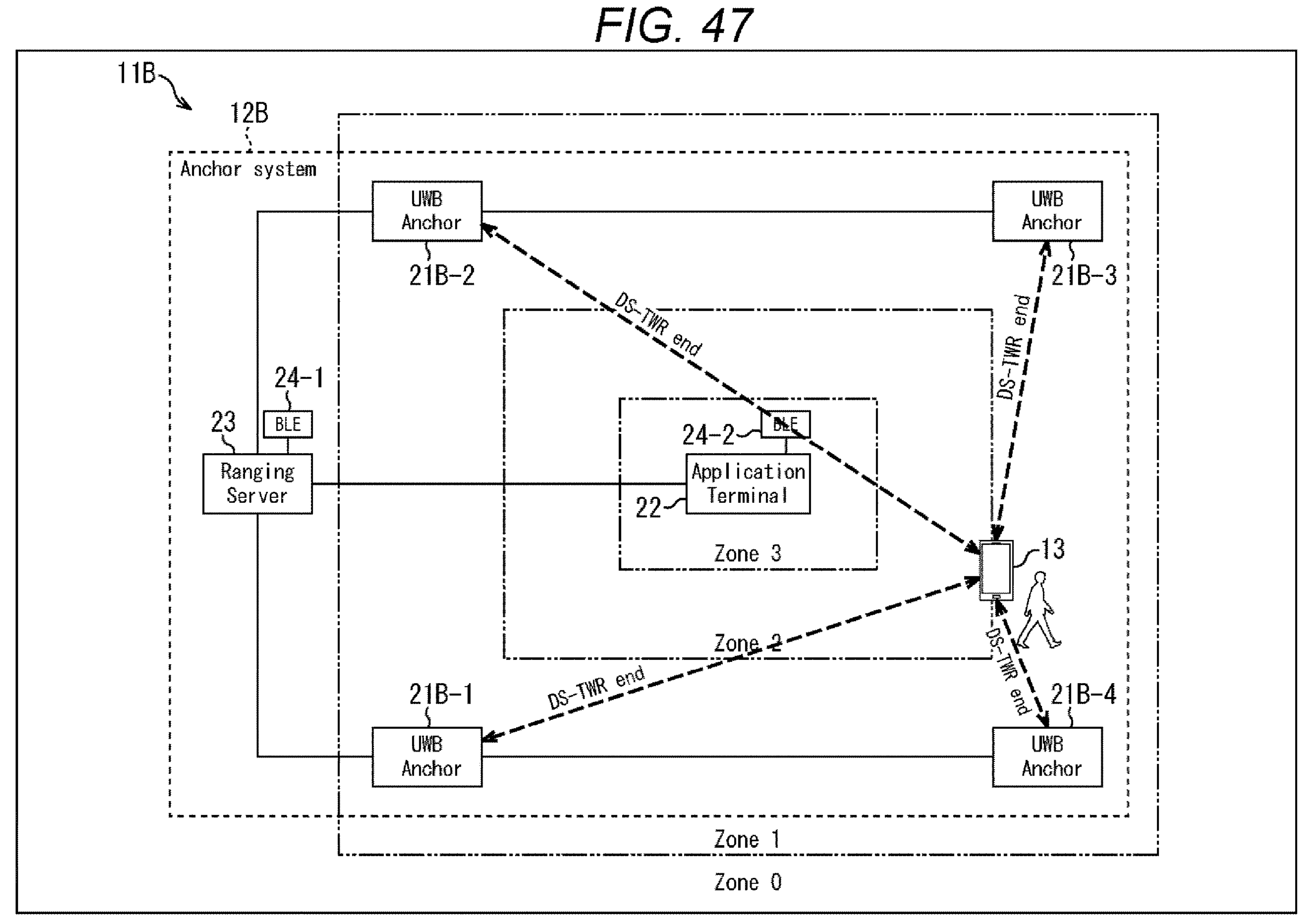

FIG. 47 is a diagram for explaining termination processing of the DS-TWR.

As illustrated in FIG. 47, the termination processing of the DS-TWR is performed when the user who has finished the application data communication moves away from the application terminal 22 together with the mobile terminal 13 and then leaves the ranging zone Zone2 to the ranging zone Zone1.

The ranging server 23 of the anchor system 12B detects the Zone3 leaving of the mobile terminal 13 by DS-TWR positioning. The ranging server 23 of the anchor system 12B notifies the UWB anchors 21B-1 to 21B-4 of an instruction to end the DS-TWR for the mobile terminal 13. The UWB anchors 21B-1 to 21B-4 notify the mobile terminal 13 of the end in the DS-TWR protocol.

Upon receiving the notification of the end of the DS-TWR from each of the UWB anchors 21B-1 to 21B-4, the mobile terminal 13 ends the DS-TWR with the UWB anchors 21B-1 to 21B-4. Then, after terminating the DS-TWR, the mobile terminal 13 starts self-positioning again by receiving a Downlink TDoA BLINK packet.

For example, thereafter, in a case where the mobile terminal 13 enters the ranging zone Zone2 again, the processes subsequent to the above-described Uplink TDoA start request notification processing (FIG. 11) are executed again. In addition, the processes after the termination processing of the Downlink TDoA ranging (FIG. 22) are performed similarly to the case where Uplink TDoA is applied to the ranging zone Zone2.

Figure 48:
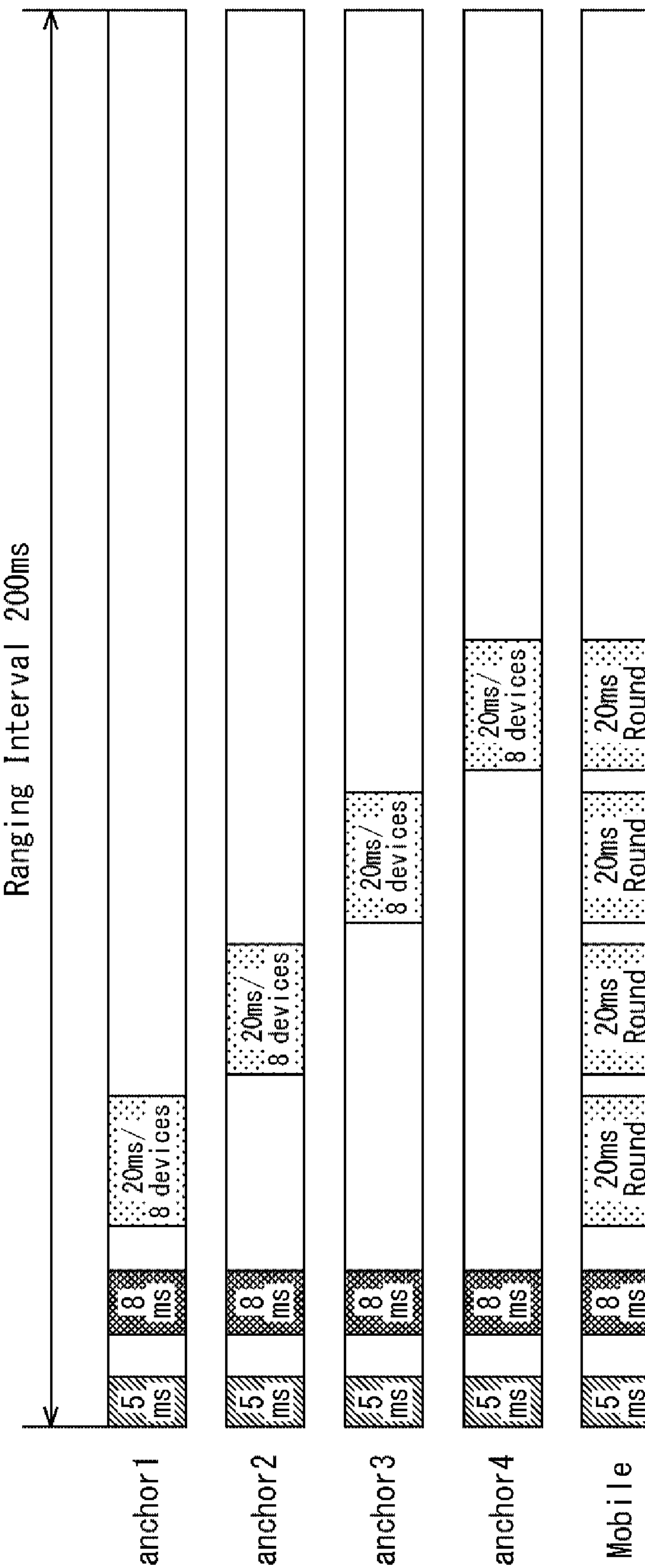

FIG. 48 illustrates an example of a ranging time schedule of the UWB anchors 21B-1 to 21B-4 and the mobile terminal 13 in a case where DS-TWR is performed in the ranging zone Zone2.

As illustrated in FIG. 48, 5 ms is provided as a ranging time for Downlink TDoA BLINK, 16 ms is provided as a ranging time for DS-TWR BLINK, and 8 ms is provided as a ranging time for DS-TWR Start Request BLINK.

In addition, in the example illustrated in FIG. 48, the number of mobile terminals 13 in which the DS-TWR is performed in the ranging zone Zone2 is eight. Then, a 20 ms DS-TWR ranging time is provided for each of the UWB anchors 21B-1 to 21B-4, and a total 80 ms DS-TWR ranging time is provided. For example, when the number of mobile terminals 13 in which the DS-TWR is performed in the ranging zone Zone2 is increased, the ranging time for the DS-TWR is added according to the increase. For example, in a case where the number of mobile terminals 13 in which the DS-TWR is performed in the ranging zone Zone2 is 16, a total 160 ms DS-TWR ranging time is provided.

Fourth Configuration Example of Payment Processing System

Figure 49:
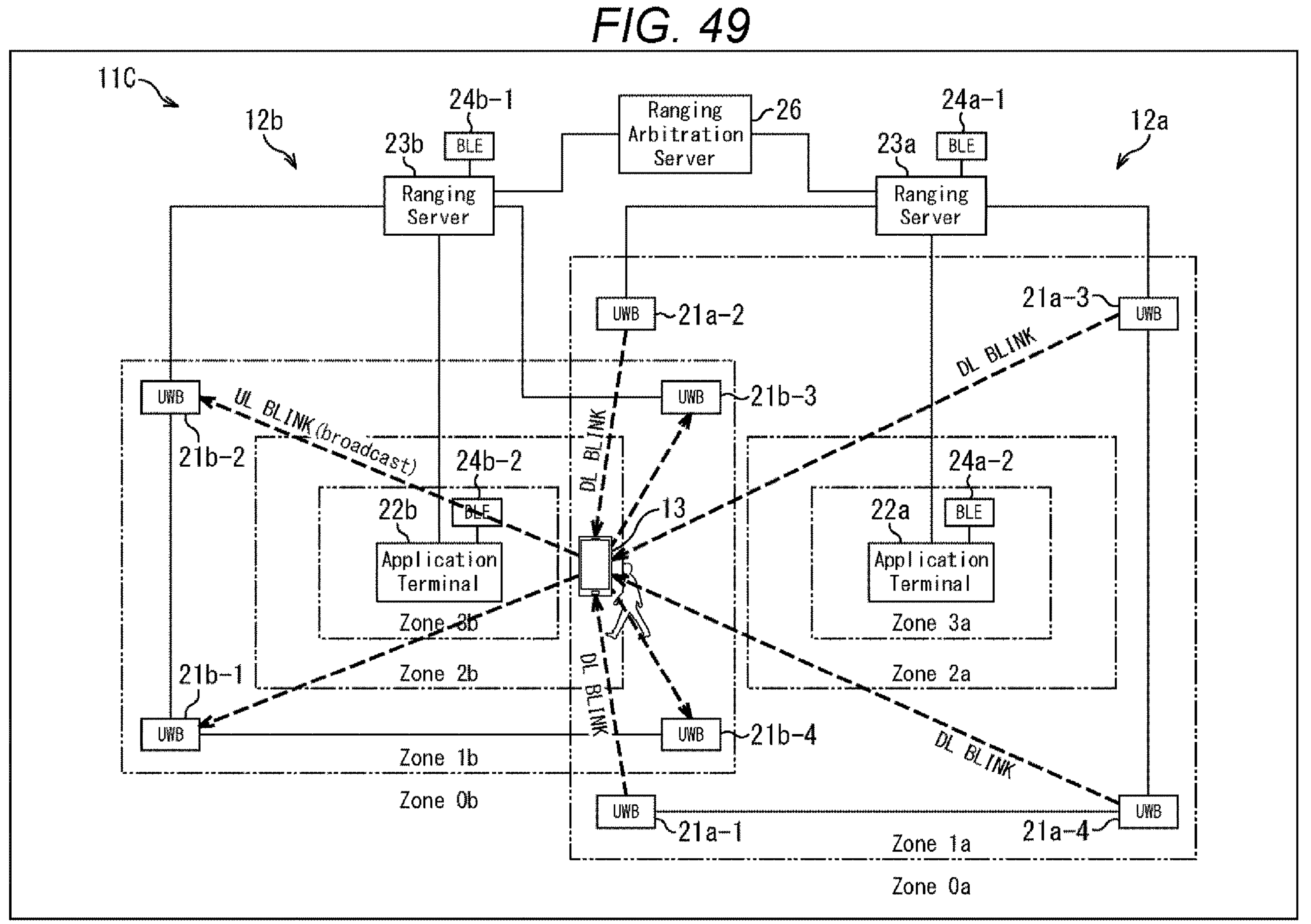

FIG. 49 is a block diagram illustrating a configuration example of a fourth embodiment of a payment processing system to which the present technology is applied.

In a payment processing system 11C illustrated in FIG. 49, configurations common to those of the payment processing system 11 in FIG. 1 are denoted by the same reference numerals, and a detailed description thereof will be omitted.

The payment processing system 11C includes an anchor system 12*a* and an anchor system 12*b* configured similarly to the anchor system 12 in FIG. 1, and further includes a ranging arbitration server 26. That is, the payment processing system 11C is configured such that the payment application by the anchor system 12*a* and the payment application by the anchor system 12*b* exist close to each other, and some ranging zones overlap each other.

The anchor system 12*a* includes four UWB anchors 21*a*-1 to 21*a*-4, an application terminal 22*a*, a ranging server 23*a*, a BLE device 24*a*-2, and a BLE device 24*a*-1. The anchor system 12*b* includes four UWB anchors 21*b*-1 to 21*b*-4, an application terminal 22*b*, a ranging server 23*b*, a BLE device 24*b*-2, and a BLE device 24*b*-1.

Then, in the payment processing system 11C, the application terminal 22*a* of the anchor system 12*a* and the application terminal 22*b* of the anchor system 12*b* are connected to the ranging arbitration server 26 via the network interface.

The ranging arbitration server 26 has a function of arbitrating timing of the ranging time schedules of the anchor system 12*a* and the anchor system 12*b*. Note that the UWB anchors 21*a*-1 to 21*a*-4 and the UWB anchors 21*b*-1 to 21*b*-4 may monitor UWB signals of other payment applications to adjust the ranging time schedule.

In the payment processing system 11C configured as described above, a plurality of different payment applications (in FIG. 49, two different payment applications are illustrated) exist nearby. Therefore, even if different ranging sessions for the respective payment applications are superimposed, the ranging arbitration server 26 arbitrates the UWB wireless communications so as not to overlap with each other, so that it is possible to support the respective payment applications.

However, in a case where the ranging zone Zone3a of the anchor system 12*a* and the ranging zone Zone3b of the anchor system 12*b* overlap each other, it is assumed that different application data communication cannot be simultaneously performed. Therefore, it is preferable to configure the payment processing system 11C by avoiding overlapping between the ranging zone Zone3a of the anchor system 12*a* and the ranging zone Zone3b of the anchor system 12*b*.

Figure 50:
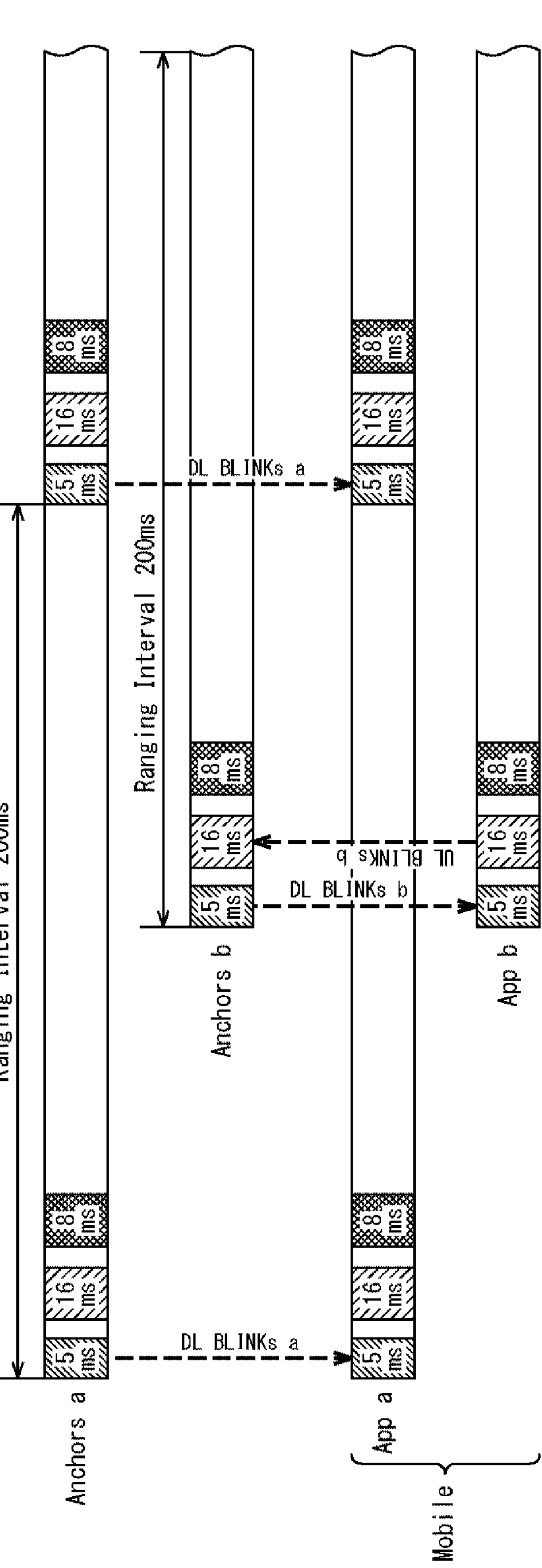

FIG. 50 is a diagram illustrating an example of a ranging time schedule in the payment processing system 11C.

As illustrated in FIG. 50, the same mobile terminal 13 can simultaneously have a plurality of ranging sessions. Then, since the communication amount of the UWB packet is small, even if a plurality of different applications exist in the vicinity, the simultaneous processing can be performed by adjusting the ranging time schedule so that the UWB communication sections are not superimposed.

Figure 51:
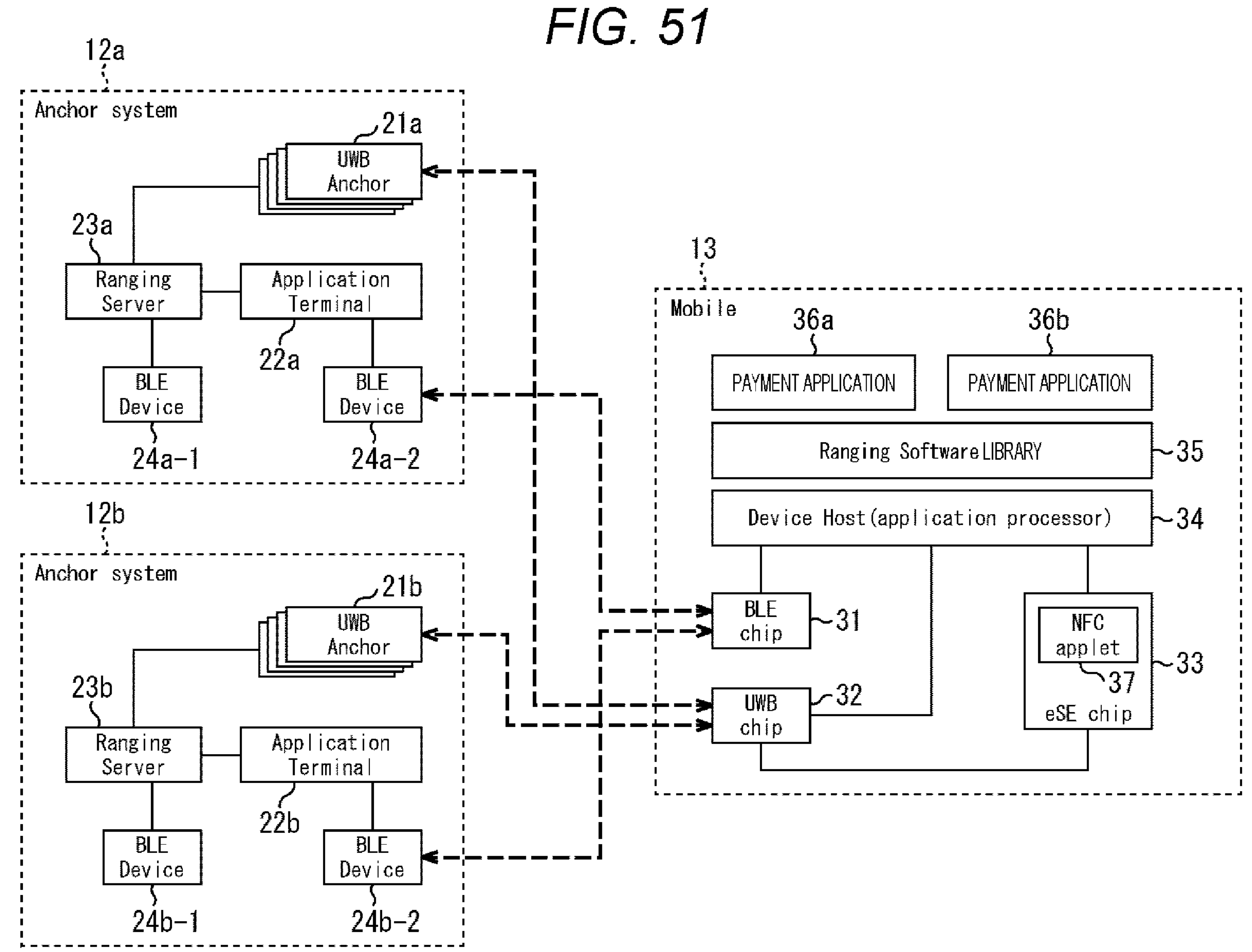

A configuration example of the anchor system 12*a*, the anchor system 12*b*, and the mobile terminal 13, and a flow of data among the anchor system 12*a*, the anchor system 12*b*, and the mobile terminal 13 will be described with reference to FIG. 51.

The mobile terminal 13 is for different payment applications a and b, and the BLE chip 31 and the UWB chip 32 can be used in common. At this time, the ranging software library 35 separately executes processing for each session, so that a plurality of ranging sessions can be processed in parallel.

Figure 52:
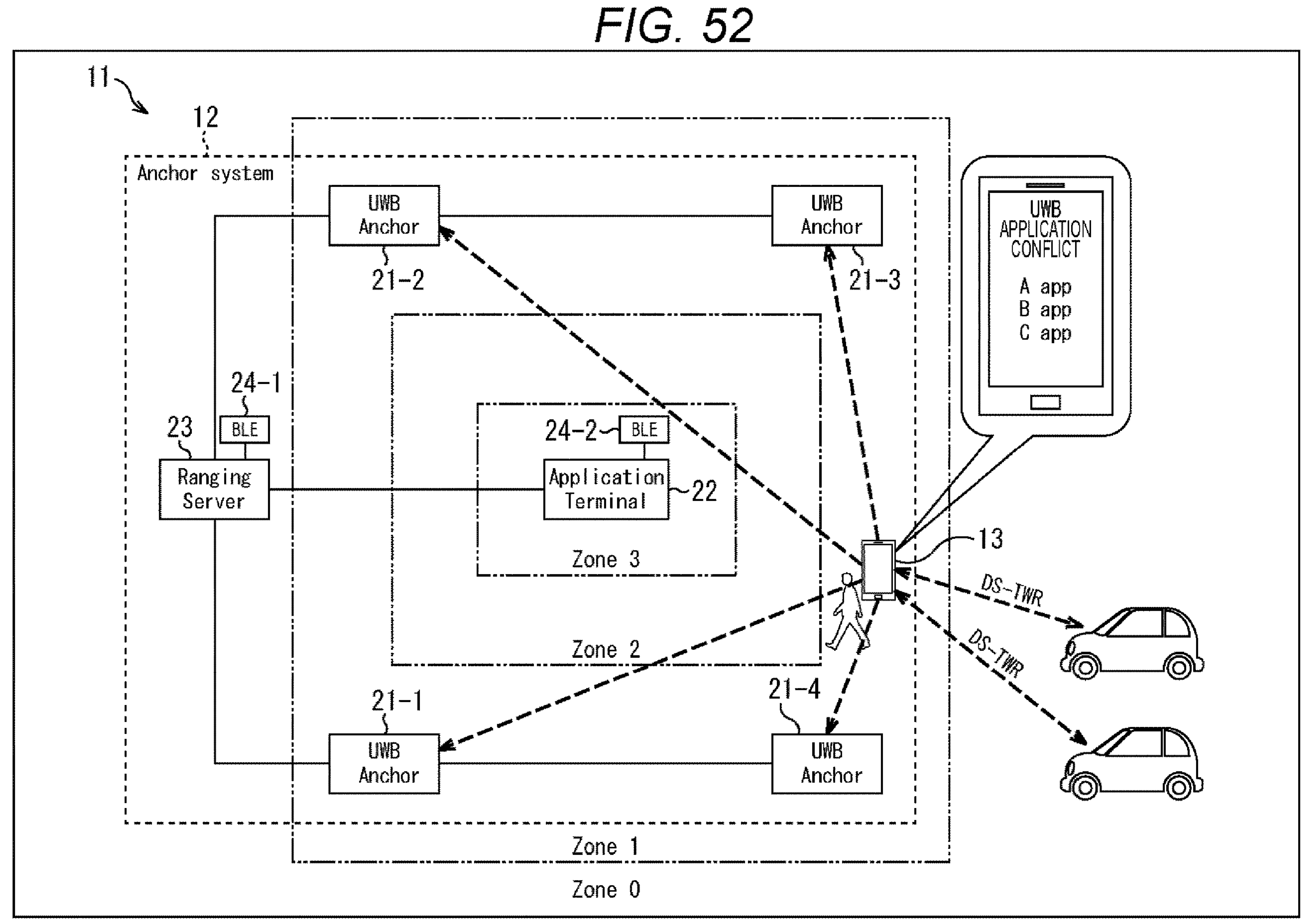

FIG. 52 is a diagram for explaining a case where an application different from the payment application exists nearby.

As illustrated in FIG. 52, in a case where there is a vehicle that uses DS-TWR in another application, for example, near the payment processing system 11, it is assumed that interference cannot be avoided in terms of timing. Therefore, in such a case, on the mobile terminal 13 side, in a case where there is ranging that is already being executed at the stage of the ranging configuration using BLE (OOB) for starting ranging, as illustrated in the drawing, a message is displayed on the screen of the mobile terminal 13 to cause the user to execute temporary exclusion processing, thereby avoiding interference. Alternatively, in addition to displaying a message on the screen of the mobile terminal 13, a notification of the conflict may be provided to the user by using a vibration function of the mobile terminal 13.

Figure 53:
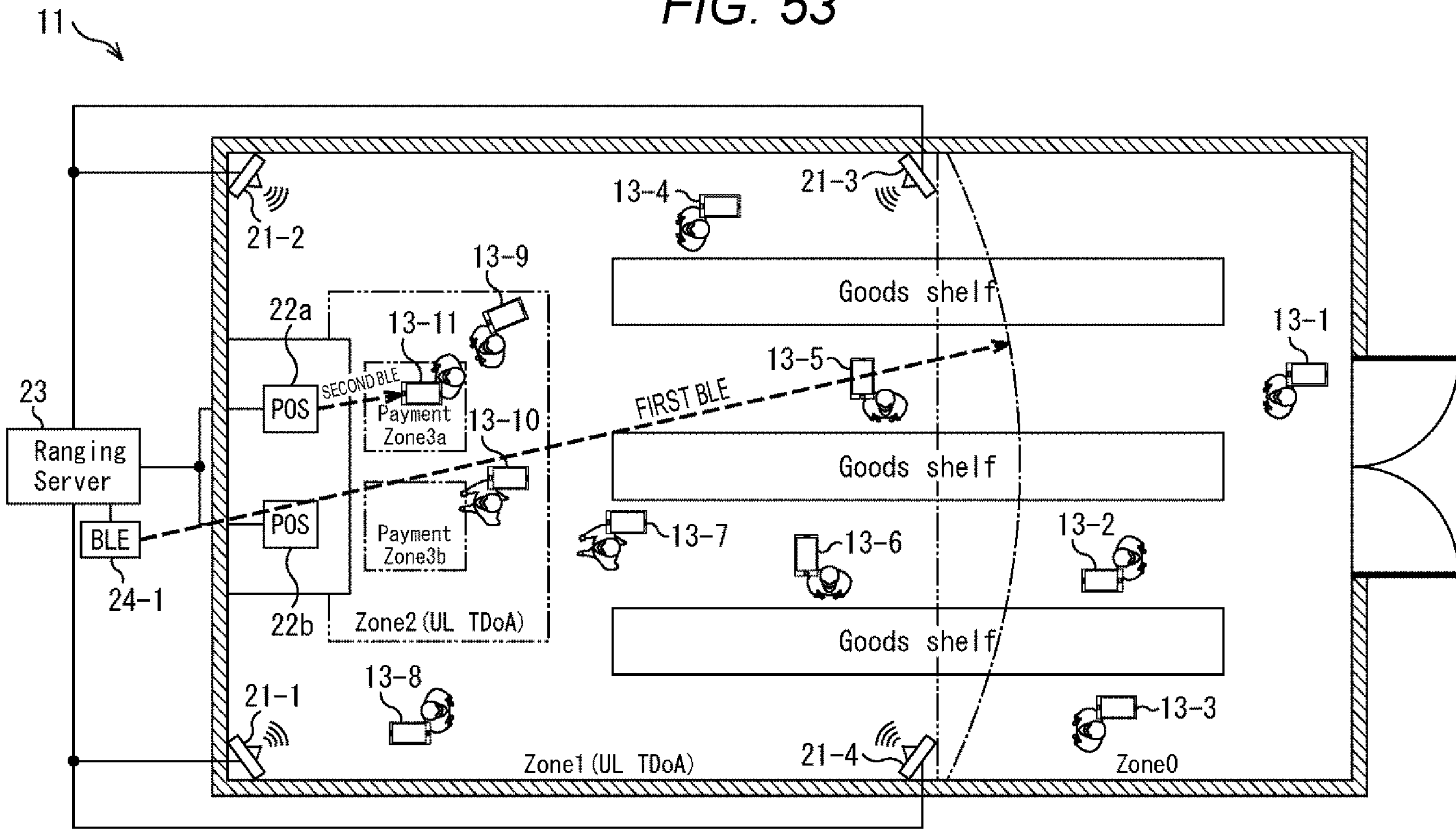

FIG. 53 is a diagram illustrating an example of a specific embodiment in which the payment processing system 11 is applied to purchase payment in a store.

As illustrated in FIG. 53, an application terminal 22 is incorporated as a part of a Point Of Sale (POS) system. Then, a ranging zone Payment Zone3a for payment is set in the vicinity of the application terminal 22*a*, and a ranging zone Payment Zone3b for payment is set in the vicinity of the application terminal 22*b*.

FIG. 54 is a diagram illustrating an example of a specific embodiment in which the payment processing system 11A is applied to fare payment at a ticket gate.

As illustrated in FIG. 54, the UWB data communication anchor 25 is incorporated into a ticket gate machine. Then, a ranging zone Zone3a for ticket gate processing is set in the vicinity of the UWB data communication anchor 25*a*, a ranging zone Zone3b for ticket gate processing is set in the vicinity of the UWB data communication anchor 25*b*, and a ranging zone Zone3*c* for ticket gate processing is set in the vicinity of the UWB data communication anchor 25*c*.

Configuration Example of Computer

Next, the series of processing (information processing method) described above can be performed by hardware or can be performed by software. In a case where a series of processing is performed by software, a program that constitutes the software is installed on a general-purpose computer, or the like.

Figure 55:
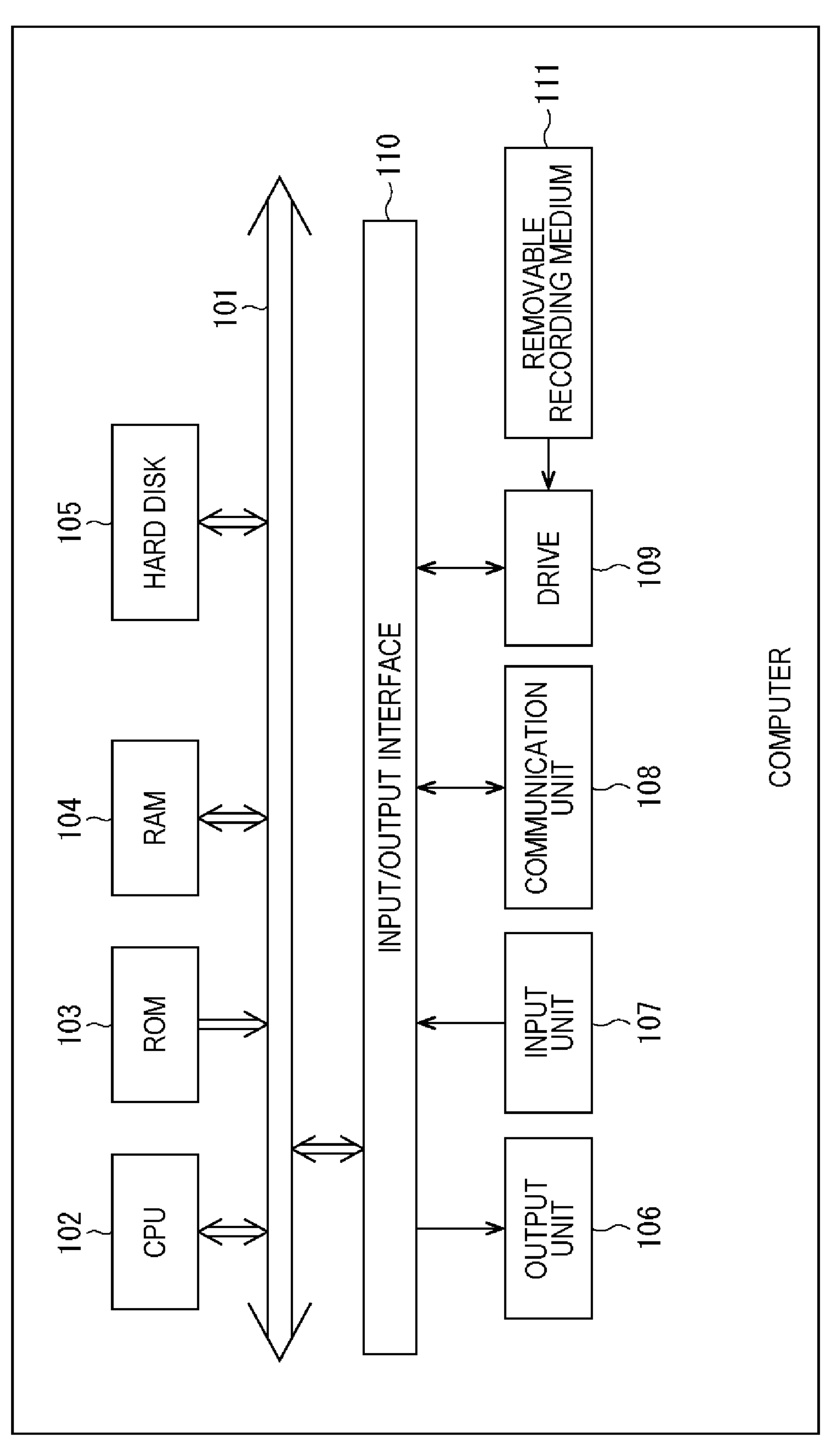

FIG. 55 is a block diagram illustrating a configuration example of an embodiment of a computer in which a program for executing the above-described series of processing is installed.

The program can be previously recorded on a hard disk 105 or ROM 103 as a recording medium incorporated in the computer.

Alternatively, the program can be stored (recorded) in a removable recording medium 111 driven by a drive 109. Such a removable recording medium 111 can be provided as so-called package software. Here, examples of the removable recording medium 111 include, for example, a flexible disk, a compact disc read only memory (CD-ROM), a magneto optical (MO) disk, a digital versatile disc (DVD), a magnetic disk, a semiconductor memory, and the like.

Note that in addition to installing the program on the computer from the removable recording medium 111 as described above, the program can be downloaded to the computer via a communication network or a broadcasting network and installed on the incorporated hard disk 105. That is, for example, the program can be wirelessly transferred from a download site to the computer via an artificial satellite for digital satellite broadcasting, or can be transferred by wire to the computer via a network such as a local area network (LAN) and the Internet.

The computer has a built-in central processing unit (CPU) 102, and an input/output interface 110 is connected to the CPU 102 via a bus 101.

When a command is input by a user operating an input unit 107 or the like via the input/output interface 110, in response to this, the CPU 102 executes a program stored in the read only memory (ROM) 103. Alternatively, the CPU 102 loads a program stored in the hard disk 105 into a random access memory (RAM) 104 and executes the program.

As a result, the CPU 102 performs the processing according to the above-described sequence diagrams or the processing performed by the configurations of the above-described block diagrams. Then, as necessary, the CPU 102 outputs a processing result from an output unit 106, transmits the processing result from a communication unit 108, causes the hard disk 105 to record the processing result, or the like, via the input/output interface 110, for example.

Note that the input unit 107 includes a keyboard, a mouse, a microphone, or the like. Furthermore, the output unit 106 includes a liquid crystal display (LCD), a speaker, and the like.

Here, in the present specification, the processing performed by the computer according to the program is not necessarily performed in time series in the order described as the sequence diagrams. That is, the processing to be performed by the computer in accordance with the program includes processing to be executed in parallel or independently of one another (parallel processing or object-based processing, for example).

Furthermore, the program may be processed by one computer (processor) or processed in a distributed manner by a plurality of computers. Moreover, the program may be transferred to a distant computer and executed.

Moreover, in the present specification, a system means a set of a plurality of components (devices, modules (parts), and the like), and it does not matter whether or not all components are in the same housing. Therefore, a plurality of devices housed in separate housings and connected via a network and one device in which a plurality of modules is housed in one housing are both systems.

Further, for example, a configuration described as one device (or processing unit) may be divided and configured as a plurality of devices (or processing units). Conversely, configurations described above as a plurality of devices (or processing units) may be combined and configured as one device (or processing unit). Furthermore, a configuration other than the above-described configurations may be added to the configuration of each device (or each processing unit). Moreover, when the configuration and operation of the entire system are substantially the same, a part of the configuration of a certain device (or processing unit) may be included in the configuration of another device (or another processing unit).

Furthermore, for example, the present technology can be configured as cloud computing in which one function is shared and jointly processed by a plurality of devices via a network.

Furthermore, for example, the above-described program can be executed by an arbitrary device. In this case, the device is only required to have a necessary function (functional block, or the like) and obtain necessary information.

Furthermore, for example, each step described in the above-described sequence diagrams can be executed by one device or can be shared and executed by a plurality of devices. Moreover, in a case where a plurality of processing is included in one step, the plurality of processing included in one step can be performed by one device or be performed in a shared manner by a plurality of devices. In other words, a plurality of pieces of processing included in one step may be executed as processes of a plurality of steps. On the contrary, processing described as a plurality of steps can be collectively executed as one step.

Note that, the program executed by the computer may be a program in which processing in steps describing the program is executed in time series in an order described in the present specification, or a program in which the processing may be executed in parallel, or individually at a necessary timing such as when a call is made. That is, unless there is a contradiction, the processing of each step may be executed in an order different from the orders described above. Moreover, this processing of steps describing program may be executed in parallel with processing of another program, or may be executed in combination with processing of another program.

Note that a plurality of pieces of the present technology which has been described in the present specification can each be implemented independently as a single unit as long as no contradiction occurs. Needless to say, a plurality of arbitrary pieces of the present technology can be used in combination. For example, part or all of the present technologies described in any of the embodiments can be implemented in combination with part or all of the present technologies described in other embodiments. Furthermore, a part or all of the present technologies described above may be implemented in combination with another technology not described above.

Combination Examples of Configurations

Note that the present technology can also have the following configuration.

(1)

An information processing system including:

a payment processing unit that performs data communication for executing payment processing with an information processing terminal; and a positioning processing unit that performs positioning by switching a positioning method for measuring a position of the information processing terminal for each of a plurality of ranging zones from a wide area to a narrow area set according to a distance from the payment processing unit.

(2)

The information processing system according to (1), in which, as the ranging zones, provided are:

a first ranging zone set as the wide area inside a boundary with a free zone in which positioning of the information processing terminal is not performed;

a second ranging zone set inside the first ranging zone; and a third ranging zone set as the narrow area in a vicinity of the payment processing unit inside the second ranging zone.

(3)

The information processing system according to (2), in which, in the first ranging zone, the position of the information processing terminal is measured by a first positioning method in which the information processing terminal performs positioning of the information processing terminal, in the second ranging zone and the third ranging zone, the position of the information processing terminal is measured by a second positioning method for performing positioning by the positioning processing unit, and when entry into the information processing terminal is detected in the third ranging zone, data communication by the payment processing unit is started, and payment processing with the information processing terminal is executed.

(4)

The information processing system according to (3), further including a plurality of Ultra Wide Band (UWB) communication units that transmits predetermined packets to the information processing terminal entering the first ranging zone from a plurality of directions by UWB communication.

(5)

The information processing system according to (4), in which the first positioning method is a Downlink Time Difference of Arrival (TDoA) method of measuring a position in the information processing terminal on the basis of a time difference between arrival times at which Downlink TDoA BLINK packets transmitted from the plurality of UWB communication units arrive at the information processing terminal.

(6)

The information processing system according to (4) or (5), in which the second positioning method is an Uplink Time Difference of Arrival (TDoA) method of measuring a position in the positioning processing unit on the basis of a time difference between arrival times at which Uplink TDoA BLINK packets transmitted from the information processing terminal arrive at the plurality of UWB communication units.

(7)

The information processing system according to any one of (3) to (6), in which the payment processing unit performs data communication for the payment processing with the information processing terminal in the third ranging zone by Bluetooth Low Energy (BLE) communication or UWB in-band communication.

(8)

The information processing system according to any one of (3) to (7), further including a plurality of the payment processing unit, in which the third ranging zone is set for each of the plurality of the payment processing unit.

(9)

The information processing system according to (4), in which the plurality of UWB communication units performs communication with the information processing terminal by secure ranging using DS-TWR.

(10)

The information processing system according to any one of (1) to (9), in which the plurality of ranging zones set for a first payment processing unit of a plurality of the payment processing unit and a first positioning processing unit of a plurality of the positioning processing unit and the plurality of ranging zones set for a second payment processing unit of the plurality of the payment processing unit and a second positioning processing unit of the plurality of the positioning processing unit are provided in a partially superimposed manner, the information processing system further including a ranging arbitration unit that arbitrates timing of a ranging time schedule for positioning the information processing terminal.

(11)

An information processing method including an information processing system performing positioning by switching a positioning method for measuring a position of an information processing terminal for each of a plurality of ranging zones from a wide area to a narrow area set according to a distance from a payment processing unit that performs data communication for executing payment processing with the information processing terminal.

(12)

An information processing terminal including an application execution unit configured to execute:

a payment application that performs payment processing with an information processing system including a payment processing unit; and a positioning application that performs positioning by switching a positioning method for measuring a position of the information processing terminal itself for each of a plurality of ranging zones from a wide area to a narrow area set according to a distance from the payment processing unit.

(13)

An information processing method including causing an information processing terminal to execute:

a payment application that performs payment processing with an information processing system including a payment processing unit; and a positioning application that performs positioning by switching a positioning method for measuring a position of the information processing terminal itself for each of a plurality of ranging zones from a wide area to a narrow area set according to a distance from the payment processing unit.

Note that the present embodiment is not limited to the above-described embodiments, and various modifications can be made without departing from the gist of the present disclosure. Furthermore, the effects described herein are merely examples and are not limited, and other effects may be provided.

REFERENCE SIGNS LIST

11 Payment processing system
12 Anchor system
13 Mobile terminal
21 UWB anchor
22 Application terminal
23 Ranging server
24 BLE device
25 UWB data communication anchor
26 Ranging arbitration server
31 BLE chip
32 UWB chip
33 eSE chip
34 Device host
35 Ranging software library
36 Payment application

The invention claimed is:

1. An information processing system, comprising:

a first payment processing unit configured to:

perform data communication with an information processing terminal; and execute, based on the data communication, a payment process with the information processing terminal, wherein the first payment processing unit is at a distance from a plurality of first ranging zones, the plurality of first ranging zones are from a first area to a second area, the first area is wider than the second area, the plurality of first ranging zones includes a free zone, a first ranging zone, a second ranging zone, and a third ranging zone, the first ranging zone is inside a boundary of the free zone, in the free zone, a first positioning process for the information processing terminal is not performed, the first ranging zone corresponds to the first area, the second ranging zone is inside the first ranging zone, the third ranging zone is in a vicinity of the first payment processing unit, the third ranging zone is inside the second ranging zone, the third ranging zone corresponds to the second area, and in the first ranging zone, the information processing terminal performs a second positioning process for the information processing terminal; and a first positioning processing unit configured to:

in the first ranging zone, measure a position of the information processing terminal based on a first positioning method;

switch the first positioning method to a second positioning method;

in the second ranging zone and in the third ranging zone, measure the position of the information processing terminal based on the second positioning method for; and in the second ranging zone, perform, based on the measured position of the information processing terminal in the second ranging zone, a third positioning process for the information processing terminal, wherein in a case where entry of the information processing terminal is detected in the third ranging zone, the data communication by the first payment processing unit is performed and the payment process with the information processing terminal is executed.

2. The information processing system according to claim 1, further comprising a plurality of Ultra Wide Band (UWB) communication units configured to transmit, based on UWB communication, specific packets to the information processing terminal entering the first ranging zone from a plurality of directions.

3. The information processing system according to claim 2, wherein the plurality of UWB communication units is further configured to transmit a plurality of Downlink Time Difference of Arrival (TDoA) BLINK packets, the first positioning method is a Downlink TDoA method, and the information processing terminal measures the position of the information processing terminal based on the Downlink TDoA method and a time difference between arrival times at which the plurality of Downlink TDoA BLINK packets transmitted from the plurality of UWB communication units arrive at the information processing terminal.

4. The information processing system according to claim 2, wherein the information processing terminal transmits a plurality of Uplink Time Difference of Arrival (TDoA) BLINK packets, the second positioning method is an Uplink TDoA method, and the first positioning processing unit is further configured to measure the position of the information processing terminal based on the Uplink TDoA method and on a basis of a time difference between arrival times at which the plurality of Uplink TDoA BLINK packets transmitted from the information processing terminal arrive at the plurality of UWB communication units.

5. The information processing system according to claim 2, wherein the plurality of UWB communication units is further configured to perform communication with the information processing terminal based on secure range and DS-TWR.

6. The information processing system according to claim 1, wherein the first payment processing unit is further configured to perform, based on one of Bluetooth Low Energy (BLE) communication or UWB in-band communication, the data communication for the payment process with the information processing terminal in the third ranging zone.

7. The information processing system according to claim 1, further comprising a plurality of payment processing units, wherein the third ranging zone is set for each of the plurality of payment processing units, and the plurality of payment processing units includes the first payment processing unit.

8. The information processing system according to claim 1, further comprising:

a ranging arbitration unit;

a plurality of positioning processing units; and a plurality of payment processing units, wherein the plurality of positioning processing units includes the first positioning processing unit and a second positioning processing unit, the plurality of payment processing units includes the first payment processing unit and a second payment processing unit, the plurality of first ranging zones is for the first payment processing unit, a plurality of second ranging zones is for the second payment processing unit, the first positioning processing unit partially superimposes the second positioning processing unit, and the ranging arbitration unit is configured to arbitrate timing of a ranging time schedule for the first positioning processing unit and the second positioning processing unit.

9. An information processing method, comprising:

in an information processing system that includes a payment processing unit:

performing data communication with an information processing terminal;

executing, based on the data communication, a payment process with the information processing terminal, wherein
the payment processing unit is at a distance from a plurality of ranging zones,
the plurality of ranging zones are from a first area to a second area,
the first area is wider than the second area,
the plurality of ranging zones includes a free zone, first ranging zone, a second ranging zone, and a third ranging zone,
the first ranging zone is inside a boundary of the free zone,
in the free zone, a first positioning process for the information processing terminal is not performed,
the first ranging zone corresponds to the first area,
the second ranging zone is inside the first ranging zone,
the third ranging zone is in a vicinity of the payment processing unit,
the third ranging zone is inside the second ranging zone,
the third ranging zone corresponds to the second area, and
in the first ranging zone, the information processing terminal performs a second positioning process for the information processing terminal;
in the first ranging zone, measuring a position of the information processing terminal based on a first positioning method;
switching the first positioning method to a second positioning method;
in the second ranging zone and in the third ranging zone, measuring the position of the information processing terminal based on the second positioning method; and
in the second ranging zone, performing, based on the measured position of the information processing terminal in the second ranging zone, a third positioning process for the information processing terminal, wherein
in a case where entry of the information processing terminal is detected in the third ranging zone, the data communication by the payment processing unit is performed and the payment process with the information processing terminal is executed.

10. An information processing terminal, comprising:
an application execution unit that includes:
a payment application configured to:
perform data communication with an information processing system; and
execute, based on the data communication, a payment process with the information processing system, wherein
the information processing system includes a payment processing unit,
the payment processing unit is at a distance from a plurality of ranging zones,
the plurality of ranging zones are from a first area to a second area,
the first area is wider than the second area,
the plurality of ranging zones includes a free zone, first ranging zone, a second ranging zone, and a third ranging zone,
the first ranging zone is inside a boundary of the free zone,
in the free zone, a first positioning process for the information processing terminal is not performed,
the first ranging zone corresponds to the first area,
the second ranging zone is inside the first ranging zone,
the third ranging zone is in a vicinity of the payment processing unit,
the third ranging zone is inside the second ranging zone,
the third ranging zone corresponds to the second area, and
in the first ranging zone, the information processing terminal is configured to perform a second positioning process for the information processing terminal; and
a positioning application configured to:
in the first ranging zone, measure a position of the information processing terminal based on a first positioning method;
switch the first positioning method to a second positioning method;
in the second ranging zone and in the third ranging zone, measure the position of the information processing terminal based on the second positioning method;
in the second ranging zone, perform, based on the measured position of the information processing terminal in the second ranging zone, a third positioning process for the information processing terminal; and
detect, after the third positioning process for the information processing terminal, entry of the information processing terminal in the third ranging zone, wherein
in the third ranging zone, the data communication by the payment application is performed and the payment process with the information processing system is executed.

11. An information processing method, comprising:
in an information processing terminal:
performing data communication with an information processing system; and
executing, based on the data communication, a payment process with the information processing system, wherein
the information processing system includes a payment processing unit,
the payment processing unit is at a distance from a plurality of ranging zones,
the plurality of ranging zones are from a first area to a second area,
the first area is wider than the second area,
the plurality of ranging zones includes a free zone, first ranging zone, a second ranging zone, and a third ranging zone,
the first ranging zone is inside a boundary of the free zone,
in the free zone, a first positioning process for the information processing terminal is not performed,
the first ranging zone corresponds to the first area,
the second ranging zone is inside the first ranging zone,
the third ranging zone is in a vicinity of the payment processing unit,
the third ranging zone is inside the second ranging zone,
the third ranging zone corresponds to the second area, and in the first ranging zone, performing, by the information processing terminal, a second positioning process for the information processing terminal;

in the first ranging zone, measuring a position of the information processing terminal based on a first positioning method;

switching the first positioning method to a second positioning method;

in the second ranging zone and in the third ranging zone, measuring the position of the information processing terminal based on the second positioning method;

in the second ranging zone, performing, based on the measured position of the information processing terminal in the second ranging zone, a third positioning process for the information processing terminal; and detecting, after the third positioning process for the information processing terminal, entry of the information processing terminal in the third ranging zone, wherein in the third ranging zone, the data communication is performed and the payment process with the information processing system is executed.

* * * * *